(12) United States Patent
Kawamura et al.

(10) Patent No.: US 7,418,199 B2
(45) Date of Patent: Aug. 26, 2008

(54) IMAGING APPARATUS

(75) Inventors: Kazuteru Kawamura, Hachioji (JP); Kazuya Nishimura, Akiruno (JP)

(73) Assignee: Olympus Corporation and Olympus Imaging Corp., Tokyo (JP)

( * ) Notice: Subject to any disclaimer, the term of this patent is extended or adjusted under 35 U.S.C. 154(b) by 513 days.

(21) Appl. No.: 11/177,277

(22) Filed: Jul. 11, 2005

(65) Prior Publication Data

US 2006/0024038 A1 Feb. 2, 2006

(30) Foreign Application Priority Data

Jul. 12, 2004 (JP) .............................. 2004-204899
Apr. 14, 2005 (JP) .............................. 2005-116550

(51) Int. Cl.
*G03B 17/00* (2006.01)
*H04N 5/262* (2006.01)
*H04N 5/255* (2006.01)
*G02B 13/16* (2006.01)
*G02B 15/14* (2006.01)

(52) U.S. Cl. .......................... 396/72; 396/60; 359/676; 359/689; 359/690; 359/695; 359/708; 359/748; 348/240.3; 348/335

(58) Field of Classification Search ................ 396/60, 396/72; 348/240.3, 335, 376; 359/676, 689, 359/681–683, 695, 708, 748, 749, 785
See application file for complete search history.

(56) References Cited

U.S. PATENT DOCUMENTS

| 6,028,717 | A | * | 2/2000 | Kohno et al. ............... 359/690 |
| 6,239,921 | B1 | | 5/2001 | Isono ...................... 359/717 |
| 6,417,975 | B1 | | 7/2002 | Isono ...................... 359/783 |
| 2006/0245078 | A1 | * | 11/2006 | Kawamura .................. 359/689 |

FOREIGN PATENT DOCUMENTS

| JP | 2000-321489 | 11/2000 |
| JP | 2001-021800 | 1/2001 |
| JP | 2001-100092 | 4/2001 |
| JP | 2003-195158 | 7/2003 |

* cited by examiner

*Primary Examiner*—Melissa Jan Koval
(74) *Attorney, Agent, or Firm*—Kenyon & Kenyon LLP

(57) ABSTRACT

An imaging apparatus including a first lens unit with positive power in which the most object-side surface is concave and the most image-side surface is convex, an aperture stop, a second lens unit with positive power in which the most object-side surface is convex and the most image-side surface is concave, and a third lens unit with positive power; and an image sensor. Air spacing between the second lens unit and the third lens unit assumes the shape of a biconvex air lens. The imaging apparatus satisfies the following condition:

$$1.4 \leq |r\,2R|/IH \leq 15.0$$

where IH is the maximum photographic image height, which is a half of the diagonal length, in an effective imaging area, of the image sensor, and r 2R is the radius of curvature, measured along the optical axis, of the most image-side surface of the second lens unit.

43 Claims, 29 Drawing Sheets

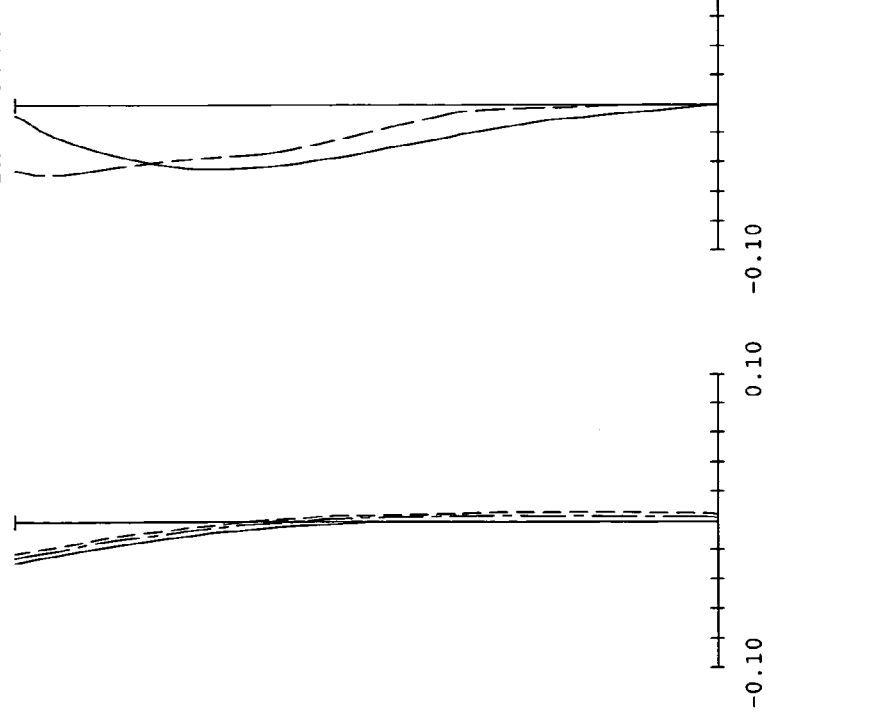
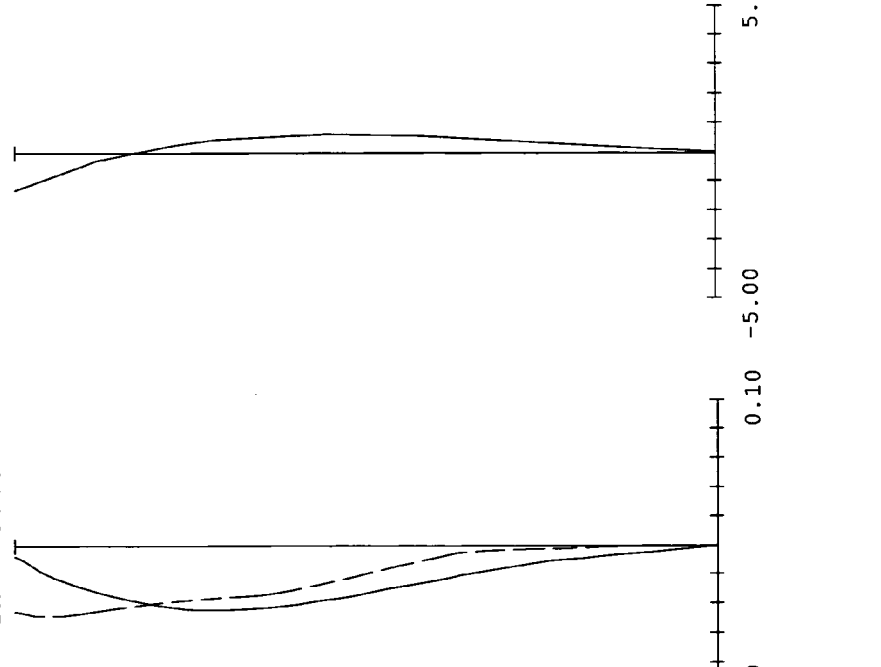
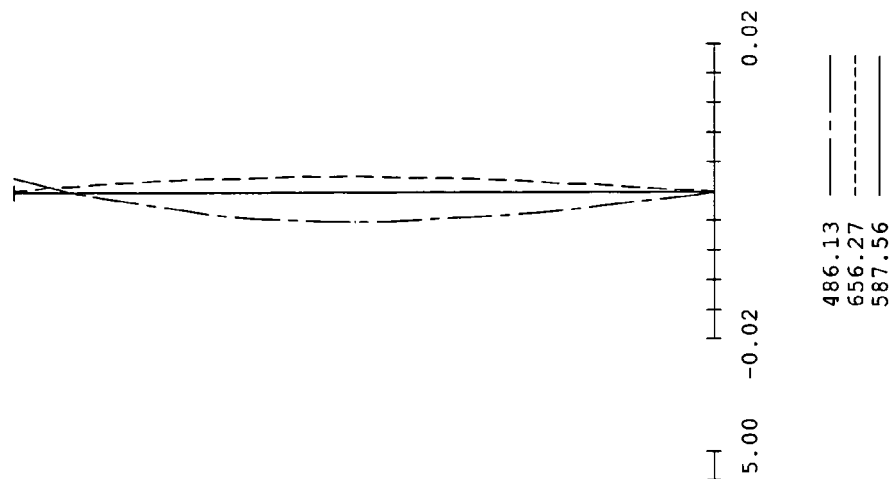

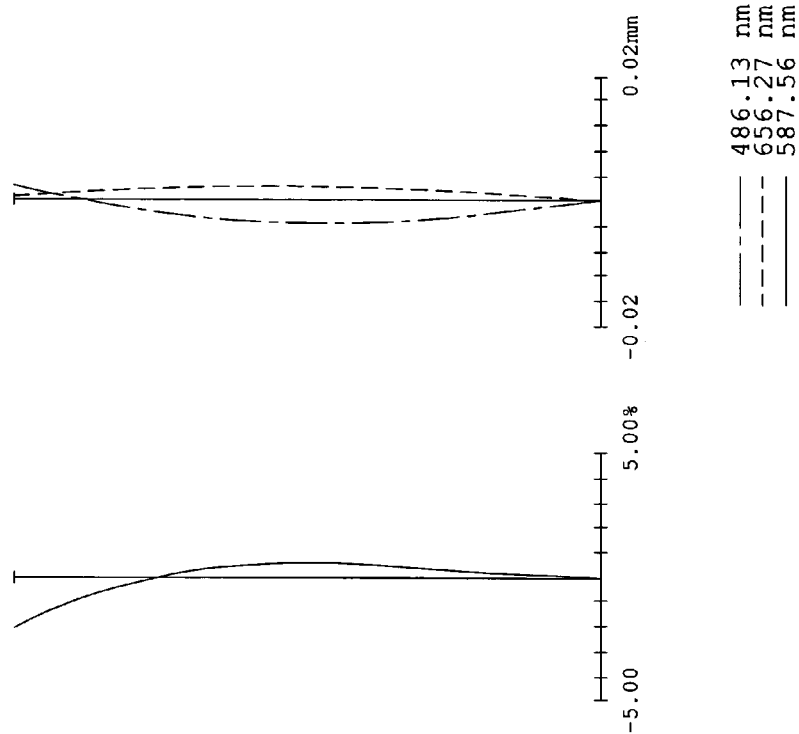
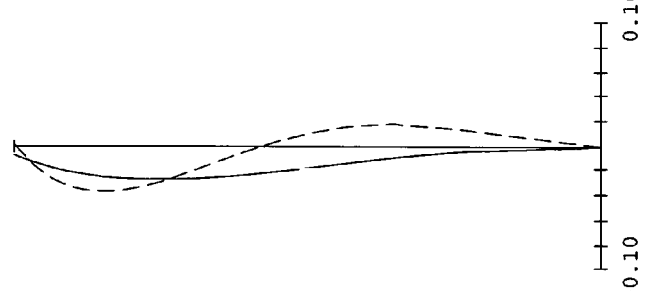
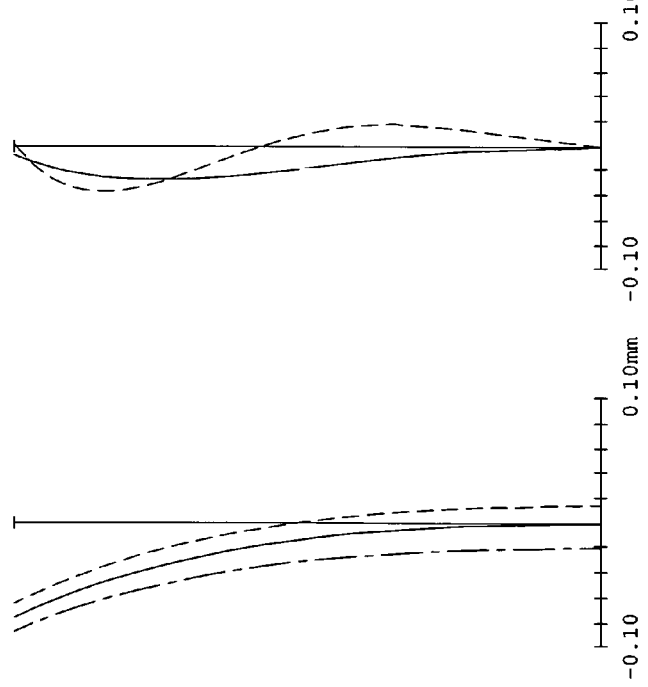

IMAGING APPARATUS

This application claims benefits of Japanese Application Nos. 2004-204899 filed in Japan on Jul. 12, 2004 and 2005-116550 filed in Japan on Apr. 14, 2005, the contents of which are hereby incorporated by reference.

BACKGROUND OF THE INVENTION

1. Field of the Invention

This invention relates to an imaging apparatus used in an electronic imaging system of a digital camera, and in particular, to an electronic imaging apparatus equipped with a photographing optical system in which good performance is obtained even in the use of a CCD with the number of pixels of 3M (mega) or more, the ratio of the entire lens length to an image height can be reduced to 4.5 or less, and a single focus lens with a half angle of view of 25 degrees or more is provided.

2. Description of Related Art

Recently, the compact and high-pixel-density design of an imaging apparatus using an electronic imaging system, such as a digital camera or a mobile phone with a camera, has been increasingly advanced. Consequently, a demand for a compact and high-performance design of a lens system used in such an imaging apparatus has significantly increased.

The single focus lens used in the electronic imaging apparatus, in which its focal length is not changed, is easily used at a half angle of view of 25 degrees or more, in view of the fact that there are various photographic scenes, for example, personal photography, landscape photography, and photography of information such as letters.

Prior art that takes aim at such a half angle of view of 25 degrees or more is set forth, for example, in Japanese Patent Kokai Nos. 2000-321489, 2003-195158, 2001-100092, 2001-21800, and 2000-193884.

SUMMARY OF THE INVENTION

The imaging apparatus of the present invention comprises a photographing optical system and an image sensor converting an optical image formed on its imaging surface by the photographing optical system into an electric signal. In this case, the photographing optical system includes, in order from the object side toward the image side, a first lens unit with positive power in which the most object-side surface is concave and the most image-side surface is convex, an aperture stop, a second lens unit with positive power in which the most object-side surface is convex and the most image-side surface is concave, and a third lens unit with positive power. Air spacing between the second lens unit and the third lens unit assumes the shape of a biconvex air lens. The imaging apparatus satisfies the following condition:

$$1.4 \leq |r\,2R|/IH \leq 15.0$$

where IH is the maximum photographic image height, which is a half of the diagonal length, in an effective imaging area, of the image sensor, and r 2R is the radius of curvature, measured along the optical axis, of the most image-side surface of the second lens unit.

The imaging apparatus of the present invention comprises a photographing optical system and an image sensor converting an optical image formed on its imaging surface by the photographing optical system into an electric signal. In this case, the photographing optical system includes, in order from the object side toward the image side, a first lens unit with positive power in which the most object-side lens surface is concave and the most image-side lens surface is convex, an aperture stop, a second lens unit with positive power in which the most object-side lens surface is convex and the most image-side lens surface is concave, and a third lens unit with positive power. The imaging apparatus satisfies the following condition:

$$0.8 \leq fg2/f\,all \leq 5.5$$

where f g2 is the focal length of the second lens unit and f all is the focal length of the entire optical system.

The imaging apparatus of the present invention comprises a photographing optical system and an image sensor converting an optical image formed on its imaging surface by the photographing optical system into an electric signal. In this case, the photographing optical system includes, in order from the object side toward the image side, a first lens unit with positive power in which the most object-side lens surface is concave and the most image-side lens surface is convex, an aperture stop, a second lens unit with positive power in which the most object-side lens surface is convex and the most image-side lens surface is concave, and a third lens unit with positive power. The imaging apparatus satisfies the following condition:

$$2.5 < TL/IH < 4.1$$

where TL is a distance from the entrance surface of the first lens unit of the photographing optical system to the imaging surface of the image sensor.

The imaging apparatus of the present invention comprises a photographing optical system and an image sensor converting an image of an object formed on its imaging surface by the photographing optical system into an electric signal. In this case, the photographing optical system includes, in order from the object side toward the image side, a first lens unit with positive power, an aperture stop, a second lens unit with positive power, and a third lens unit with positive power. Each of the exit surface of the first lens unit and the entrance surface of the second lens unit is convex toward the aperture stop side. The first lens unit is constructed with a plurality of lens elements so that any of the lens surfaces of the plurality of lens elements is convex toward the aperture stop side on the optical axis. The imaging apparatus satisfies the following condition:

$$0.15 \leq T1/IH \leq 0.90$$

where T1 is a distance, measured along the optical axis, from the entrance surface of the first lens unit of the photographing optical system to the image-side surface of the first lens unit.

The optical system of the present invention has a cemented lens component. The cemented lens component includes a glass lens element and an auxiliary lens element assembled in the glass lens element and satisfies the following conditions:

$$0.05 \leq DC \leq 0.3\ (\text{mm})$$

$$Ndc \geq 1.65$$

$$|vdm - vdc| > 6$$

where DC is the thickness, measured along the optical axis, of a single body of the auxiliary lens element assembled in the glass lens element; Ndc is the refractive index, regarding the d line (587.56 nm), of the auxiliary lens element assembled in the glass lens element; vdm is the Abbe's number of the glass lens element; and vdc is the Abbe's number of the auxiliary lens element assembled in the glass lens element.

These and other features and advantages of the present invention will become apparent from the following detailed description of the preferred embodiments when taken in conjunction with the accompanying drawings.

BRIEF DESCRIPTION OF THE DRAWINGS

FIGS. 6A, 6B, 6C, and 6D are diagrams showing spherical aberration, astigmatism, distortion, and chromatic aberration of magnification, respectively, in infinite focusing of the imaging apparatus in the third embodiment;

FIGS. 18A, 18B, 18C, and 18D are diagrams showing spherical aberration, astigmatism, distortion, and chromatic aberration of magnification, respectively, in infinite focusing of the imaging apparatus in the ninth embodiment;

DETAILED DESCRIPTION OF THE PREFERRED EMBODIMENTS

Figure 1:
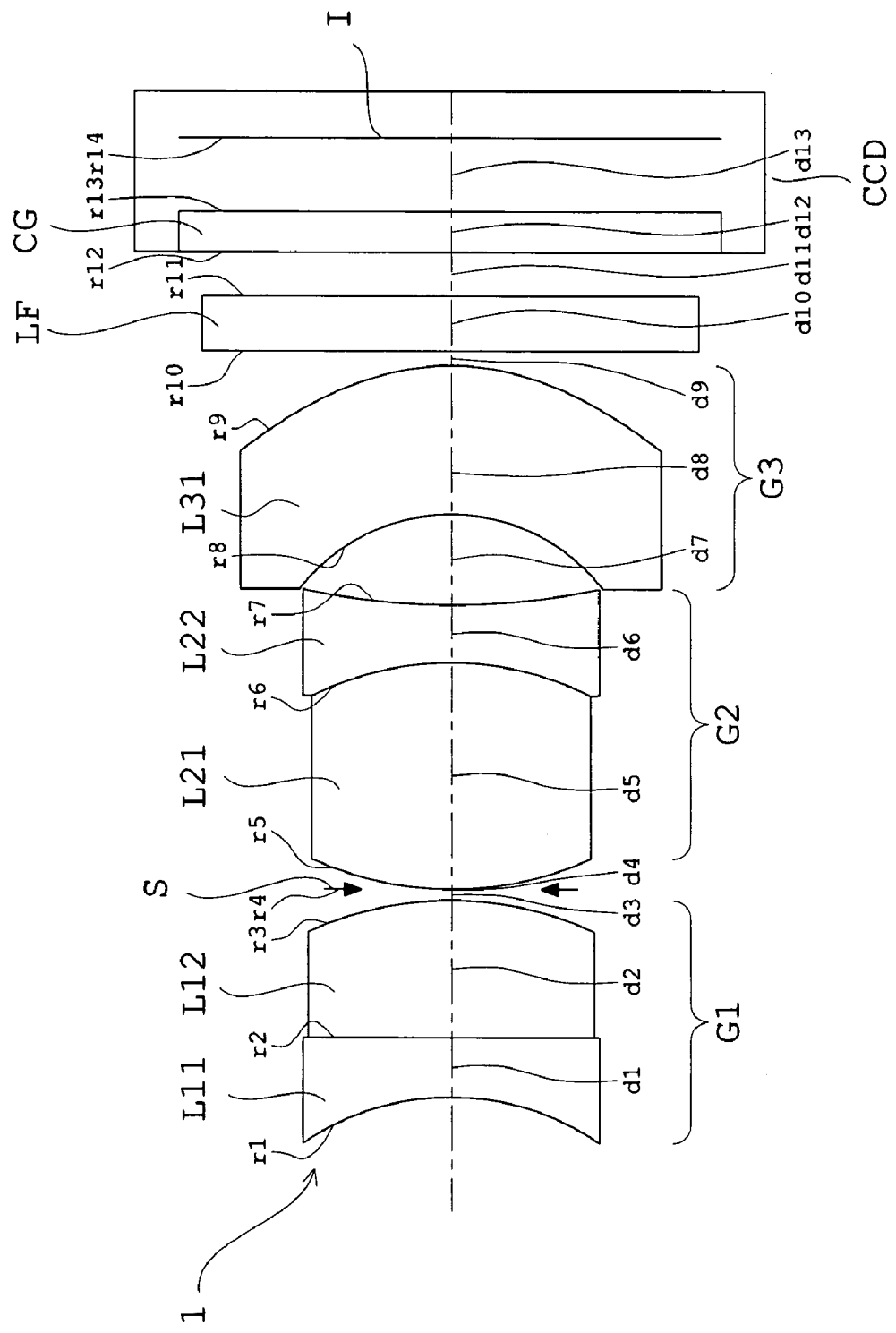
FIG. 1 is a sectional view showing an optical arrangement, developed along the optical axis, of a first embodiment of the imaging apparatus according to the present invention.
Figure 2:
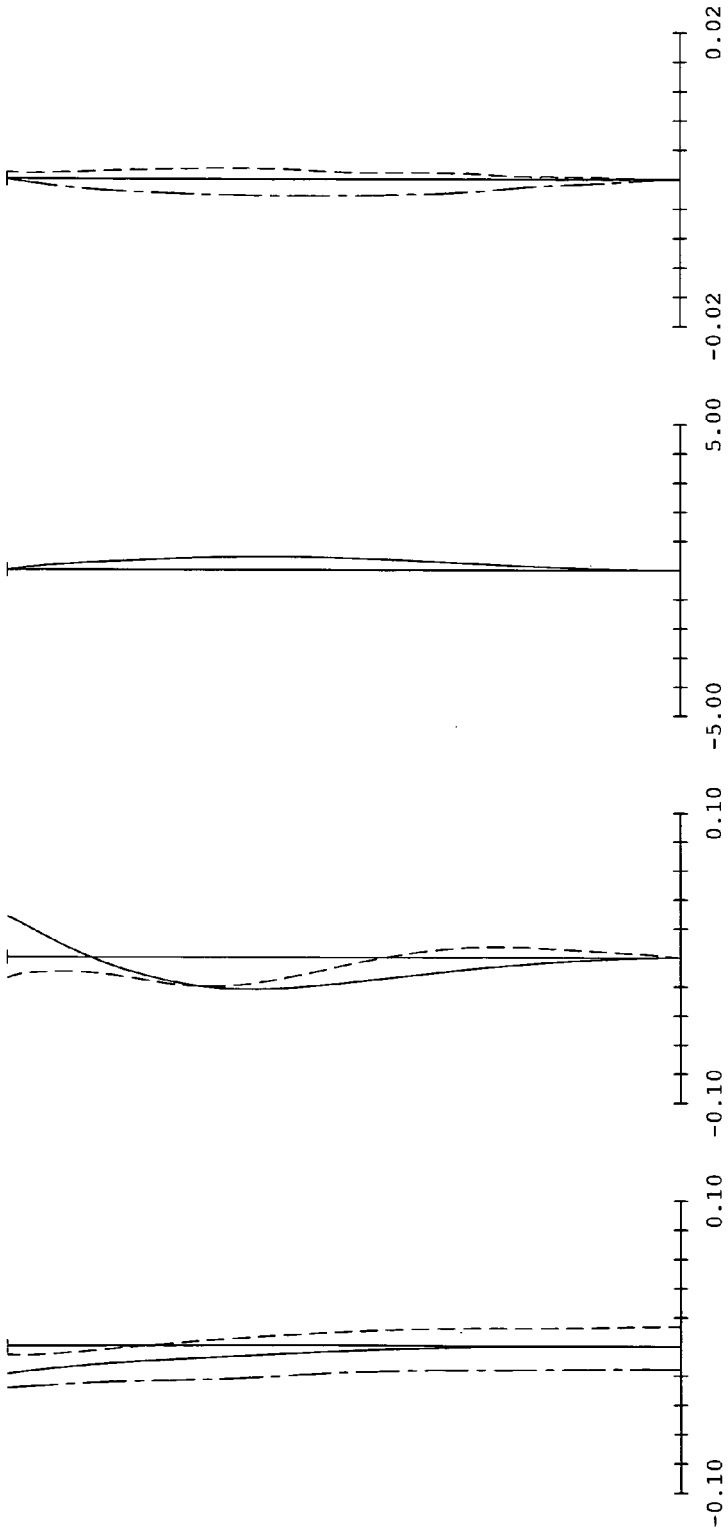
FIGS. 2A, 2B, 2C, and 2D are diagrams showing spherical aberration, astigmatism, distortion, and chromatic aberration of magnification, respectively, in infinite focusing of the imaging apparatus in the first embodiment.

At the beginning, a description is given of the outline of a fundamental arrangement of the present invention and the function and effect thereof.

The imaging apparatus that has the fundamental arrangement of the present invention comprises a photographing optical system and an image sensor converting an optical image into an electric signal. The photographing optical system includes, in order from the object side toward the image side, the first lens unit with positive power in which the most object-side lens surface is concave and the most image-side lens surface is convex, the aperture stop, the second lens unit with positive power in which the most object-side lens surface is convex and the most image-side surface is concave, and the third lens unit with positive power.

Here, when an attempt is made to obtain the smallest possible optical system, a reduction in the number of lens elements becomes necessary. However, if the number of lens elements is reduced, the power of each lens element will be strengthened. In particular, a wide-angle lens such as that with a half angle of view in excess of 25 degrees becomes difficult to favorably suppress the production of curvature of field, distortion, and chromatic aberration of magnification that exhibit peripheral lens performance.

Thus, in the present invention, the fundamental arrangement is made to have the first lens unit with positive power as a whole in which the most object-side lens surface is concave and the most image-side lens surface is convex, the aperture stop, and the second lens unit with positive power as a whole in which the most object-side lens surface is convex and the most image-side lens surface is concave. Whereby, the lens units nearly symmetrical with respect to the stop can be arranged. Even in the wide-angle lens such that a half angle of view is in excess of 25 degrees, an arrangement is made to have the first lens unit, the aperture stop, and the second lens unit, and thereby each of the first and second lens units can be constructed with no more than two lens elements and it is possible to render the peripheral lens performance favorable.

Each of the first and second lens units is constructed as a lens unit having positive power as a whole, and thereby a reduction in the overall length of the optical system can be attained.

The entrance surface of the first lens unit is configured as the concave surface, and thereby downsizing of the outer diameter of the entrance-side lens element can be achieved.

The entrance-side lens surface of the first lens unit is configured to be concave, the exit-side lens surface of the first lens unit is convex, the entrance-side lens surface of the second lens unit is convex, and the exit-side lens surface of the second lens unit is concave. Whereby, even though the number of lens elements is small, the production of aberration in each lens unit can be minimized and the degradation of performance due to decentration between the lens units is easily suppressed.

In a camera using an electronic image sensor, if the exit pupil of the optical system is fairly close to the imaging surface, the influence of shading becomes remarkable on the periphery and it becomes difficult to ensure the amount of marginal light. In such a camera using the electronic image sensor, the imaging apparatus of the present invention in which the third lens unit is designed to have positive power is used and thereby the exit pupil can be spaced away from the imaging surface.

By designing the imaging apparatus that has the first lens unit, the aperture stop, the second lens unit, and the third lens unit, the optical system can be provided in which a reduction in the overall length of the optical system and downsizing of the outer diameter become possible, a moderate position of the exit pupil is ensured and at the same time, favorable performance is obtained, and the degradation of performance due to variation in manufacture is minimized.

Before undertaking the description of the embodiments of the present invention, the function and effect of the present invention will be explained.

According to the imaging apparatus of a first aspect that satisfies Condition (1) described below, in addition to the fundamental arrangement of the present invention, the imaging apparatus has a biconvex air lens between the second lens unit and the third lens unit. Whereby, both sides of the air lens have negative power, and positive power is produced outside of the air lens. Consequently, in the imaging apparatus having the air lens, it becomes easy to favorably correct spherical aberration.

$$1.4 \leq |r2R|/IH \leq 15.0 \tag{1}$$

where IH is the maximum photographic image height, which is a half of the diagonal length, in an effective imaging area, of the image sensor, and r 2R is the radius of curvature, measured along the optical axis, of the most image-side surface of the second lens unit.

In the first lens unit, the entrance-side lens surface is concave and the exit-side lens surface is convex, and in the second lens unit, the entrance-side lens surface is convex and the exit-side lens surface is concave. The biconvex air lens is provided between the second lens unit and the third lens unit. Even when each lens unit has no more than two lens elements, it becomes possible to ensure efficiently favorable performance.

The imaging apparatus having the air lens is capable of reducing the overall length of the optical system while ensuring the ability to effectively correct aberration by satisfying Condition (1). If the lower limit of Condition (1) is passed so that the overall length of the optical system is reduced, the production of off-axis aberrations, such as curvature of field and distortion, in the second lens unit becomes pronounced and it becomes difficult to ensure favorable performance. Below the lower limit of Condition (1), the exit pupil extremely approaches the imaging surface and it becomes difficult to ensure the amount of marginal light. On the other hand, if the upper limit of Condition (1) is exceeded so that the overall length of the optical system is reduced, the ability to correct aberration in the second lens unit will be impaired. In the imaging apparatus in which the ability to correct aberration is impaired, if an attempt is made to ensure favorable performance, an increase of the number of lens elements will be caused and the compact design of the optical system becomes difficult.

In the case where the above arrangement is adopted and there is no restriction as to size, even when each lens unit is constructed with more than two lens elements, the above effect can, of course, be obtained.

Also, the lower limit of Condition (1) may be set to 1.6 or 1.75. Alternatively, the upper limit of Condition (1) may be set to 10.0 or 6.0. Even in such upper and lower limits, it is possible to reduce the overall length of the optical system while holding the ability to efficiently correct aberration.

The imaging apparatus of a second aspect satisfies Condition (2), described below, for favorably correcting aberration to attain a reduction of the overall length of the optical system.

$$0.8 \leq fg2/fall \leq 5.5 \tag{2}$$

where f g2 is the focal length of the second lens unit and f all is the focal length of the entire optical system.

If the lower limit of Condition (2) is passed so that the focal length of the second lens unit is shorter than that of the entire optical system, an increase of the number of lens elements will be caused in order to suppress the production of aberration in the second lens unit, and a reduction of the overall length of the optical system becomes difficult. On the other hand, if the upper limit of Condition (2) is exceeded so that the focal length of the second lens unit is longer than that of the entire optical system, the function of the positive power of the second lens unit will be impaired and thereby a reduction of the overall length becomes difficult, with the result that the overall length to the photographic image height to be used is increased.

Since the power of the third lens unit must be strengthened in order to space the exit pupil away from the imaging surface, the Petzval sum produced in the third lens unit is increased. In this case, in order to favorably correct curvature of field, it is necessary to strengthen the negative power in the first lens unit (namely, to moderate the positive power of the first lens unit), and a reduction of the overall length of the optical system becomes further difficult.

Also, the lower limit of Condition (2) may be set to 1.0 or 1.2. Alternatively, the upper limit of Condition (2) may be set to 4.5 or 4.0. Even in such upper and lower limits, favorable correction for aberration is obtained and a reduction of the overall length of the optical system can be attained.

The imaging apparatus of a third aspect satisfies the following condition:

$$r2R/r3F \leq -1 \quad (3)$$

where r 2R is the radius of curvature, measured along the optical axis, of the most image-side lens surface of the second lens unit and r 3F is the radius of curvature, measured along the optical axis, of the most object-side lens surface of the third lens unit.

Beyond the upper limit of Condition (3), the value of |r 2R| becomes smaller than that of |r 3F| and divergence of light rays at the exit surface of the second lens unit is increased. Consequently, sometimes, off-axis aberration is liable to be produced or it becomes difficult to completely correct spherical aberration. In this case, in order to ensure the function of correcting aberration, it is necessary to increase the number of lens surfaces.

In order to bring about the effect of correction for aberration on the exit-side lens surface of the second lens unit, it is desirable to provide Condition (3) with the lower limit and to satisfy the following condition:

$$-15 \leq r2R/r3F \leq -1 \quad (3')$$

Further, the lower limit of Condition (3') may be set to −8 or −6, or the upper limit of Condition (3') may be set to −1.01 or −2. Even in such upper and lower limits, the effect of correction for aberration can be brought about on the exit-side lens surface of the second lens unit.

For light rays emerging from the concave surface of the second lens unit, it is necessary to have the function that the exit pupil is spaced away from the imaging surface by the positive power of the third lens unit. Thus, according to the imaging apparatus of a fourth aspect, the most object-side surface of the third lens unit is configured as a concave surface and the most image-side surface is configured as a convex surface. Hence, it is possible to strengthen the power of the third lens unit while suppressing the production of off-axis aberration at the entrance surface of the third lens unit, and favorable performance can be easily ensured in spite of a small number of lens elements.

According to the imaging apparatus of a fifth aspect, in addition to the arrangement of the imaging apparatus of the fourth aspect, the imaging apparatus satisfies Condition (4) described blow. Whereby, further favorable performance can be ensured.

$$0.3 \leq |r3F|/IH \leq 2.5 \quad (4)$$

If the lower limit of Condition (4) is passed so that the radius of curvature of the most object-side lens surface of the third lens unit becomes too small, the exit pupil must be spaced away from the imaging surface. As a result, a heavier load is imposed on the function of strengthening the positive power of the image-side lens surface of the third lens unit than on the object-side lens surface. In such a case, to obtain favorable performance, an increase of the number of lens elements of the third lens unit is required.

If the upper limit of Condition (4) is exceeded so that the radius of curvature of the most object-side lens surface of the third lens unit becomes too large, the effect of correction for spherical aberration on the lens surface will be extremely lessened, and a reduction of the overall length of the optical system becomes difficult.

Further, the lower limit of Condition (4) may be set to 0.5 or 0.7. Alternatively, the upper limit of Condition (4) may be set to 2.0 or 1.2. Even in such lower and upper limits, favorable performance can be ensured.

According to the imaging apparatus of a sixth aspect, in addition to the arrangement of the imaging apparatus of the fifth aspect, the third lens unit that is a lens unit located at the most image-side position uses an aspherical surface of a shape such that the positive power becomes more moderate on the periphery than at the center. Whereby, distortion can be effectively corrected. Thus, it becomes possible that the third lens unit is constructed with a single positive meniscus lens element, which is effective for a reduction of the overall length of the optical system.

The imaging apparatus of a seventh aspect satisfies the following condition:

$$0.6 \leq |r1F|/IH \leq 4.0 \quad (5)$$

where r 1F is the radius of curvature, measured along the optical axis, of the most object-side lens surface of the first lens unit.

According to the imaging apparatus of the seventh aspect, a small number of lens elements are used and the outer diameter of the entrance-side lens is downsized, which is favorable for satisfactorily correcting performance while reducing the overall length of the optical system.

Below the lower limit of Condition (5), the function of increasing the back focus becomes too strong and a reduction of the overall length of the optical system becomes difficult. On the other hand, beyond the upper limit of Condition (5), the position of the entrance pupil is liable to be shifted to the image side. Consequently, it becomes difficult to downsize the outer diameter of the entrance-side lens.

By satisfying Condition (5), it becomes easy to hold the balance of correction for aberration with respect to the most object-side lens surface and the most mage-side lens surface in the first lens unit. Thus, even when the first lens unit is constructed with no more than two lens elements, it becomes easy to ensure good performance. Whereby, the compact design of the optical system can be attained.

In Condition (5), the lower limit may be set to 0.8 or 0.9. Alternatively, the upper limit may be set to 3.0 or 1.5. Even in such lower and upper limits, a small number of lens elements are used to downsize the outer diameter of the entrance-side lens and it is possible to favorably correct performance while reducing the overall length of the optical system. Moreover, even when the first lens unit is constructed with no more than two lens elements, it becomes easy to ensure good performance, and thus the compact design of the optical system can be achieved.

According to the imaging apparatus of an eighth aspect, the first lens unit is constructed with a meniscus lens component that there is no air spacing between the entrance surface and the exit surface, and this is favorable for reducing the diameter of the entrance surface. In particular, when the meniscus lens component is configured as a cemented lens component including a negative lens element and a positive lens element, correction for chromatic aberration is facilitated, which is more favorable.

According to the imaging apparatus of a ninth aspect, the first lens unit is placed as in the imaging apparatus of the first or second aspect and thereby can be constructed with two lens elements: a first lens element with negative power and a second lens element with positive power, arranged in this order from the object side. Thus, the first lens unit can be constructed with a small number of lens elements and the compact design of the optical system can be achieved. In this case, the most object-side concave lens surface and the most image-side convex lens surface are designed to effectively use the function of correcting aberrations, notably coma, astigmatism, and distortion, and thereby favorable correction for chromatic aberration is facilitated.

According to the imaging apparatus of a tenth aspect that satisfies Condition (6) described below, when the first lens unit is constructed with two lens elements to reduce the overall lens length, the degradation of performance due to lens decentration can be suppressed.

$$3.0 \leq |r1L12|/IH \quad (6)$$

where r 1L12 is the paraxial radius of curvature of the entrance surface of the second lens element.

Below the lower limit of Condition (6), spherical aberration and coma, produced at the object-side lens surface of the second lens are extremely increased, and the amount of production of aberration at each lens surface in the first lens unit is liable to increase, in view of the balance of aberration. As a result, the degradation of performance due to decentration tends to be produced.

Also, the lower limit of Condition (6) may be set to 5.0 or 10.0. The upper limit of Condition (6) can be set to infinity, but when the effect of correction for aberration is imparted to the lens surface, the upper limit may be set to 150. Even in such upper and lower limits, the degradation of performance due to lens decentration can be suppressed.

According to the imaging apparatus of an eleventh aspect, the first lens unit is constructed by cementing the first lens element with negative power and the second lens element with positive power and thereby the degradation of performance due to the influence of decentration produced between the negative lens element and the positive lens element and due to ghost can be kept to a minimum.

Since the thickness of the edge of the second lens element is easily ensured by satisfying Condition (6), the thickness of the second lens element can be decreased and the effect that the overall lens length can be reduced is brought about.

According to the imaging apparatus of a twelfth aspect, the second lens unit includes a first lens element with positive power and a second lens element with negative power. Whereby, the second lens unit can be constructed with no more than two lens elements and the compact design of the optical system can be achieved.

By constructing the second lens unit with two lens elements, the most object-side convex lens surface and the most image-side concave lens surface in the second lens unit are capable of favorably correcting chromatic aberration while effectively using the function of correcting aberrations, notably coma, astigmatism, and distortion.

On the other hand, when an attempt is made to reduce the overall lens length, it is necessary to heighten the effect of correction for aberration of each individual lens surface, and the degradation of performance due to lens decentration becomes pronounced.

Thus, in the imaging apparatus of a thirteenth aspect, the second lens unit is constructed with a cemented lens component consisting of two lens elements, and thereby the degradation of performance caused between the negative lens element and the positive lens element can be kept to a minimum.

According to the imaging apparatus of a fourteenth aspect, like the imaging apparatus of the eighth or twelfth aspect, the effect of the compact design can be secured.

The imaging apparatus of a fifteenth aspect is such as to satisfy Condition (2) in the imaging apparatus of the first aspect and is capable of favorably correcting spherical aberration.

According to the imaging apparatus of a sixteenth aspect, when a distance from the exit pupil of the photographing optical system to the imaging surface is represented by EP and the maximum photographic image height, which is a half of the diagonal length, in an effective imaging area, of the image sensor is represented by IH, the imaging apparatus satisfies the following condition:

$$-0.455 \leq IH/EP \leq 0.455 \quad (7)$$

The imaging apparatus satisfying Condition (7) is capable of securing the amount of marginal light, which is favorable.

Also, beyond the upper limit or below the lower limit of Condition (7), the influence of shading is liable to be exerted on the periphery of the image.

It is more desirable that the imaging apparatus satisfies the following condition:

$$-0.1 \leq IH/EP \leq 0.455 \quad (7')$$

By satisfying Condition (7'), an enlargement of the lens diameter of the third lens unit can be obviated.

According to the imaging apparatus of a seventeenth aspect, each lens unit has two or less lens element and thus the imaging apparatus can be constructed with a small number of lens elements.

In addition, it is good practice that each of the first lens unit and the second lens unit includes a single positive lens element and a single negative lens element and the third lens unit is constructed with a single positive lens element. By doing so, aberrations produced in the first lens unit and the second lens unit can be favorably corrected and the number of lens elements constituting the third lens unit can be minimized. Consequently, a reduction of the overall length is favorably compatible with correction for aberration.

Further, it is good practice that the first lens unit includes, in order from the object side toward the image side, a negative lens element and a positive lens element, and the second lens unit includes, in order from the object side toward the image side, a positive lens element and a negative lens element. In doing so, the first lens unit and the second lens unit are arranged symmetrically about the stop interposed between them so that a wide-angle design and correction for aberration can be attained and it is easy to hold the balance of the compact design.

According to the imaging apparatus of an eighteenth aspect, the imaging apparatus is designed to satisfy the following condition:

$$2.5 < TL/IH < 4.1 \quad (8)$$

where TL is a distance from the entrance surface of the first lens unit of the photographing optical system to the imaging surface of the image sensor.

Below the lower limit of Condition (8), the overall length of the optical system is reduced, but correction for aberration becomes difficult. Beyond the upper limit of Condition (8), the overall length of the optical system is increased and it becomes hard to downsize the imaging apparatus.

According to the imaging apparatus of a nineteenth aspect that satisfies Condition (9) described below, like the function and effect of the fundamental arrangement of the present invention, the lens units nearly symmetrical about the stop can be arranged. Even in the wide-angle lens such as that with a half angle of view in excess of 25 degrees, each of the first lens unit and the second lens unit is constructed with a small number of lens elements and peripheral lens performance can be improved.

$$2.5 < TL/IH < 4.1 \quad (9)$$

According to the imaging apparatus of the nineteenth aspect, it is possible to provide the optical system in which a reduction in the overall length of the optical system and downsizing of the outer diameter can be realized, a moderate position of the exit pupil is ensured and favorable performance is obtained at the same time, and there is little degradation of performance due to variations in products when manufactured.

Below the lower limit of Condition (9), the overall length of the optical system is reduced, but correction for aberration becomes difficult. Beyond the upper limit of Condition (9), the overall length of the optical system is increased and it becomes hard to downsize the imaging apparatus.

The imaging apparatus of a twentieth aspect is designed to satisfy the following condition:

$$0.03 < TS/TL < 0.4 \quad (10)$$

where TS is the sum of lengths of air spacings, measured along the optical axis, from the entrance surface of the first lens unit to the exit surface of the third lens unit.

Below the lower limit of Condition (10), correction for aberration by the air lens becomes difficult. Beyond the upper limit, the air spacings are widened and the compact design of the photographing optical system becomes difficult.

In Condition (10), the lower limit may be set to 0.05 or 0.07. Alternatively, the upper limit may be set to 03 or 0.25. Even in such lower and upper limits, favorable correction for aberration can be made and the photographing optical system can be downsized.

In the present invention, an arrangement made to have, in order from the object side toward the image side, a first lens unit with positive refracting power, an aperture stop, a second lens unit with positive refracting power, and a third lens unit with positive refracting power is used as a fundamental one.

When each individual lens unit is designed to have the positive refracting power as in the present invention, the refracting power of the entire photographing optical system can be shared and the arrangement in which correction for aberration is easy can be attained. Furthermore, when the distribution of positive power is adjusted by three lens units, power distribution that is advantageous for a reduction in the overall length of the optical system can be obtained.

When the stop is interposed between the first lens unit and the second lens unit as in the present invention, oversizing of the first lens unit and the second lens unit, located before and behind the stop can be prevented.

When a plurality of positive lens units are arranged from the stop toward the image side and the exit pupil is spaced away from the imaging surface as in the present invention, off-axis rays incident on the image sensor can be rendered nearly perpendicular. As a result, since the fear of reflecting incident light by the oblique incidence characteristic of the image sensor is eliminated, a decrease in the amount of light can be kept to a minimum.

Further, since the stop is placed in the air lens having main refracting power, an arrangement can be made such that correction for aberration is facilitated in a state where the refracting power of the entire optical system is ensured.

As in the present invention, when the first lens unit is constructed with a plurality of lens elements and each of lens elements constituting the first lens unit is configured as a meniscus lens element with a convex surface facing the stop side, the production of aberration in the first lens unit can easily be suppressed.

When the first lens unit is constructed so that each of surfaces of lens elements constituting the first lens unit takes the same direction as the convex surface that is the exit surface, the entire thickness of lens elements constituting the first lens unit can be decreased and at the same time, the length of the entire optical system can be reduced. The lens diameter of each of lens elements constituting the first lens unit can thus be downsized.

Further, when each of the lens elements constituting the first lens unit is configured as the meniscus lens element, an edge thickness can easily be ensured. Consequently, the lens thickness along the optical axis can be decreased without deteriorating lens workability.

Since the height of an off-axis incident ray can be decreased, the diameter of the lens element located behind the second lens unit can be made small and the optical system can be downsized.

When the entrance surface of the first lens unit is configured as the concave surface, the outer diameter of the entrance-surface-side lens element can be downsized.

When the first lens unit, as in the present invention, is configured as the meniscus lens component with a convex surface facing the image side, reflected light is diverged even though light reflected back by the surfaces of lens elements located on the image side of the stop is reflected by the lens surfaces of the first lens unit located on the object side of the stop. The production of ghost light can thus be suppressed.

According to the imaging apparatus of a twenty-first aspect, the imaging apparatus satisfies the following condition:

$$0.15 \leq T1/IH \leq 0.90 \quad (11)$$

where T1 is a distance, measured along the optical axis, from the entrance surface of the first lens unit of the photographing optical system to the image-side surface of the first lens unit.

Condition (11) determines the ratio of the distance T1 between the entrance surface of the first lens unit and the image-side surface of the first lens unit to the maximum photographic image height IH, which is a half of the diagonal length, in an effective imaging area, of the electronic image sensor.

If the value of T1/IH is beyond the upper limit of Condition (11), the height of the incident ray in the first lens unit will be extremely increased. As such, the angle of incidence of a light beam on the entrance surface that is concave toward the object side is liable to vary, extending from the axial light beam to the most off-axial light beam, and it becomes difficult to correct aberration with the total angle of view. Consequently, for example, an aspherical surface of special shape must be used, which is unfavorable because the manufacturing cost is raised. In addition, the diameter and thickness of the most object-side lens element of the first lens unit are increased and the compact design of the optical system becomes difficult, which is unfavorable.

On the other hand, if the value of T1/IH is below the lower limit of Condition (11), the axial light beam will extremely approach the off-axis light beam at the entrance surface of the first lens unit. This is unfavorable because it becomes difficult to hold the balance of aberration between the axial light beam and the off-axis light beam at the entrance surface of the first lens unit. Furthermore, since the thickness of the first lens unit becomes considerably small, the lens workability is impaired when lens elements are made and fabricated, which is unfavorable.

Instead of satisfying condition (II), it is further desirable to satisfy the following condition:

$$0.20 \leq T1/IH \leq 0.80 \quad (11')$$

Instead of satisfying Condition (11), it is more desirable to satisfy the following condition:

$$0.25 \leq T1/IH \leq 0.70 \quad (11'')$$

Instead of satisfying Condition (11), it is still more desirable to satisfy the following condition:

$$0.30 \leq T1/IH \leq 0.65 \quad (11''')$$

As in the present invention, when a lens material with a refractive index as high as 1.7 or more is used, the curvature of the lens surface in each lens element can be reduced and favorable correction for aberration can easily be made. Moreover, the edge thickness necessary for lens fabrication is ensured and at the same time, the thickness along the optical axis is moderated. Whereby, a further compact design of the optical system can be achieved.

As in the present invention, when the first lens unit is constructed with two lens elements: the negative meniscus lens element and the positive meniscus lens element, arranged in this order from the object side, off-axis aberration, such as chromatic aberration, can be effectively corrected by a small number of lens elements.

In the imaging apparatus of a twenty-second aspect, it is desirable to satisfy the following conditions:

$$0.5 < R2/R3 < 1.2 \quad (12)$$

$$0 \leq D23/D14 < 0.2 \quad (13)$$

where R2 is a paraxial radius of curvature of the image-side surface of the negative meniscus lens element of the first lens unit, R3 is a paraxial radius of curvature of the object-side surface of the positive meniscus lens element of the first lens unit, D23 is air spacing, measured along the optical axis, from the image-side surface of the negative meniscus lens element to the object-side surface of the positive meniscus lens element in the first lens unit, and D14 is a length, measured along the optical axis, from the object-side surface of the negative meniscus lens element to the image-side surface of the positive meniscus lens element.

Condition (12) determines the ratio of the paraxial radius of curvature R2 of the image-side surface of the negative meniscus lens element of the first lens unit to the paraxial radius of curvature R3 of the object-side surface of the positive meniscus lens element of the first lens unit.

Condition (13) determines the ratio of the air spacing D23, measured along the optical axis, between the image-side surface of the negative meniscus lens element and the object-side surface of the positive meniscus lens element in the first lens unit to the length D14, measured along the optical axis, from the object-side surface of the negative meniscus lens element to the image-side surface of the positive meniscus lens element.

When the imaging apparatus satisfies Conditions (12) and (13), it is possible to downsize the optical system while ensuring performance of correction for aberration.

If the value of R2/R3 is beyond the upper limit of Condition (12), the object-side surface of the positive meniscus lens element becomes deep and aberration in the positive meniscus lens element is liable to be produced. In addition, it becomes difficult to decrease the thickness, along the optical axis, of the first lens unit. On the other hand, below the lower limit of Condition (12), the radius of curvature of the object-side surface of the negative meniscus lens element is reduced and correction for off-axis aberration becomes difficult.

If the value of D23/D14 is beyond the upper limit of Condition (13), the height of the incident ray of the off-axis light beam in the negative meniscus lens element is extremely increased and, with the negative meniscus shape such that the object-side surface is concave, correction for distortion becomes difficult. On the other hand, below the lower limit of Condition (13), the axial light beam extremely approaches the off-axis light beam at the entrance surface of the first lens unit and it becomes difficult to hold the balance of aberration between both beams.

Also, in the present invention, it is desirable that the lower limit of Condition (12) is set to 0.7. It is further desirable the lower limit is set to 0.8. It is more desirable that the lower limit is set to 0.9.

In the present invention, it is desirable that the upper limit of Condition (12) is set to 1.1. It is more desirable that the upper limit is set to 1.05.

It is further desirable that the imaging apparatus satisfies the following condition:

$$0 \leq D23/D14 < 0.1 \quad (13')$$

It is more desirable that the imaging apparatus satisfies the following condition:

$$0 \leq D23/D14 < 0.05 \quad (13'')$$

As in the present invention, when the first lens unit is constructed with a single cemented lens component, decentration between lens elements, in contrast with that between lens elements due to assembly in a lens frame, can be minimized. Consequently, the influence of aberration caused by the decentration can be suppressed and at the same time, the compact design of the first lens unit can be made favorable.

As in the present invention, when the refracting power of the first lens unit constructed with two lens elements: the negative meniscus lens element with a concave surface facing the object side and the positive meniscus lens element with a concave surface facing the object side, and the refracting power of the second lens unit constructed with two lens elements: the positive lens element with a convex surface facing the object side and the negative lens element, are made symmetrical about the stop, aberrations produced in the first lens unit and the second lens unit can be favorably corrected with a small number of lens elements.

As in the present invention, when a lens component constituting the third lens unit located far from the stop is constructed as the single positive meniscus lens component with a concave surface facing the object side, off-axis aberration can be favorably corrected in the main and an emerging light beam can be rendered nearly perpendicular at the same time.

More preferably, when the lens component constituting the third lens unit is constructed as a single lens element, a reduction of the overall length of the optical system and the compact design of the lens component constituting the third lens unit can be achieved.

As in the present invention, when a glass lens element is used for each of the lens units constituting the optical system to ensure the strength of the whole of the lens element and a material that is thin and has a high refractive index is used for an auxiliary lens element assembled in the glass lens element, the cemented lens component can be effectively rendered slim.

According to the imaging apparatus of a twenty-third aspect in the present invention, it is desirable that the imaging apparatus satisfies the following conditions:

$$0.05 \leq DC \leq 0.3 \text{ (mm)} \quad (14)$$

$$Ndc \geq 1.65 \quad (15)$$

$$|vdm-vdc|>6 \quad (16)$$

where DC is the thickness, measured along the optical axis, of a single body of the auxiliary lens element assembled in the glass lens element; Ndc is the refractive index, regarding the d line (587.56 nm), of the auxiliary lens element assembled in the glass lens element; vdm is the Abbe's number of the glass lens element; and vdc is the Abbe's number of the auxiliary lens element assembled in the glass lens element.

When Conditions (14), (15), and (16) are satisfied, the thickness of the cemented lens component having the glass lens element and the auxiliary lens element assembled in the glass lens element can be decreased and the length of the optical system can be reduced.

According to the present invention, since a surface profile effective for correction for aberration can be provided and the principal point can be located so as to be effective for the compact design, the optical system can be downsized.

If the value of DC is beyond the upper limit of Condition (14), the thickness of the cemented lens component will be increased, which is unfavorable. Below the lower limit of Condition (14), the cementation of the glass lens element to the auxiliary lens element becomes difficult, which is unfavorable.

If the value of Ndc is below the lower limit of Condition (15), the lens function of an air contact surface will be impaired or the difference in thickness between the middle and the edge of the lens element will be increased, which is unfavorable.

If the value of |vdm−vdc| is blow the lower limit of Condition (16), effective correction for chromatic aberration cannot be made, and the function of the cemented lens component cannot be completely exerted, which is unfavorable.

In the present invention, it is further desirable to satisfy the following condition:

$$0.10 \leq DC \leq 0.27 \text{ (mm)} \quad (14')$$

It is more desirable to satisfy the following condition:

$$0.15 \leq DC \leq 0.23 \text{ (mm)} \quad (14'')$$

In the present invention, it is further desirable to satisfy the following condition:

$$Ndc \geq 1.69 \quad (15')$$

It is more desirable to satisfy the following condition:

$$Ndc \geq 1.72 \quad (15'')$$

In the present invention, it is further desirable to satisfy the following condition:

$$|vdm-vdc|>10.0 \quad (16')$$

It is more desirable to satisfy the following condition:

$$|vdm-vdc|>13.0 \quad (16'')$$

As in the present invention, when the signs of the refracting powers of the glass lens element and the single body of the auxiliary lens element assembled in the glass lens element are reversed, the adjustment of aberrations, such as chromatic aberration, in the cemented lens component can be favorably made.

As in the present invention, when both the glass lens element and the auxiliary lens element assembled in the glass lens element are configured into meniscus shapes, a further slim design of the cemented lens component can be achieved.

As in the present invention, even when the first lens unit is constructed with the cemented lens component consisting of meniscus lens elements: the glass lens element and the auxiliary lens element assembled in the glass lens element, the glass lens element and the auxiliary lens element have mutually reverse refracting powers. Whereby, it is possible to facilitate the compact design and correction for chromatic aberration in the entire optical system while maintaining the small thickness of the cemented lens component.

According to the present invention, the first lens unit and the second lens unit can be arranged nearly symmetrically with respect to the stop. As a result, the peripheral lens performance can be made favorable.

According to the imaging apparatus of a twenty-fourth aspect in the present invention, it is desirable to satisfy the following condition:

$$1.4 \leq |r2R|/IH \leq 18.0 \quad (17)$$

When Condition (17) is satisfied, correction for aberration can be favorably made. If the value of |r 2R|/IH is beyond the upper limit of Condition (17), it becomes difficult to correct aberration in the second lens unit. Below the lower limit of Condition (17), the production of off-axis aberrations, such as curvature of field and distortion, in the second lens unit becomes pronounced and it becomes difficult to ensure good performance.

As in the present invention, it is further desirable to satisfy the following condition:

$$1.6 \leq |r2R|/IH \leq 15.0 \quad (17')$$

It is more desirable to satisfy the following condition:

$$1.75 \leq |r2R|/IH \leq 10.0 \quad (17'')$$

According to the imaging apparatus of a twenty-fifth aspect in the present invention, it is desirable to satisfy the following condition:

$$0.8 \leq fg2/f\,all \leq 5.5 \quad (18)$$

Condition (18) determines the ratio of the focal length f g2 of the second lens unit to the focal length f all of the entire photographing optical system. When Condition (18) is satisfied, favorable correction for aberration is obtained and a reduction of the overall length of the optical system can be achieved.

If the value of f g2/f all is beyond of the upper limit of Condition (18), the positive function of the second lens unit will be impaired, and thus the reduction of the overall length of the optical system becomes difficult. Consequently, the overall length of the optical system relating to the photographic image height to be used is increased. Below the lower limit of Condition (18), aberration in the second lens unit is liable to be produced. In order to suppress the production of the aberration, therefore, it is necessary to increase the number of lens elements and the reduction of the overall length of the optical system becomes difficult.

In the present invention, it is further desirable to satisfy the following condition:

$$1.0 \leq fg2/f\,all \leq 4.5 \quad (18')$$

It is more desirable to satisfy the following condition:

$$1.2 \leq fg2/f_{all} \leq 4.0 \tag{18''}$$

According to the imaging apparatus of a twenty-sixth aspect in the present invention, it is desirable to satisfy the following condition:

$$r2R/r3F \leq -1 \tag{19}$$

Condition (19) determines the ratio of the paraxial radius of curvature r 2R of the most image-side lens surface of the second lens unit to the paraxial radius of curvature r 3F of the most object-side lens surface of the third lens unit.

If the value of r 2R/r 3F is beyond the upper limit of Condition (19), the divergence of light rays at the exit surface of the second lens unit will be increased, and thus off-axis aberration is liable to be produced. Moreover, correction for spherical aberration due to the biconvex air lens provided between the second lens unit and the third lens unit becomes difficult.

In order to have the effect of correction for aberration on the exit surface of the second lens unit, it is good practice to provide Condition (19) with the lower limit and to satisfy the following condition:

$$-25.0 \leq r2R/r3F \leq -1.0 \tag{19'}$$

In the present invention, it is further desirable to satisfy the following condition:

$$-15.0 \leq r2R/r3F \leq -1.01 \tag{19''}$$

It is more desirable to satisfy the following condition:

$$-8.0 \leq r2R/r3F \leq -2.0 \tag{19'''}$$

As in the present invention, when the most object-side lens surface of the third lens unit is configured as the concave surface and the most image-side lens surface is configured as the convex surface, the production of off-axis aberration at the entrance surface of the third lens unit can be obviated and at the same time, the power of the third lens unit can be strengthened. Hence, even though the third lens unit is constructed with a small number of lens elements, good performance can be easily ensured.

According to the imaging apparatus of a twenty-seventh aspect in the present invention, it is desirable to satisfy the following condition:

$$0.3 \leq |r3F|/IH \leq 2.5 \tag{20}$$

Condition (20) determines the ratio of the paraxial radius of curvature r 3F of the most object-side lens surface of the third lens unit to the maximum photographic image height IH which is a half of the diagonal length, in an effective imaging area, of the image sensor. When Condition (20) is satisfied, further favorable performance can be ensured.

If the value of |r 3F|/IH is beyond the upper limit of Condition (20), the radius of curvature of the most object-side lens surface of the third lens unit becomes large. Consequently, correction for spherical aberration is impaired and a reduction of the overall length of the optical system becomes difficult. Below the lower limit of Condition (20), the radius of curvature of the most object-side lens surface of the third lens unit become small, the positive power of the image-side lens surface of the third lens unit must be made stronger than in the object-side lens surface. This indicates the necessity of increasing the number of lens elements constituting the third lens unit in order to obtain favorable performance.

In the present invention, it is further desirable to satisfy the following condition:

$$0.5 \leq |r3F|/IH \leq 2.0 \tag{20'}$$

It is more desirable to satisfy the following condition:

$$0.7 \leq |r3F|/IH \leq 1.2 \tag{20''}$$

As in the present invention, when the third lens unit has aspherical surfaces configured so that the positive power moderates progressively in going from the lens center to the periphery, distortion can be effectively corrected.

When the third lens unit is constructed with a single positive meniscus lens component with a concave surface facing the object side, the overall length of the optical system can be further reduced.

According to the imaging apparatus of a twenty-eighth aspect in the present invention, it is desirable to satisfy the following condition:

$$0.6 \leq |r1F|/IH \leq 4.0 \tag{21}$$

Condition (21) determines the ratio of the absolute value |r 1F| of the paraxial radius of curvature of the most object-side lens surface of the first lens unit to the maximum photographic image height IH which is a half of the diagonal length, in an effective imaging area, of the image sensor.

When Condition (21) is satisfied, the lens diameter is downsized so that the overall length of the optical system can be reduced, and aberration can easily be corrected.

Moreover, when the first lens unit is constructed with no more than two lens elements, a further compact design of the optical system can be attained.

If the value of |r 1F|/IH is beyond the upper limit of Condition (21), the position of the entrance pupil becomes liable to be shifted to the image side, and hence it becomes difficult to reduce the outer diameter of the entrance-side lens element. On the other hand, below the lower limit of Condition (21), the back focus is extremely increased and thus it becomes difficult to reduce the overall length of the optical system.

In the present invention, it is further desirable to satisfy the following condition:

$$0.8 \leq |r1F|/IH \leq 3.0 \tag{21'}$$

It is more desirable to satisfy the following condition:

$$0.9 \leq |r1F|/IH \leq 1.5 \tag{21''}$$

As in the present invention, when the second lens unit is constructed with two lens elements, the optical system can be downsized.

When the most object-side lens surface of the second lens unit is configured as a convex surface and the most image-side lens surface is configured as a concave surface, aberrations, notably coma, astigmatism, and distortion, can be effectively corrected, and chromatic aberration can be favorably corrected.

As in the present invention, when the second lens unit is constructed with the cemented lens component consisting of two lens elements to include, in order from the object side toward the image side, the first lens element with positive refracting power and the second lens element with negative refracting power, the overall lens length can be reduced.

The degradation of performance produced by decentration between the first lens element with positive refracting power and the second lens element with negative refracting power can be kept to a minimum.

According to the imaging apparatus of a twenty-ninth aspect in the present invention, it is desirable to satisfy the following condition:

$$|IH/EP| \leq 0.455 \tag{22}$$

Condition (22) determines the ratio of the maximum photographic image height IH which is a half of the diagonal length, in an effective imaging area, of the image sensor to the distance EP from the exit pupil of the photographing optical system to the imaging surface.

When Condition (22) is satisfied, the amount of marginal light can be ensured.

If the value of |IH/EP| is beyond the upper limit or below the lower limit of Condition (22), the influence of shading is liable to be exerted on the periphery of the image.

It is more desirable to satisfy the following condition:

$$-0.1 \leq |IH/EP| \leq 0.455 \quad (22')$$

By satisfying Condition (22'), an enlargement of the lens diameter of the third lens unit can be obviated.

Since each lens unit is constructed with two or less lens element as in the present invention, the imaging apparatus having the optical system with a small number of lens elements can be constructed.

According to the imaging apparatus of a thirtieth aspect in the present invention, it is desirable to satisfy the following condition:

$$2.5 < TL/IH < 4.1 \quad (23)$$

Condition (23) determines the ratio of the distance TL, measured along the optical axis, between the entrance surface of the first lens unit and the imaging surface to the maximum photographic image height IH which is a half of the diagonal length, in an effective imaging area, of the image sensor.

By satisfying Condition (23), the imaging optical system can be downsized and favorable correction for aberration can be performed.

If the value of TL/IH is beyond the upper limit of Condition (23), the overall length of the optical system will be increased, and therefore it become hard to downsize the imaging apparatus. On the other hand, below the lower limit of Condition (23), the overall length of the optical system can be reduced, but correction for aberration becomes difficult.

According to the imaging apparatus of a thirty-first aspect in the present invention, it is desirable to satisfy the following condition:

$$0.03 < TS/TL < 0.4 \quad (24)$$

Condition (24) determines the ratio of the sum TS of lengths of air spacings, measured along the optical axis, between the entrance surface of the first lens unit and the exit surface of the third lens unit to the distance TL, measured along the optical axis, from the entrance surface of the first lens unit to the imaging surface.

When Condition (24) is satisfied, the imaging optical system can be downsized and favorable correction for aberration can be made.

If the value of TS/TL is beyond the upper limit of Condition (24), the lengths of air spacings, measured along the optical axis, from the entrance surface of the first lens unit to the exit surface of the third lens unit will be increased, and thus it becomes difficult to downsize the photographing optical system. Below the lower limit of Condition (24), it becomes difficult to correct aberration by air lenses between the first lens unit and the second lens unit and between the second lens unit and the third lens unit.

In the present invention, it is further desirable to satisfy the following condition:

$$0.05 < TS/TL < 0.3 \quad (24')$$

It is more desirable to satisfy the following condition:

$$0.07 < TS/TL < 0.25 \quad (24'')$$

In each of the above conditions, the upper limit alone, or the lower limit alone, may be set to a more favorable value.

In accordance with the drawings, the embodiments of the present invention will be described below.

First Embodiment

FIG. 1 shows the optical arrangement of the first embodiment of the imaging apparatus according to the present invention. FIGS. 2A-2D diagrammatically show spherical aberration, astigmatism, distortion, and chromatic aberration of magnification, respectively, in infinite object point focusing of the imaging apparatus of the first embodiment.

An imaging apparatus 1 of the first embodiment, as shown in FIG. 1, comprises, in order from the object side toward the image side, a photographing optical system including a first lens unit G1, an aperture stop S, a second lens unit G2, and a third lens unit G3; a plane-parallel optical low-pass filter LF; and an image sensor (a CCD) having a cover glass CG and an imaging surface I and converting an optical image into an electric signal, located on the image side.

The first lens unit G1 is constructed with a cemented lens component consisting of a negative lens element L11 and a positive lens element L12. The second lens unit G2 is constructed with a cemented lens component consisting of a positive lens element L21 and a negative lens element L22. The third lens unit G3 is constructed with a single lens element L31 molded out of plastic.

Subsequently, numerical data of optical members constituting the imaging apparatus of the first embodiment are shown below.

Here, in the numerical data, $r_1$, $r_2$, . . . represent radii of curvature (mm) of surfaces of individual optical members; $d_1$, $d_2$, . . . represent thicknesses of individual optical members or spacings (mm) between them; $n_{d1}$, $n_{d2}$, . . . represent refractive indices at a wavelength (587.6 nm) of the d line of individual optical members; and $v_{d1}$, $v_{d2}$, . . . represent Abbe's numbers at a wavelength (587.6 nm) of the d line of individual optical members. Also, f denotes the focal length of the entire system.

When z is taken as the coordinate in the direction of the optical axis, y is taken as the coordinate normal to the optical axis, r represents the radius of curvature of each optical member, k represents a conic constant, and $A_4$, $A_6$, $A_8$, and $A_{10}$ represent aspherical coefficients, the configuration of the aspherical surface rotationally symmetrical about the optical axis is expressed by the following equation:

$$z = (y^2/r)/[1+\{1-(1+k)(y/r)^2\}^{1/2}] + A_4 y^4 + A_6 y^6 + A_8 y^8 + A_{10} y^{10}$$

These symbols hold for the numerical data of the embodiments to be described later.

Numerical Data 1

Focal length f: 6.426 mm, Fno: 3.360, Image height: 3.60 mm, Half angle of view (ω): 29.25°

| | | | |
|---|---|---|---|
| $r_1 = -3.695$ | $d_1 = 0.800$ | $n_{d1} = 1.61772$ | $v_{d1} = 49.81$ |
| $r_2 = 123.439$ | $d_2 = 1.850$ | $n_{d2} = 1.72916$ | $v_{d2} = 54.68$ |
| $r_3 = -4.694$ | $d_3 = 0.160$ | | |
| $r_4 = \infty$ (stop) | $d_4 = 0.000$ | | |
| $r_5 = 4.367$ | $d_5 = 3.050$ | $n_{d5} = 1.69680$ | $v_{d5} = 55.53$ |
| $r_6 = -3.985$ | $d_6 = 0.800$ | $n_{d6} = 1.69895$ | $v_{d5} = 30.13$ |
| $r_7 = 10.562$ | $d_7 = 1.200$ | | |
| $r_8 = -2.803$ (aspherical surface) | $d_8 = 2.000$ | $n_{d8} = 1.52542$ | $v_{d5} = 55.78$ |
| $r_9 = -2.985$ (aspherical surface) | $d_9 = 0.195$ | | |
| $r_{10} = \infty$ | $d_{10} = 0.760$ | $n_{d10} = 1.54771$ | $v_{d10} = 62.84$ |

-continued

Focal length f: 6.426 mm, Fno: 3.360, Image height: 3.60 mm,
Half angle of view (ω): 29.25°

$r_{11} = \infty$       $d_{11} = 0.600$
$r_{12} = \infty$       $d_{12} = 0.500$   $n_{d12} = 1.51633$   $v_{d10} = 64.14$
$r_{13} = \infty$ (imaging surface)

Aspherical Coefficients

| Face No. | k | $A_4$ | $A_6$ | $A_8$ | $A_{10}$ |
|---|---|---|---|---|---|
| 8 | 0 | $-8.4751 \times 10^{-3}$ | $2.6140 \times 10^{-3}$ | $-3.6971 \times 10^{-4}$ | 0 |
| 9 | 0 | $4.5096 \times 10^{-3}$ | $5.4042 \times 10^{-4}$ | $6.2047 \times 10^{-5}$ | 0 |

Second Embodiment

Figure 3:
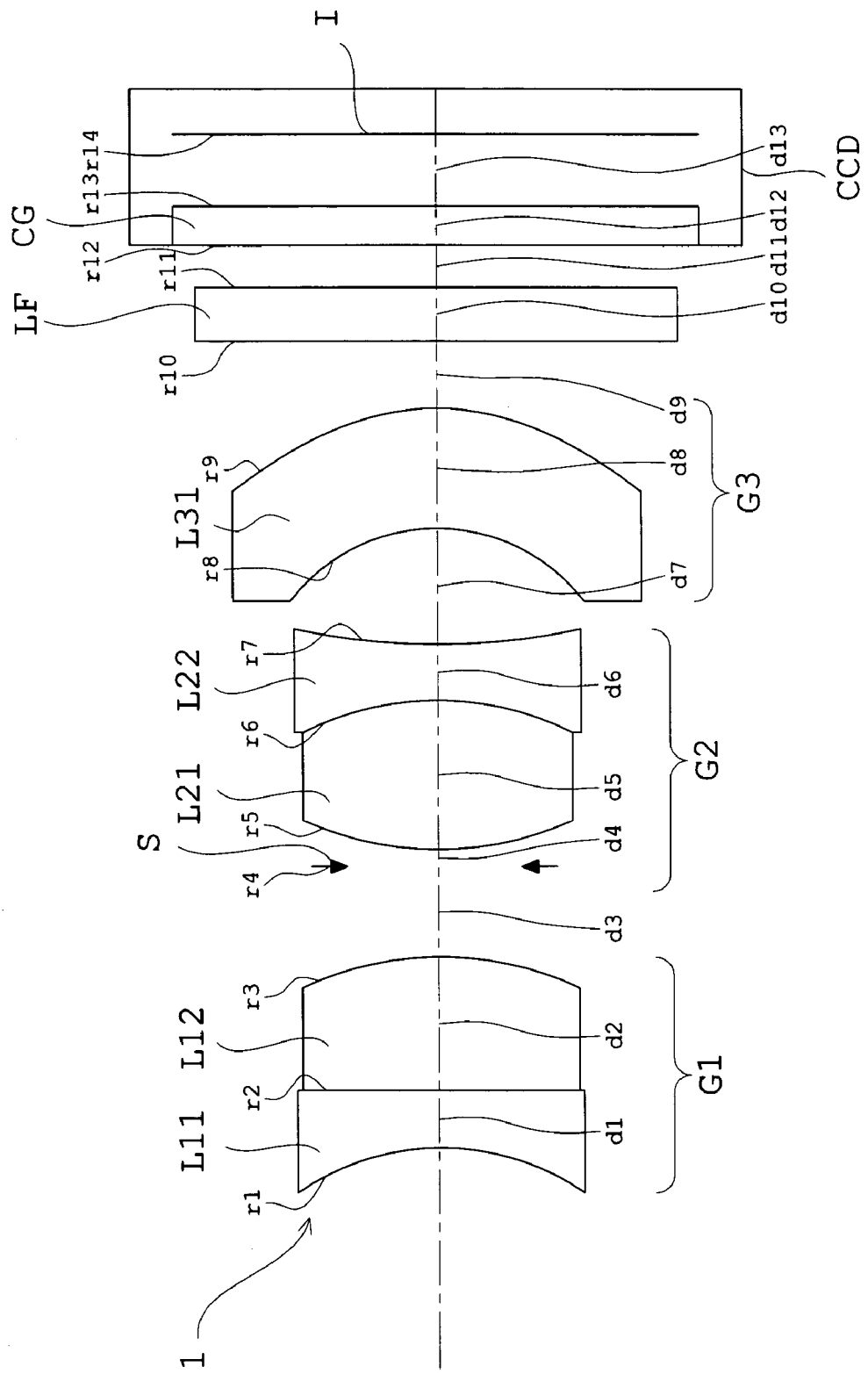
FIG. 3 is a sectional view showing an optical arrangement, developed along the optical axis, of a second embodiment of the imaging apparatus according to the present invention.
Figure 4:
FIGS. 4A, 4B, 4C, and 4D are diagrams showing spherical aberration, astigmatism, distortion, and chromatic aberration of magnification, respectively, in infinite focusing of the imaging apparatus in the second embodiment.

FIG. 3 shows the optical arrangement of the second embodiment of the imaging apparatus according to the present invention. FIGS. 4A-4D diagrammatically show spherical aberration, astigmatism, distortion, and chromatic aberration of magnification, respectively, in infinite object point focusing of the imaging apparatus of the second embodiment.

The imaging apparatus 1 of the second embodiment shown in FIG. 3, like the imaging apparatus 1 of the first embodiment, comprises, in order from the object side toward the image side, the photographing optical system including the first lens unit G1, the aperture stop S, the second lens unit G2, and the third lens unit G3; the low-pass filter LF; and the image sensor (the CCD) having the cover glass CG and the imaging surface I and converting the optical image into the electric signal, located on the image side.

The first lens unit G1 is constructed with the cemented lens component consisting of the negative lens element L11 and the positive lens element L12. The second lens unit G2 is constructed with the cemented lens component consisting of the positive lens element L21 and the negative lens element L22. The third lens unit G3 is constructed with a single aspherical lens element L31 made of glass.

Subsequently, numerical data of optical members constituting the imaging apparatus of the second embodiment are shown below.

Numerical Data 2

Focal length f: 6.578 mm, Fno: 2.863, Image height: 3.60 mm,
Half angle of view (ω): 29.35°

$r_1 = -4.010$     $d_1 = 0.700$    $n_{d1} = 1.60562$   $v_{d1} = 43.70$
$r_2 = 25.258$     $d_2 = 1.700$    $n_{d2} = 1.88300$   $v_{d2} = 40.76$
$r_3 = -5.757$     $d_3 = 1.176$
$r_4 = \infty$ (stop)  $d_4 = 0.300$
$r_5 = 6.158$      $d_5 = 2.300$    $n_{d5} = 1.78590$   $v_{d5} = 44.20$ -continued Focal length f: 6.578 mm, Fno: 2.863, Image height: 3.60 mm,
Half angle of view (ω): 29.35°

$r_6 = -4.335$     $d_6 = 0.700$    $n_{d6} = 1.80810$   $v_{d6} = 22.76$
$r_7 = 17.438$     $d_7 = 1.700$
$r_8 = -3.139$     $d_8 = 1.700$    $n_{d8} = 1.80610$   $v_{d8} = 40.92$
$r_9 = -3.001$     $d_9 = 1.330$
(aspherical surface)
$r_{10} = \infty$    $d_{10} = 0.760$  $n_{d10} = 1.54771$  $v_{d10} = 62.84$
$r_{11} = \infty$    $d_{11} = 0.600$
$r_{12} = \infty$    $d_{12} = 0.500$  $n_{d12} = 1.51633$  $v_{d12} = 64.14$
$r_{13} = \infty$    $d_{13} = 0.999$
$r_{14} = \infty$ (imaging surface)

Aspherical Coefficients

| Face No. | k | $A_4$ | $A_6$ | $A_8$ | $A_{10}$ | $A_{12}$ | $A_{14}$ |
|---|---|---|---|---|---|---|---|
| 9 | 0 | $4.5351 \times 10^{-3}$ | $-1.7689 \times 10^{-4}$ | $1.6590 \times 10^{-4}$ | $-2.5105 \times 10^{-5}$ | $2.0021 \times 10^{-6}$ | 0 |

Third Embodiment

Figure 5:
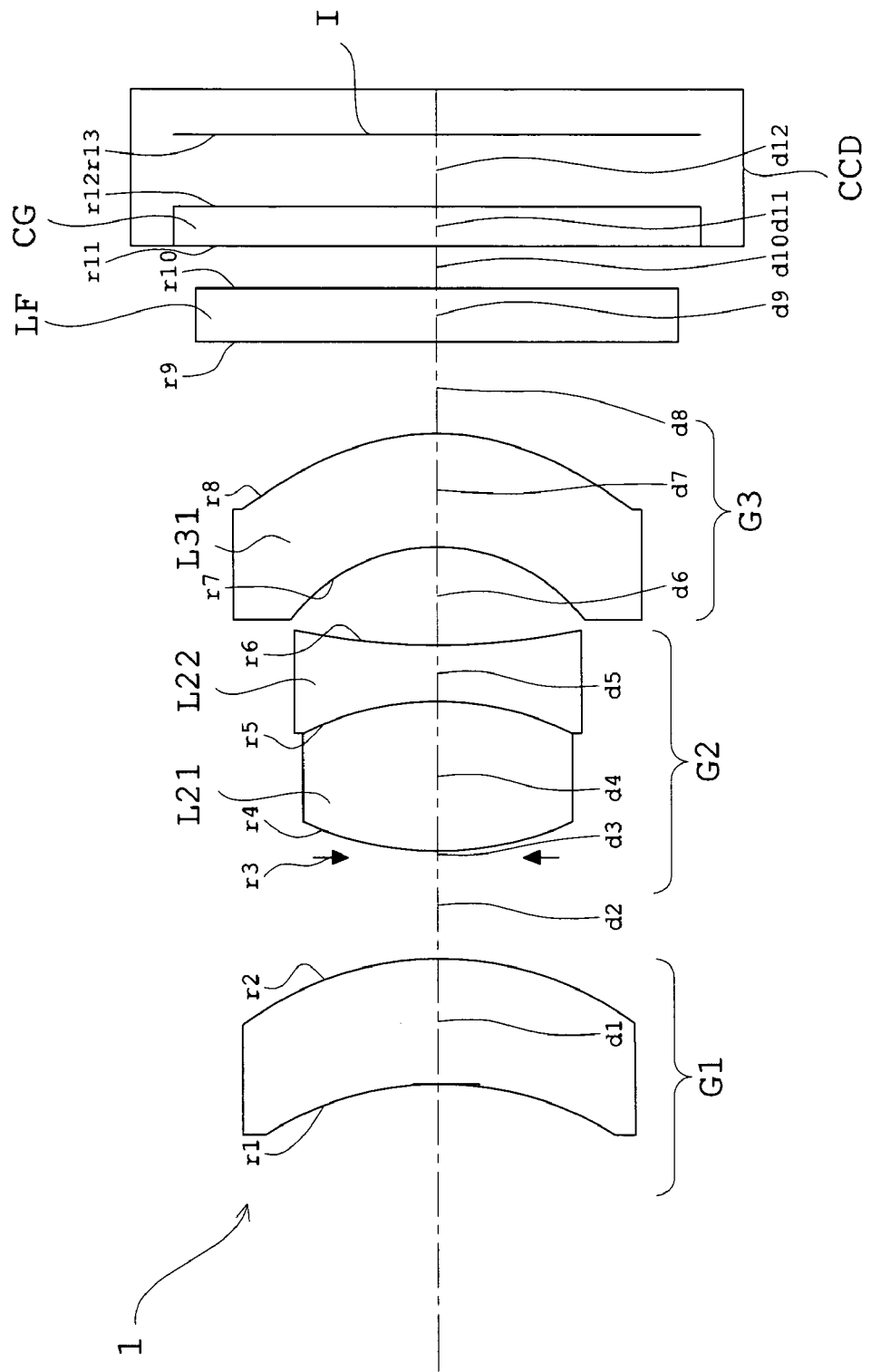
FIG. 5 is a sectional view showing an optical arrangement, developed along the optical axis, of a third embodiment of the imaging apparatus according to the present invention.

FIG. 5 shows the optical arrangement of the third embodiment of the imaging apparatus according to the present invention. FIGS. 6A-6D diagrammatically show spherical aberration, astigmatism, distortion, and chromatic aberration of magnification, respectively, in infinite object point focusing of the imaging apparatus of the third embodiment.

The imaging apparatus 1 of the third embodiment shown in FIG. 5, like the imaging apparatus 1 of the first embodiment, comprises, in order from the object side toward the image side, the photographing optical system including the first lens unit G1, the aperture stop S, the second lens unit G2, and the third lens unit G3; the low-pass filter LF; and the image sensor (the CCD) having the cover glass CG and the imaging surface I and converting the optical image into the electric signal, located on the image side.

The first lens unit G1 is constructed with the single meniscus lens element L11 with positive power. The second lens unit G2 is constructed with the cemented lens component consisting of the positive lens element L21 and the negative lens element L22. The third lens unit G3 is constructed with the single aspherical lens element made of glass.

Subsequently, numerical data of optical members constituting the imaging apparatus of the third embodiment are shown below.

Numerical Data 3

Focal length f: 6.199 mm, Fno: 2.855, Image height: 3.60 mm, Half angle of view (ω): 30.45°

| | | | |
|---|---|---|---|
| $r_1 = -3.972$ (aspherical surface) | $d_1 = 1.800$ | $n_{d1} = 1.80610$ | $v_{d1} = 40.92$ |
| $r_2 = -3.474$ | $d_2 = 1.000$ | | |
| $r_3 = \infty$ (stop) | $d_3 = 0.000$ | | |
| $r_4 = 8.414$ | $d_4 = 2.300$ | $n_{d4} = 1.88300$ | $v_{d4} = 40.76$ |
| $r_5 = -3.900$ | $d_5 = 0.700$ | $n_{d5} = 1.80810$ | $v_{d5} = 22.76$ |
| $r_6 = 8.308$ | $d_6 = 1.300$ | | |
| $r_7 = -3.133$ | $d_7 = 1.700$ | $n_{d7} = 1.80610$ | $v_{d7} = 40.92$ |
| $r_8 = -2.787$ (aspherical surface) | $d_8 = 1.693$ | | |
| $r_9 = \infty$ | $d_9 = 0.760$ | $n_{d9} = 1.54771$ | $v_{d9} = 62.84$ |
| $r_{10} = \infty$ | $d_{10} = 0.600$ | | |
| $r_{11} = \infty$ | $d_{11} = 0.500$ | $n_{d11} = 1.51633$ | $v_{d11} = 64.14$ |
| $r_{12} = \infty$ | $d_{12} = 1.000$ | | |
| $r_{13} = \infty$ (imaging surface) | | | |

Aspherical Coefficients

| Face No. | k | $A_4$ | $A_6$ | $A_8$ | $A_{10}$ | $A_{12}$ | $A_{14}$ | $A_{16}$ |
|---|---|---|---|---|---|---|---|---|
| 1 | 0 | $-4.9641 \times 10^{-3}$ | $-1.3883 \times 10^{-4}$ | $-9.0582 \times 10^{-5}$ | 0 | $-1.0789 \times 10^{-5}$ | $8.1313 \times 10^{-7}$ | 0 |
| 8 | 0 | $4.0516 \times 10^{-3}$ | $4.8262 \times 10^{-4}$ | $-1.3587 \times 10^{-4}$ | $6.3935 \times 10^{-5}$ | | | |

Fourth Embodiment

Figure 7:
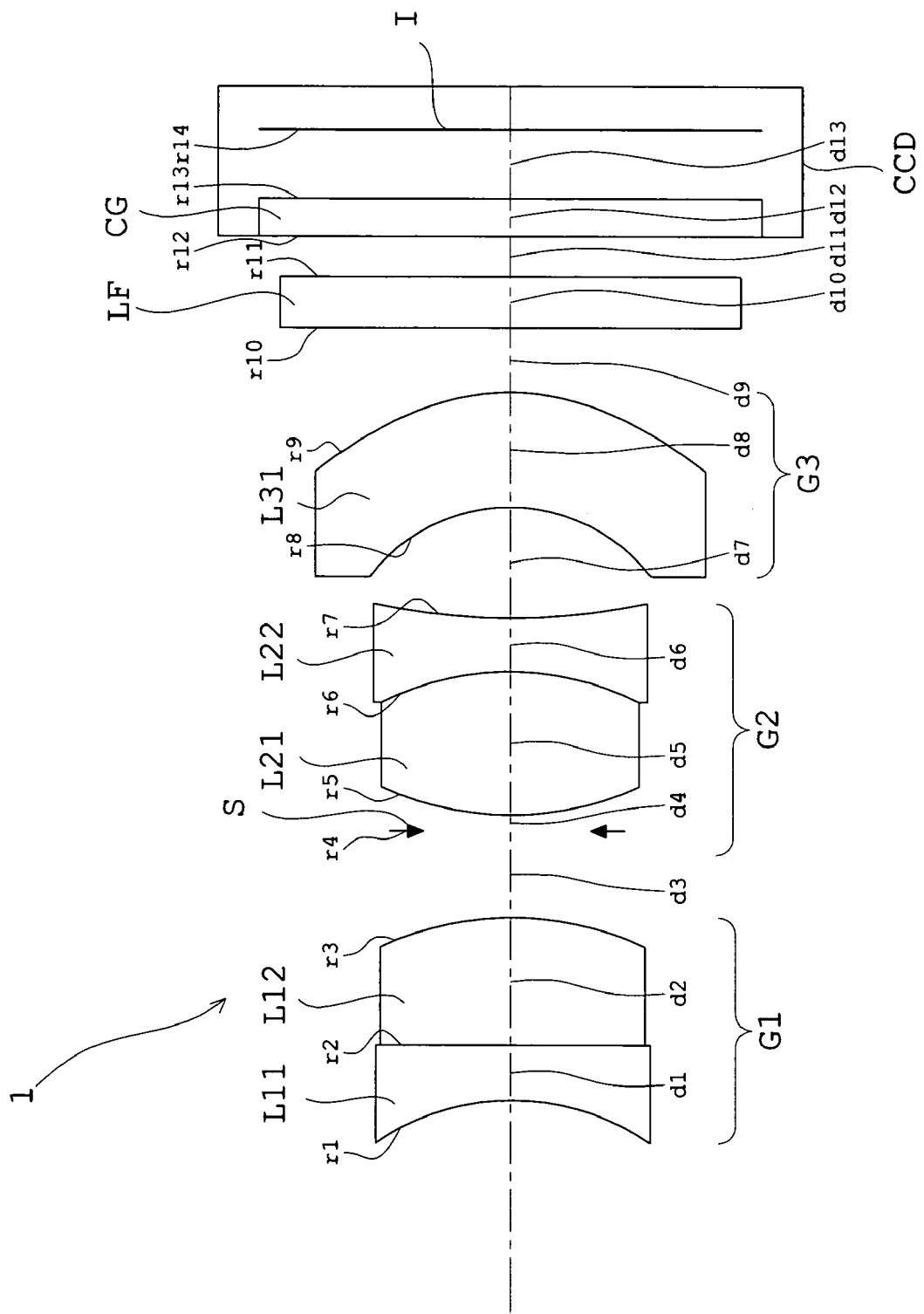
FIG. 7 is a sectional view showing an optical arrangement, developed along the optical axis, of a fourth embodiment of the imaging apparatus according to the present invention.
Figure 8:
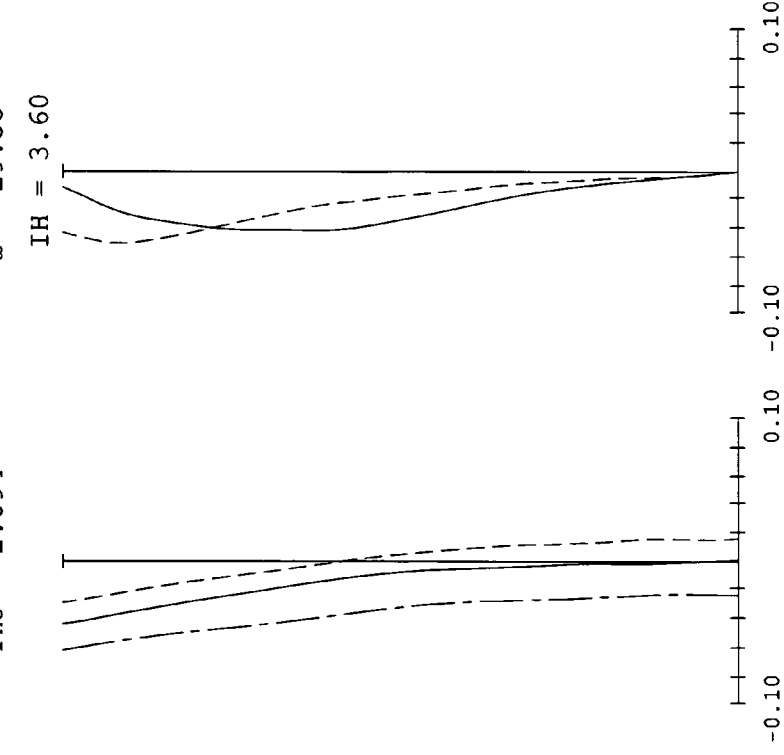
FIGS. 8A, 8B, 8C, and 8D are diagrams showing spherical aberration, astigmatism, distortion, and chromatic aberration of magnification, respectively, in infinite focusing of the imaging apparatus in the fourth embodiment.

FIG. 7 shows the optical arrangement of the fourth embodiment of the imaging apparatus according to the present invention. FIGS. 8A-8D diagrammatically show spherical aberration, astigmatism, distortion, and chromatic aberration of magnification, respectively, in infinite object point focusing of the imaging apparatus of the fourth embodiment.

The imaging apparatus 1 of the fourth embodiment shown in FIG. 7, like the imaging apparatus 1 of the first embodiment, comprises, in order from the object side toward the image side, the photographing optical system including the first lens unit G1, the aperture stop S, the second lens unit G2, and the third lens unit G3; the low-pass filter LF; and the image sensor (the CCD) having the cover glass CG and the imaging surface I and converting the optical image into the electric signal, located on the image side.

The first lens unit G1 is constructed with the cemented lens component consisting of the negative lens element L11 and the positive lens element L12. The second lens unit G2 is constructed with the cemented lens component consisting of the positive lens element L21 and the negative lens element L22. The third lens unit G3 is constructed with the single aspherical lens element made of glass.

Subsequently, numerical data of optical members constituting the imaging apparatus of the fourth embodiment are shown below.

Numerical Data 4

Focal length f: 6.336 mm, Fno: 2.894, Image height: 3.60 mm, Half angle of view (ω): 29.35°

| | | | |
|---|---|---|---|
| $r_1 = -3.982$ | $d_1 = 0.700$ | $n_{d1} = 1.70000$ | $v_{d1} = 48.08$ |
| $r_2 = 20.468$ | $d_2 = 1.700$ | $n_{d2} = 1.88300$ | $v_{d2} = 40.76$ |
| $r_3 = -5.387$ | $d_3 = 1.000$ | | |
| $r_4 = \infty$ (stop) | $d_4 = 0.000$ | | |
| $r_5 = 5.542$ | $d_5 = 2.300$ | $n_{d5} = 1.78590$ | $v_{d5} = 44.20$ |
| $r_6 = -4.441$ | $d_6 = 0.700$ | $n_{d6} = 1.80810$ | $v_{d6} = 22.76$ |
| $r_7 = 16.832$ | $d_7 = 1.700$ | | |
| $r_8 = -3.019$ | $d_8 = 1.700$ | $n_{d8} = 1.80610$ | $v_{d8} = 40.92$ |
| $r_9 = -3.000$ (aspherical surface) | $d_9 = 1.266$ | | |
| $r_{10} = \infty$ | $d_{10} = 0.760$ | $n_{d10} = 1.54771$ | $v_{d10} = 62.84$ |
| $r_{11} = \infty$ | $d_{11} = 0.600$ | | |
| $r_{12} = \infty$ | $d_{12} = 0.500$ | $n_{d12} = 1.51633$ | $v_{d12} = 64.14$ |
| $r_{13} = \infty$ | $d_{13} = 1.000$ | | |
| $r_{14} = \infty$ (imaging surface) | | | |

Aspherical Coefficients

| Face No. | k | $A_4$ | $A_6$ | $A_8$ | $A_{10}$ | $A_{12}$ | $A_{14}$ |
|---|---|---|---|---|---|---|---|
| 9 | 0 | $4.1051 \times 10^{-3}$ | $2.1754 \times 10^{-4}$ | $4.2309 \times 10^{-5}$ | $-5.5958 \times 10^{-6}$ | $8.6307 \times 10^{-7}$ | 0 |

Fifth Embodiment

Figure 9:
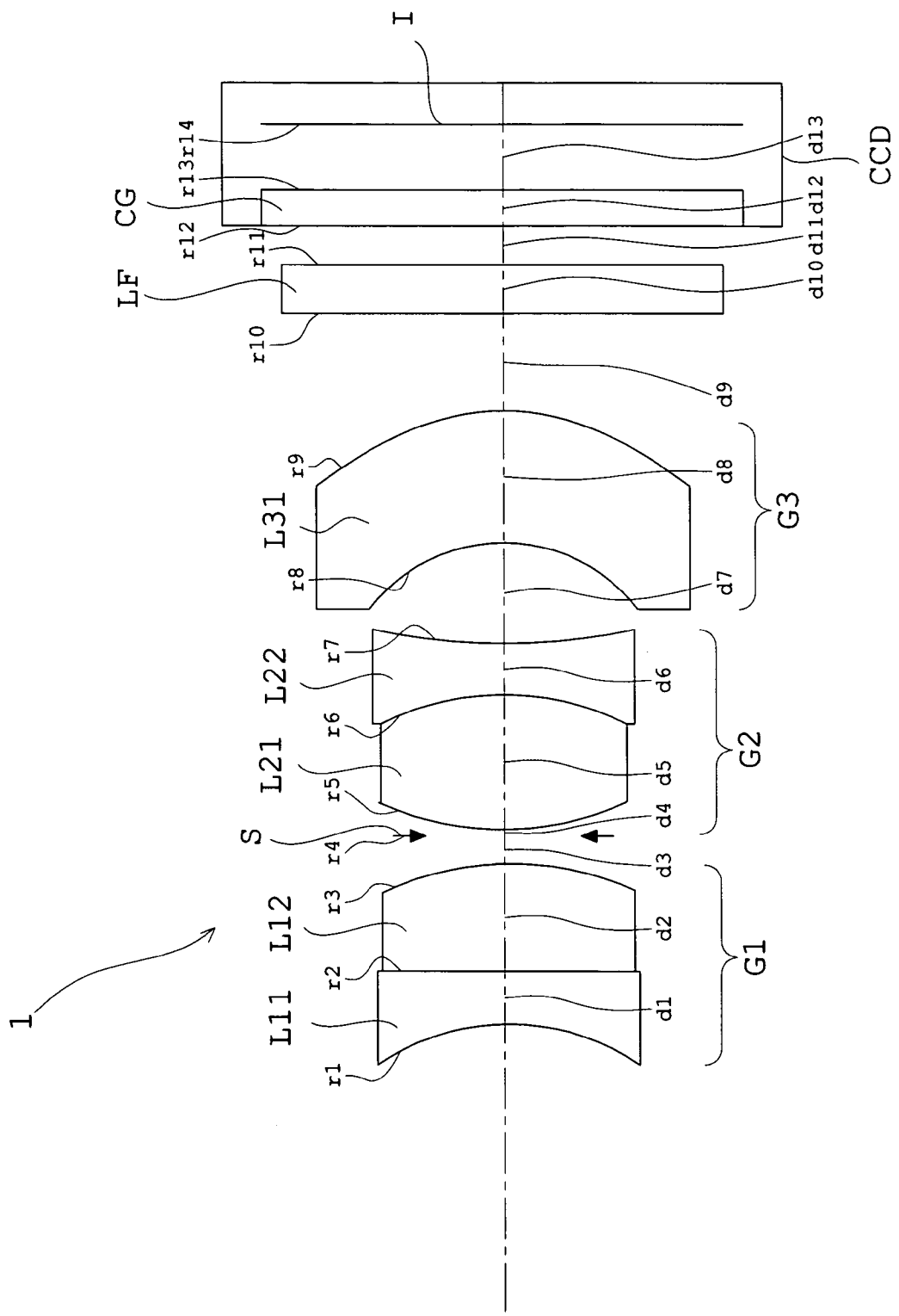
FIG. 9 is a sectional view showing an optical arrangement, developed along the optical axis, of a fifth embodiment of the imaging apparatus according to the present invention.
Figure 10:
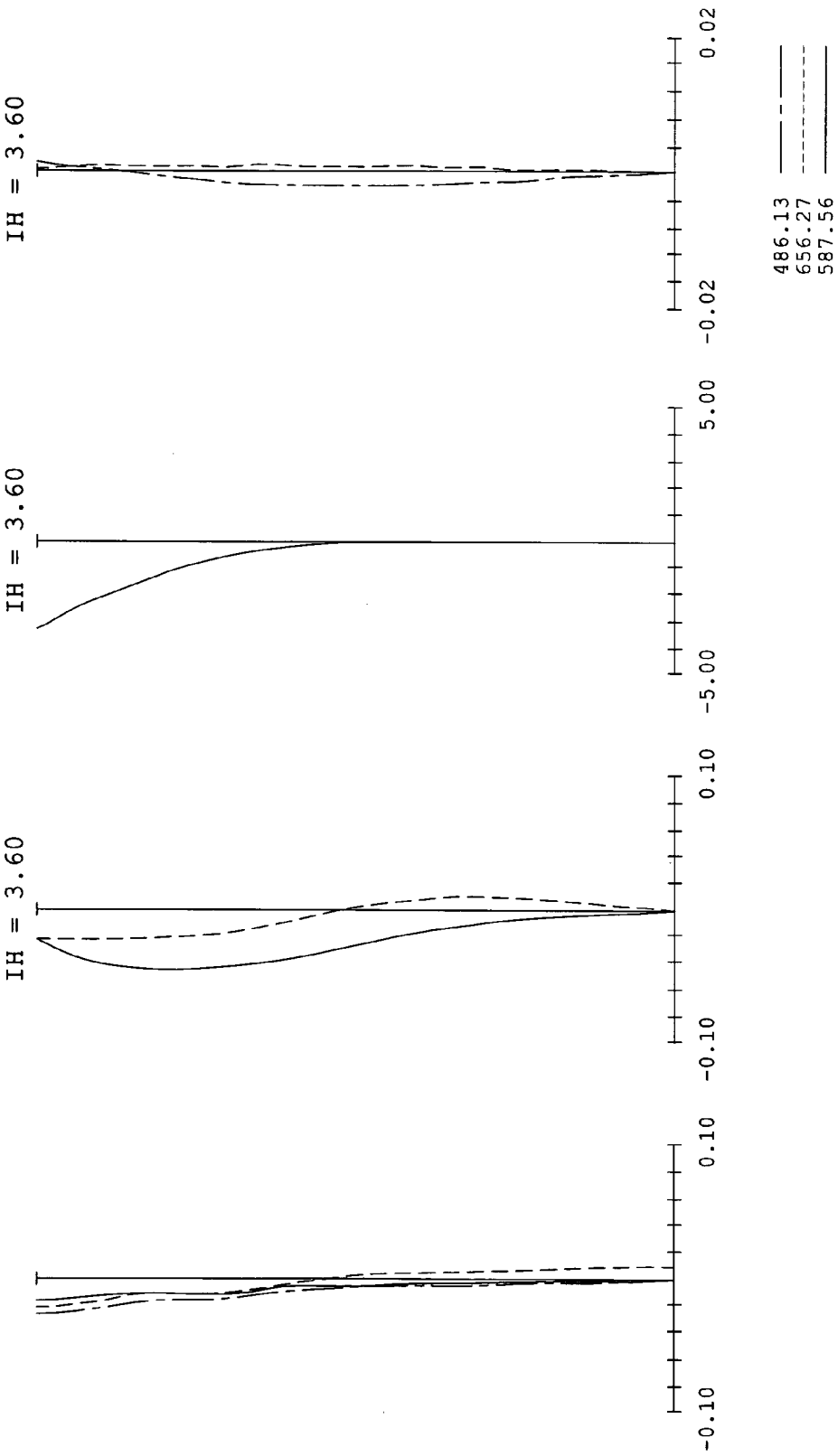
FIGS. 10A, 10B, 10C, and 10D are diagrams showing spherical aberration, astigmatism, distortion, and chromatic aberration of magnification, respectively, in infinite focusing of the imaging apparatus in the fifth embodiment.

FIG. 9 shows the optical arrangement of the fifth embodiment of the imaging apparatus according to the present invention. FIGS. 10A-10D diagrammatically show spherical aberration, astigmatism, distortion, and chromatic aberration of magnification, respectively, in infinite object point focusing of the imaging apparatus of the fifth embodiment.

The imaging apparatus 1 of the fifth embodiment shown in FIG. 9, like the imaging apparatus 1 of the first embodiment, comprises, in order from the object side toward the image side, the photographing optical system including the first lens unit G1, the aperture stop S, the second lens unit G2, and the third lens unit G3; the low-pass filter LF; and the image sensor (the CCD) having the cover glass CG and the imaging surface I and converting the optical image into the electric signal, located on the image side.

The first lens unit G1 is constructed with the cemented lens component consisting of the negative lens element L11 and the positive lens element L12. The second lens unit G2 is constructed with the cemented lens component consisting of the positive lens element L21 and the negative lens element L22. The third lens unit G3 is constructed with the single aspherical lens element made of glass.

Subsequently, numerical data of optical members constituting the imaging apparatus of the fifth embodiment are shown below.

Numerical Data 5

| Focal length f: 6.491 mm, Fno: 3.460, Image height: 3.60 mm, Half angle of view (ω): 29.80° | | | |
|---|---|---|---|
| $r_1 = -3.687$ | $d_1 = 0.800$ | $n_{d1} = 1.48749$ | $v_{d1} = 70.23$ |
| $r_2 = 41.441$ | $d_2 = 1.650$ | $n_{d2} = 1.73400$ | $v_{d2} = 51.47$ |
| $r_3 = -4.858$ | $d_3 = 0.300$ | | |
| $r_4 = \infty$ (stop) | $d_4 = 0.050$ | | |
| $r_5 = 5.184$ | $d_5 = 2.000$ | $n_{d5} = 1.69350$ | $v_{d5} = 53.21$ |
| $r_6 = -2.650$ | $d_6 = 0.800$ | $n_{d6} = 1.69895$ | $v_{d6} = 30.13$ |
| $r_7 = 11.495$ | $d_7 = 1.142$ | | |
| $r_8 = -3.089$ | $d_8 = 2.000$ | $n_{d8} = 1.69350$ | $v_{d8} = 53.21$ |
| $r_9 = -3.110$ | $d_9 = 1.644$ | | |
| (aspherical surface) | | | |
| $r_{10} = \infty$ | $d_{10} = 0.760$ | $n_{d10} = 1.54771$ | $v_{d10} = 62.84$ |
| $r_{11} = \infty$ | $d_{11} = 0.600$ | | |
| $r_{12} = \infty$ | $d_{12} = 0.500$ | $n_{d12} = 1.51633$ | $v_{d12} = 64.14$ |
| $r_{13} = \infty$ | $d_{13} = 1.000$ | | |
| $r_{14} = \infty$ (imaging surface) | | | |

Aspherical Coefficients

| Face No. | k | $A_4$ | $A_6$ | $A_8$ | $A_{10}$ |
|---|---|---|---|---|---|
| 9 | 0 | $4.2987 \times 10^{-3}$ | $8.9180 \times 10^{-5}$ | $4.0294 \times 10^{-5}$ | 0 |

Sixth Embodiment

Figure 11:
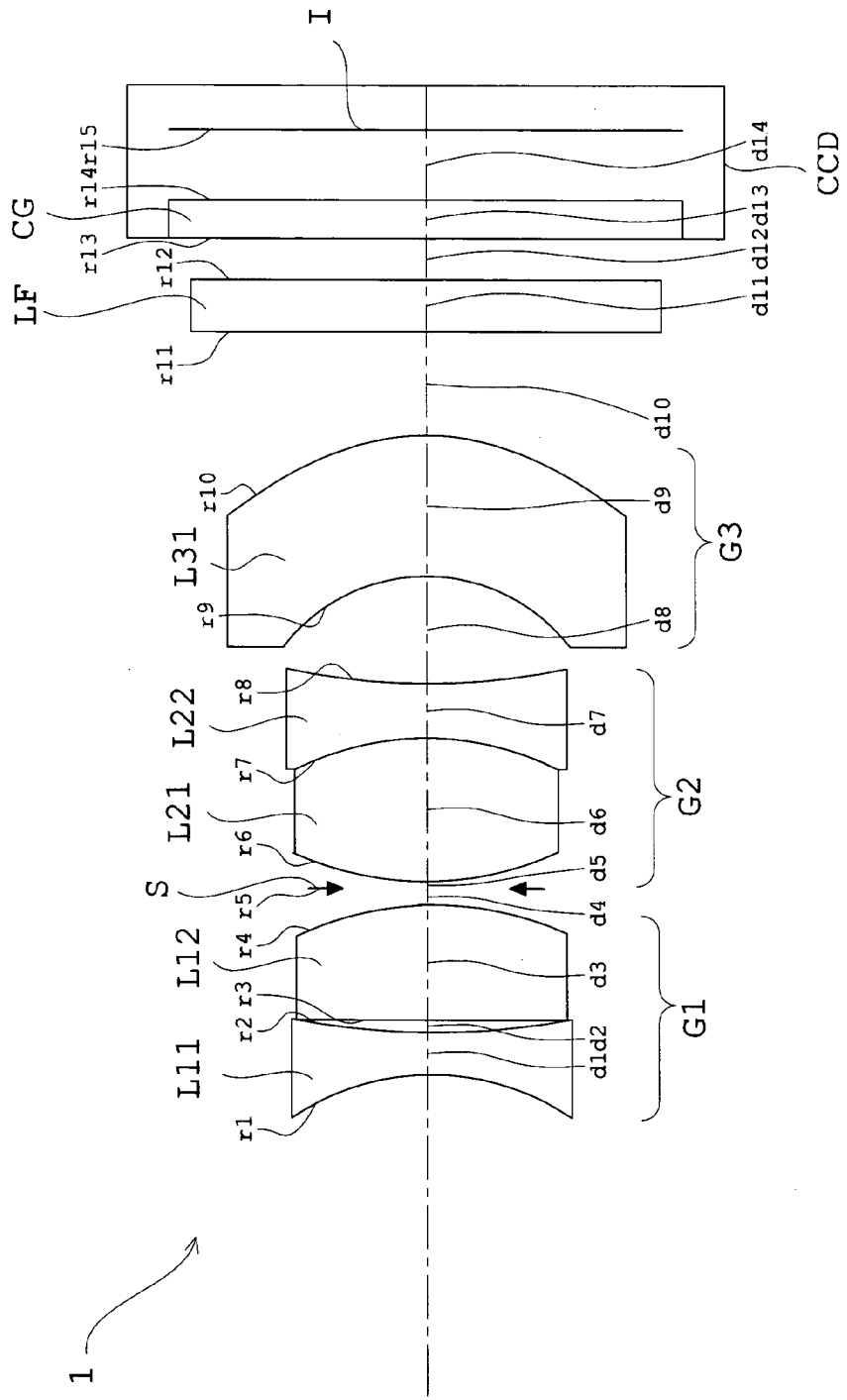
FIG. 11 is a sectional view showing an optical arrangement, developed along the optical axis, of a sixth embodiment of the imaging apparatus according to the present invention.
Figure 12:
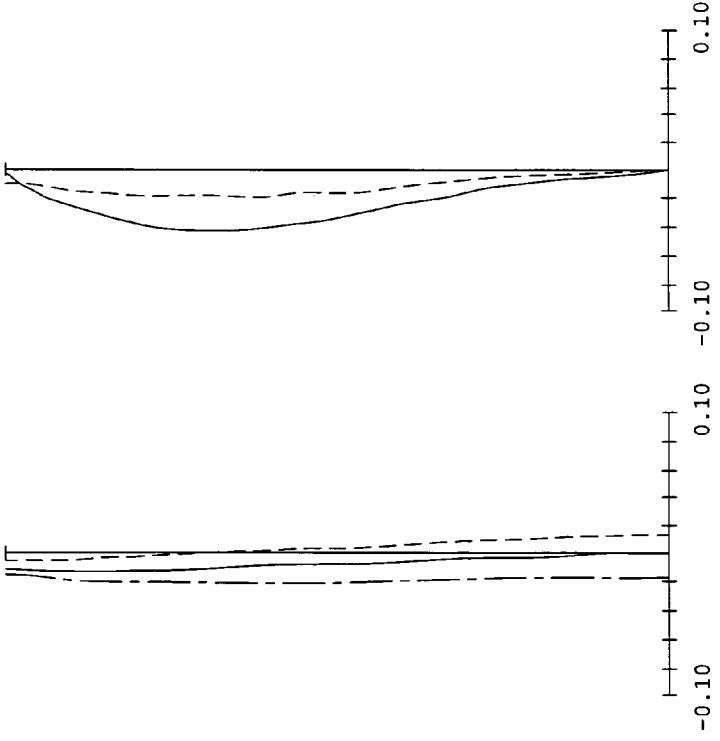
FIGS. 12A, 12B, 12C, and 12D are diagrams showing spherical aberration, astigmatism, distortion, and chromatic aberration of magnification, respectively, in infinite focusing of the imaging apparatus in the sixth embodiment.

FIG. 11 shows the optical arrangement of the sixth embodiment of the imaging apparatus according to the present invention. FIGS. 12A-12D diagrammatically show spherical aberration, astigmatism, distortion, and chromatic aberration of magnification, respectively, in infinite object point focusing of the imaging apparatus of the sixth embodiment.

The imaging apparatus 1 of the sixth embodiment shown in FIG. 11, like the imaging apparatus 1 of the first embodiment, comprises, in order from the object side toward the image side, the photographing optical system including the first lens unit G1, the aperture stop S, the second lens unit G2, and the third lens unit G3; the low-pass filter LF; and the image sensor (the CCD) having the cover glass CG and the imaging surface I and converting the optical image into the electric signal, located on the image side.

The first lens unit G1 is constructed with two lens elements: the negative lens element L11 and the positive lens element L12. The second lens unit G2 is constructed with the cemented lens component consisting of the positive lens element L21 and the negative lens element L22. The third lens unit G3 is constructed with the single aspherical lens element made of glass.

Subsequently, numerical data of optical members constituting the imaging apparatus of the sixth embodiment are shown below.

Numerical Data 6

| Focal length f: 6.479 mm, Fno: 3.511, Image height: 3.60 mm, Half angle of view (ω): 29.80° | | | |
|---|---|---|---|
| $r_1 = -4.924$ | $d_1 = 0.800$ | $n_{d1} = 1.56384$ | $v_{d1} = 60.67$ |
| $r_2 = 6.803$ | $d_2 = 0.200$ | | |
| $r_3 = 437.194$ | $d_3 = 1.850$ | $n_{d3} = 1.72916$ | $v_{d3} = 54.68$ |
| $r_4 = -4.640$ | $d_4 = 0.160$ | | |
| $r_5 = \infty$ (stop) | $d_5 = 0.000$ | | |
| $r_6 = 4.767$ | $d_6 = 3.050$ | $n_{d6} = 1.69350$ | $v_{d6} = 53.21$ |
| $r_7 = -3.543$ | $d_7 = 0.800$ | $n_{d7} = 1.68893$ | $v_{d7} = 31.07$ |
| $r_8 = 6.808$ | $d_8 = 0.800$ | | |
| $r_9 = -6.700$ | $d_9 = 2.000$ | $n_{d9} = 1.52542$ | $v_{d9} = 55.78$ |
| $r_{10} = -3.572$ | $d_{10} = 2.179$ | | |
| (aspherical surface) | | | |
| $r_{11} = \infty$ | $d_{11} = 0.760$ | $n_{d11} = 1.54771$ | $v_{d11} = 62.84$ |
| $r_{12} = \infty$ | $d_{12} = 0.600$ | | |
| $r_{13} = \infty$ | $d_{13} = 0.500$ | $n_{d13} = 1.51633$ | $v_{d13} = 64.14$ |
| $r_{14} = \infty$ | $d_{14} = 1.000$ | | |
| $r_{15} = \infty$ (imaging surface) | | | |

Aspherical Coefficients

| Face No. | k | $A_4$ | $A_6$ | $A_8$ | $A_{10}$ |
|---|---|---|---|---|---|
| 10 | 0 | $3.5047 \times 10^{-3}$ | $1.9730 \times 10^{-4}$ | $2.1670 \times 10^{-5}$ | 0 |

Subsequently, values corresponding to the conditions in the first to sixth embodiments are listed in Table 1.

TABLE 1

| | First embodiment | Second embodiment | Third embodiment | Fourth embodiment | Fifth embodiment | Sixth embodiment |
|---|---|---|---|---|---|---|
| \|r 2R\|/IH | 2.93 | 4.84 | 2.31 | 4.68 | 3.19 | 1.89 |
| f g2/f all | 1.33 | 1.75 | 3.89 | 1.56 | 1.82 | 1.96 |
| r 2R/r 3F | −3.77 | −5.56 | −2.65 | −5.58 | −3.72 | −1.02 |
| \|r 3F\|/IH | 0.78 | 0.87 | 0.87 | 0.84 | 0.86 | 1.86 |
| \|r 1F\|/IH | 1.03 | 1.11 | 1.10 | 1.11 | 1.02 | 1.37 |
| \|r IL12\|/IH | 34.29 | 7.02 | — | 5.69 | 11.51 | 121.44 |
| IH/EP | 0.343 | 0.243 | 0.263 | 0.272 | 0.302 | 0.304 |
| TL/IH | 3.59 | 4.02 | 3.71 | 3.87 | 3.68 | 4.08 |
| TS/TL | 0.105 | 0.220 | 0.172 | 0.194 | 0.113 | 0.079 |

Seventh Embodiment

Figure 13:
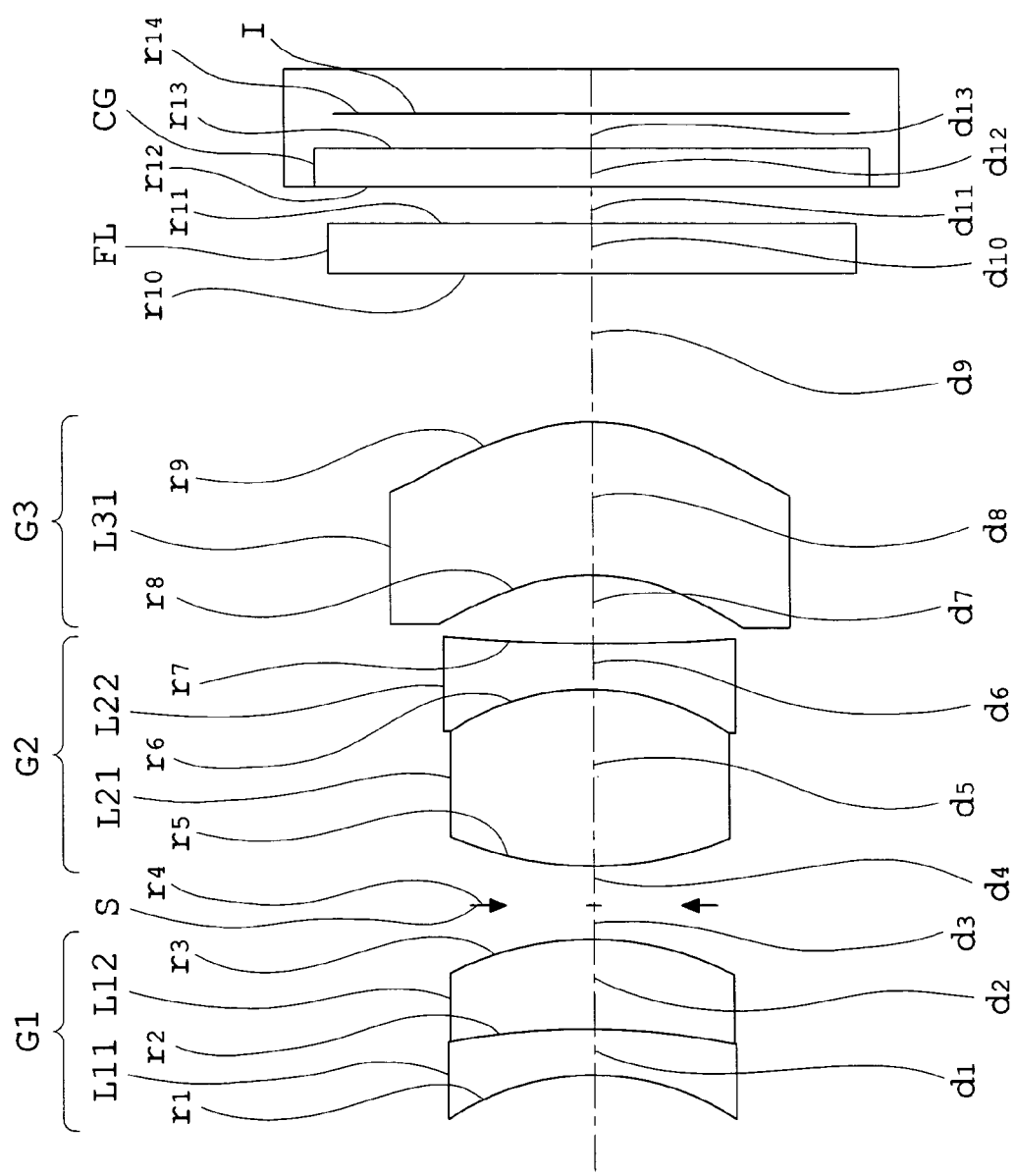
FIG. 13 is a sectional view showing an optical arrangement, developed along the optical axis, of a seventh embodiment of the imaging apparatus according to the present invention.
Figure 14:
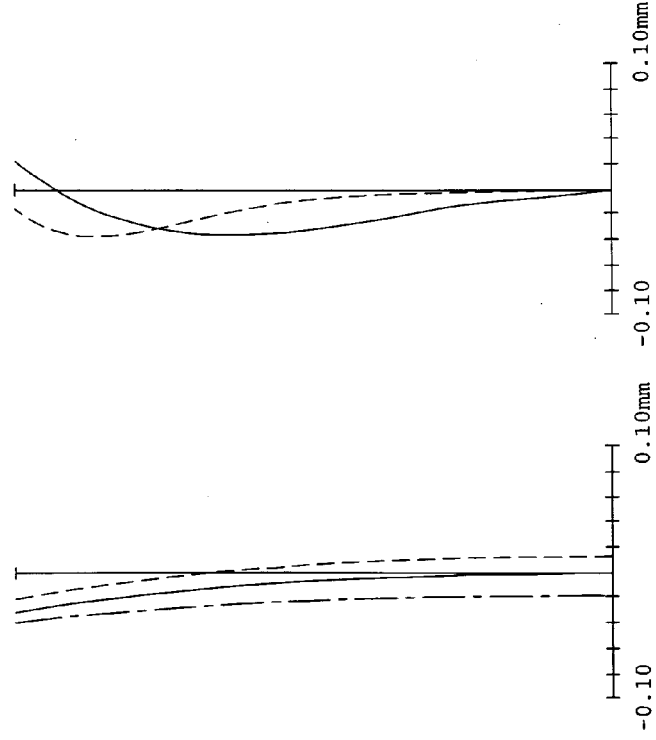
FIGS. 14A, 14B, 14C, and 14D are diagrams showing spherical aberration, astigmatism, distortion, and chromatic aberration of magnification, respectively, in infinite focusing of the imaging apparatus in the seventh embodiment.

FIG. 13 shows the optical arrangement of the seventh embodiment of the imaging apparatus according to the present invention. FIGS. 14A-14D diagrammatically show spherical aberration, astigmatism, distortion, and chromatic aberration of magnification, respectively, in infinite object point focusing of the imaging apparatus of the seventh embodiment.

The imaging apparatus of the seventh embodiment, as shown in FIG. 13, comprises, in order from the object side, a photographing optical system and a CCD that is an electronic image sensor. In FIG. 13, again, reference symbol I denotes the imaging surface of the CCD. The plane-parallel optical low-pass filter LF and the CCD cover glass CG are interposed between the photographing optical system and the imaging surface 1.

The photographing optical system includes, in order from the object side toward the imaging surface I, the first lens unit G1, the aperture stop S, the second lens unit G2, and the third lens unit G3.

In each of the embodiments to be described below, each individual lens element in the first lens unit G1, the second lens unit G2, and the third lens unit G3 is made of glass.

The first lens unit G1 is constructed with a cemented lens component in which the negative meniscus lens element L11 with a concave surface facing the object side and the positive meniscus lens element L12 with a concave surface facing the object side are cemented in this order from the object side toward the image side, and has positive refracting power as a whole.

The second lens unit G2 is constructed with a cemented lens component in which the biconvex positive lens element L21 and the biconcave negative lens element L22 are cemented in this order from the object side, and has positive refracting power as a whole.

The third lens unit G3 is constructed with the positive meniscus lens component L31 with a concave surface facing the object side in the proximity of the optical axis (at the lens center), and has positive refracting power as a whole. Also, the object-side surface of the positive meniscus lens component L31 is configured so that negative refracting power weakens progressively in going from the lens center to the periphery. The image-side surface of the positive meniscus lens component L31 is configured so that positive refracting power weakens progressively in going from the lens center to the periphery.

Aspherical surfaces are used for both surfaces of the positive meniscus lens component L31 with a concave surface facing the object side in the proximity of the optical axis (at the lens center) of the third lens unit G3.

Subsequently, numerical data of optical members constituting the imaging apparatus of the seventh embodiment in the present invention are shown below.

Numerical Data 7

Focal length f: 6.45 mm, Fno: 2.85, Image height: 3.60 mm,
Half angle of view (ω): 29.67°

| | | | |
|---|---|---|---|
| $r_1 = -3.771$ | $d_1 = 0.700$ | $n_{d1} = 1.71300$ | $v_{d1} = 53.87$ |
| $r_2 = -11.144$ | $d_2 = 1.372$ | $n_{d2} = 1.88300$ | $v_{d2} = 40.76$ |
| $r_3 = -4.680$ | $d_3 = 0.500$ | | |

-continued

Focal length f: 6.45 mm, Fno: 2.85, Image height: 3.60 mm,
Half angle of view (ω): 29.67°

| | | | |
|---|---|---|---|
| $r_4 = \infty$ (stop) | $d_4 = 0.600$ | | |
| $r_5 = 5.522$ | $d_5 = 2.710$ | $n_{d5} = 1.80400$ | $v_{d5} = 46.57$ |
| $r_6 = -3.844$ | $d_6 = 0.700$ | $n_{d6} = 1.84666$ | $v_{d6} = 23.78$ |
| $r_7 = 28.663$ | $d_7 = 1.035$ | | |
| $r_8 = -3.235$ (aspherical surface) | $d_8 = 2.322$ | $n_{d8} = 1.80610$ | $v_{d8} = 40.73$ |
| $r_9 = -3.450$ (aspherical surface) | $d_9 = 2.202$ | | |
| $r_{10} = \infty$ | $d_{10} = 0.760$ | $n_{d10} = 1.54771$ | $v_{d10} = 62.84$ |
| $r_{11} = \infty$ | $d_{11} = 0.600$ | | |
| $r_{12} = \infty$ | $d_{12} = 0.500$ | $n_{d12} = 1.51633$ | $v_{d12} = 64.14$ |
| $r_{13} = \infty$ | $d_{13} = 0.560$ | | |
| $r_{14} = \infty$ (imaging surface) | | | |

Aspherical Coefficients

| Face No. | k | $A_4$ | $A_6$ | $A_8$ | $A_{10}$ |
|---|---|---|---|---|---|
| 8 | −0.8665 | $-3.2517 \times 10^{-4}$ | $4.9730 \times 10^{-4}$ | $1.5563 \times 10^{-7}$ | $1.9310 \times 10^{-9}$ |
| 9 | −0.6303 | $2.1339 \times 10^{-3}$ | $1.4734 \times 10^{-4}$ | $7.5163 \times 10^{-6}$ | $1.6279 \times 10^{-7}$ |

Eighth Embodiment

Figure 15:
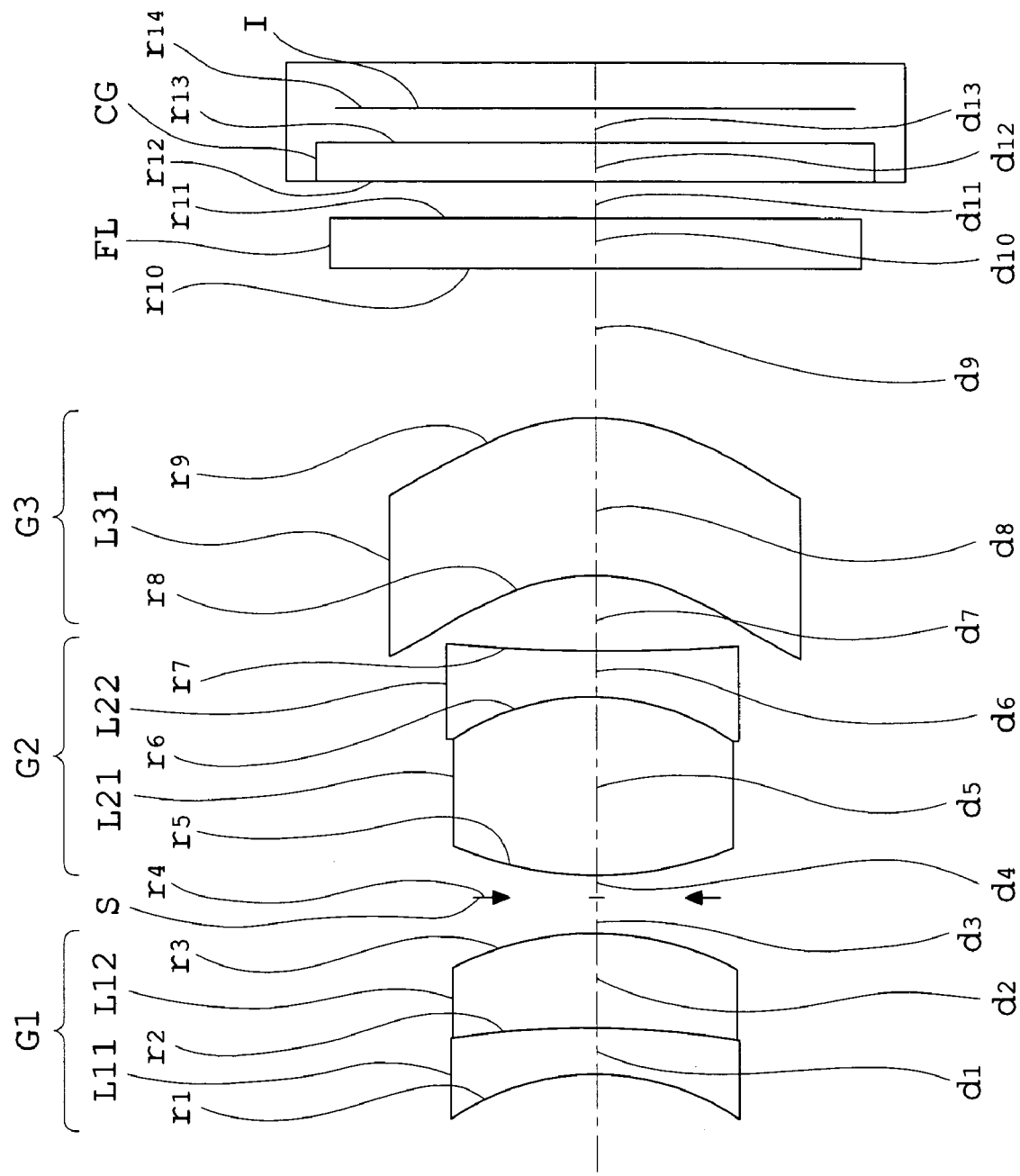
FIG. 15 is a sectional view showing an optical arrangement, developed along the optical axis, of an eighth embodiment of the imaging apparatus according to the present invention.
Figure 16:
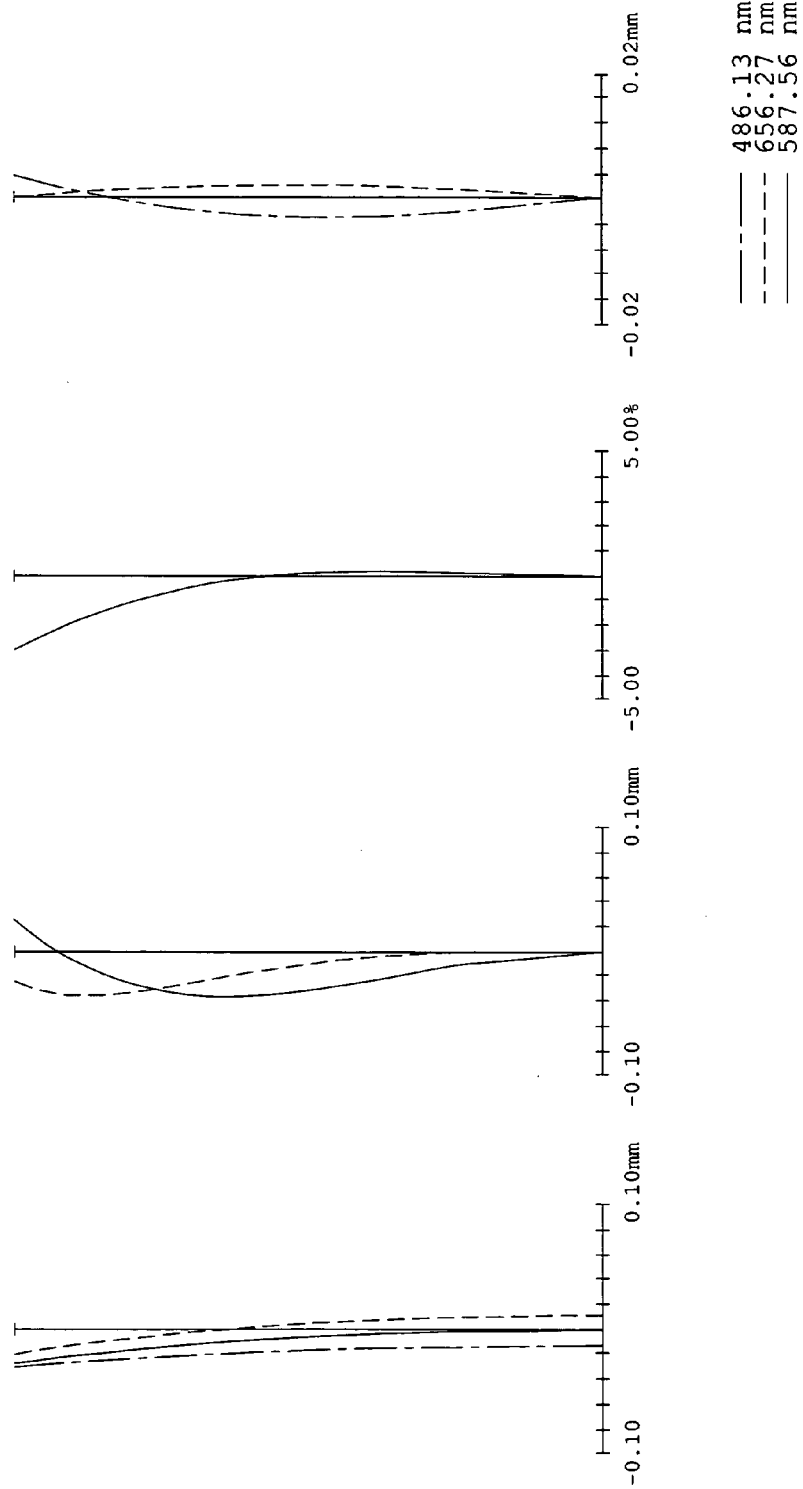
FIGS. 16A, 16B, 16C, and 16D are diagrams showing spherical aberration, astigmatism, distortion, and chromatic aberration of magnification, respectively, in infinite focusing of the imaging apparatus in the eighth embodiment.

FIG. 15 shows the optical arrangement of the eighth embodiment of the imaging apparatus according to the present invention. FIGS. 16A-16D diagrammatically show spherical aberration, astigmatism, distortion, and chromatic aberration of magnification, respectively, in infinite object point focusing of the imaging apparatus of the eighth embodiment.

The imaging apparatus of the eighth embodiment, as shown in FIG. 15, comprises, in order from the object side toward the image side, the photographing optical system and the CCD that is the electronic image sensor. In FIG. 15, again, reference symbol I denotes the imaging surface of the CCD. The plane-parallel optical low-pass filter LF and the CCD cover glass CG are interposed between the photographing optical system and the imaging surface I.

The photographing optical system includes, in order from the object side toward the imaging surface I, the first lens unit G1, the aperture stop S, the second lens unit G2, and the third lens unit G3.

The first lens unit G1 is constructed with a cemented lens component in which the negative meniscus lens element L11 with a concave surface facing the object side and the positive meniscus lens element L12 with a concave surface facing the object side are cemented in this order from the object side toward the image side, and has positive refracting power as a whole.

The second lens unit G2 is constructed with a cemented lens component in which the biconvex positive lens element L21 and the biconcave negative lens element L22 are cemented in this order from the object side, and has positive refracting power as a whole.

The third lens unit G3 is constructed with the positive meniscus lens component L31 with a concave surface facing the object side in the proximity of the optical axis (at the lens center), and has positive refracting power as a whole. Also, the object-side surface of the positive meniscus lens component L31 is configured so that negative refracting power weakens progressively in going from the lens center to the periphery. The image-side surface of the positive meniscus lens component L31 is configured so that positive refracting power weakens progressively in going from the lens center to the periphery.

Aspherical surfaces are used for both surfaces of the positive meniscus lens component L31 with a concave surface facing the object side in the proximity of the optical axis (at the lens center) of the third lens unit G3.

Subsequently, numerical data of optical members constituting the imaging apparatus of the eighth embodiment in the present invention are shown below.

Numerical Data 8

Focal length f: 6.45 mm, Fno: 2.86, Image height: 3.60 mm, Half angle of view (ω): 29.66°

| | | | |
|---|---|---|---|
| $r_1 = -3.816$ | $d_1 = 0.700$ | $n_{d1} = 1.71300$ | $v_{d1} = 53.87$ |
| $r_2 = -13.959$ | $d_2 = 1.4$ | $n_{d2} = 1.883$ | $v_{d2} = 40.76$ |
| $r_3 = -4.757$ | $d_3 = 0.500$ | | |
| $r_4 = \infty$ (stop) | $d_4 = 0.367$ | | |
| $r_5 = 5.592$ | $d_5 = 2.718$ | $n_{d5} = 1.80400$ | $v_{d5} = 46.57$ |
| $r_6 = -3.698$ | $d_6 = 0.700$ | $n_{d6} = 1.84666$ | $v_{d6} = 23.78$ |
| $r_7 = 23.008$ | $d_7 = 1.097$ | | |
| $r_8 = -3.336$ (aspherical surface) | $d_8 = 2.388$ | $n_{d8} = 1.80610$ | $v_{d8} = 40.73$ |
| $r_9 = -3.450$ (aspherical surface) | $d_9 = 2.200$ | | |
| $r_{10} = \infty$ | $d_{10} = 0.760$ | $n_{d10} = 1.54771$ | $v_{d10} = 62.84$ |
| $r_{11} = \infty$ | $d_{11} = 0.600$ | | |
| $r_{12} = \infty$ | $d_{12} = 0.500$ | $n_{d12} = 1.51633$ | $v_{d12} = 64.14$ |
| $r_{13} = \infty$ | $d_{13} = 0.560$ | | |
| $r_{14} = \infty$ (imaging surface) | | | |

Aspherical Coefficients

| Face No. | k | $A_4$ | $A_6$ | $A_8$ | $A_{10}$ |
|---|---|---|---|---|---|
| 8 | −1.3797 | −3.0058 × 10⁻³ | 4.1817 × 10⁻⁴ | 1.5506 × 10⁻⁶ | −1.1743 × 10⁻⁹ |
| 9 | −0.5361 | 2.0251 × 10⁻³ | 9.6106 × 10⁻⁵ | 1.0907 × 10⁻⁵ | −1.0905 × 10⁻⁷ |

Ninth Embodiment

Figure 17:
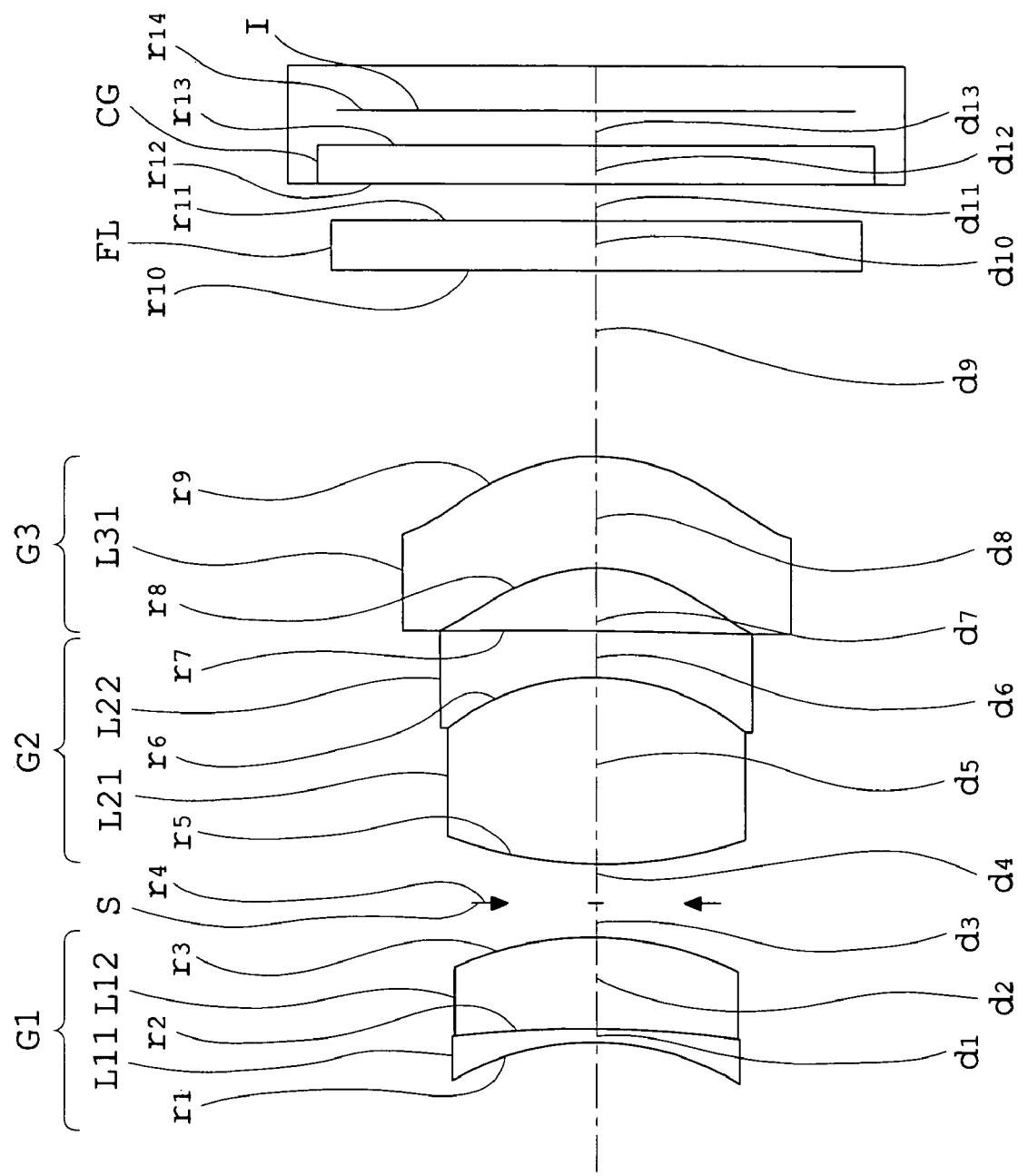
FIG. 17 is a sectional view showing an optical arrangement, developed along the optical axis, of a ninth embodiment of the imaging apparatus according to the present invention.

FIG. 17 shows the optical arrangement of the ninth embodiment of the imaging apparatus according to the present invention. FIGS. 18A-18D diagrammatically show spherical aberration, astigmatism, distortion, and chromatic aberration of magnification, respectively, in infinite object point focusing of the imaging apparatus of the ninth embodiment.

The imaging apparatus of the ninth embodiment, as shown in FIG. 17, comprises, in order from the object side, the photographing optical system and the CCD that is the electronic image sensor. In FIG. 17, again, reference symbol I denotes the imaging surface of the CCD. The plane-parallel optical low-pass filter LF and the CCD cover glass CG are interposed between the photographing optical system and the imaging surface I.

The photographing optical system includes, in order from the object side toward the imaging surface I, the first lens unit G1, the aperture stop S, the second lens unit G2, and the third lens unit G3.

The first lens unit G1 is constructed with a cemented lens component in which the negative meniscus lens element L11 with a concave surface facing the object side and the positive meniscus lens element L12 with a concave surface facing the object side are cemented in this order from the object side toward the image side, and has positive refracting power as a whole.

The second lens unit G2 is constructed with a cemented lens component in which the biconvex positive lens element L21 and a negative meniscus lens element L22' with a concave surface facing the object side are cemented in this order from the object side, and has positive refracting power as a whole.

The third lens unit G3 is constructed with the positive meniscus lens component L31 with a concave surface facing the object side in the proximity of the optical axis (at the lens center), and has positive refracting power as a whole. Also, the object-side surface of the positive meniscus lens component L31 is configured so that negative refracting power weakens progressively in going from the lens center to the periphery. The image-side surface of the positive meniscus lens component L31 is configured so that positive refracting power weakens progressively in going from the lens center to the periphery.

Aspherical surfaces are used for both surfaces of the positive meniscus lens component L31 with a concave surface facing the object side in the proximity of the optical axis (at the lens center) of the third lens unit G3.

Subsequently, numerical data of optical members constituting the imaging apparatus of the ninth embodiment in the present invention are shown below.

Numerical Data 9

Focal length f: 6.45 mm, Fno: 2.85, Image height: 3.60 mm, Half angle of view (ω): 29.45°

| | | | |
|---|---|---|---|
| $r_1 = -4.078$ | $d_1 = 0.200$ | $n_{d1} = 1.72916$ | $v_{d1} = 54.68$ |
| $r_2 = -17.443$ | $d_2 = 1.400$ | $n_{d2} = 1.88300$ | $v_{d2} = 40.76$ |
| $r_3 = -4.924$ | $d_3 = 0.500$ | | |
| $r_4 = \infty$ (stop) | $d_4 = 0.600$ | | |
| $r_5 = 6.719$ | $d_5 = 2.834$ | $n_{d5} = 1.81600$ | $v_{d5} = 46.62$ |
| $r_6 = -3.568$ | $d_6 = 0.700$ | $n_{d6} = 1.80810$ | $v_{d6} = 22.76$ |
| $r_7 = -122.924$ | $d_7 = 0.961$ | | |
| $r_8 = -2.457$ (aspherical surface) | $d_8 = 1.700$ | $n_{d8} = 1.88300$ | $v_{d8} = 40.76$ |
| $r_9 = -2.832$ (aspherical surface) | $d_9 = 2.769$ | | |
| $r_{10} = \infty$ | $d_{10} = 0.760$ | $n_{d10} = 1.54771$ | $v_{d10} = 62.84$ |
| $r_{11} = \infty$ | $d_{11} = 0.600$ | | |
| $r_{12} = \infty$ | $d_{12} = 0.500$ | $n_{d12} = 1.51633$ | $v_{d12} = 64.14$ |

-continued

Focal length f: 6.45 mm, Fno: 2.85, Image height: 3.60 mm,
Half angle of view (ω): 29.45°

$r_{13} = \infty$      $d_{13} = 0.560$
$r_{14} = \infty$ (imaging surface)

Aspherical Coefficients

| Face No. | k | $A_4$ | $A_6$ | $A_8$ | $A_{10}$ |
|---|---|---|---|---|---|
| 8 | −1.0202 | −2.3598 × 10⁻³ | 1.3305 × 10⁻³ | −4.9553 × 10⁻⁶ | −1.5105 × 10⁻⁸ |
| 9 | −1.6704 | −3.7687 × 10⁻³ | 3.3568 × 10⁻⁴ | 2.4150 × 10⁻⁵ | 3.6030 × 10⁻⁷ |

Tenth Embodiment

Figure 19:
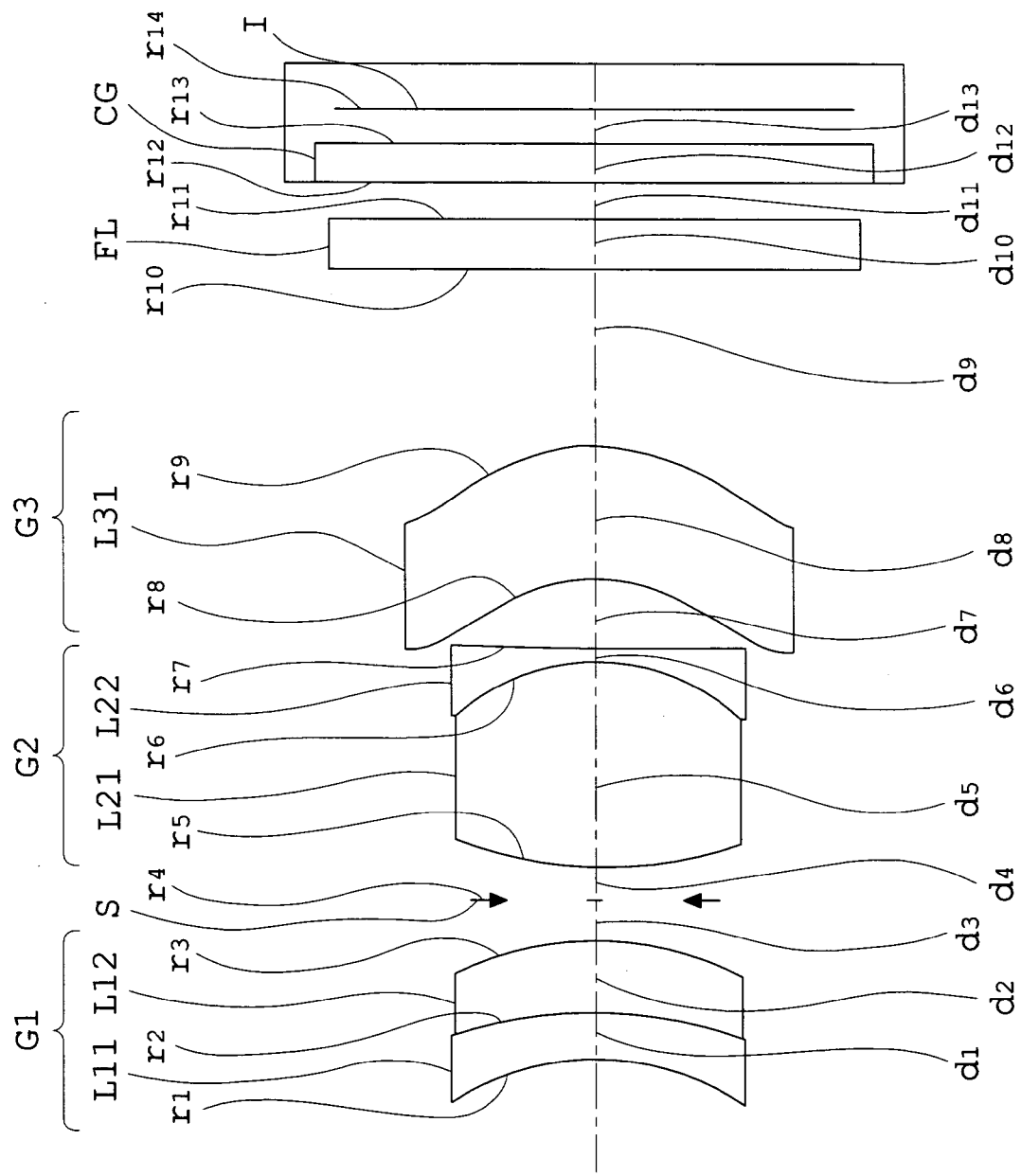
FIG. 19 is a sectional view showing an optical arrangement, developed along the optical axis, of a tenth embodiment of the imaging apparatus according to the present invention.
Figure 20:
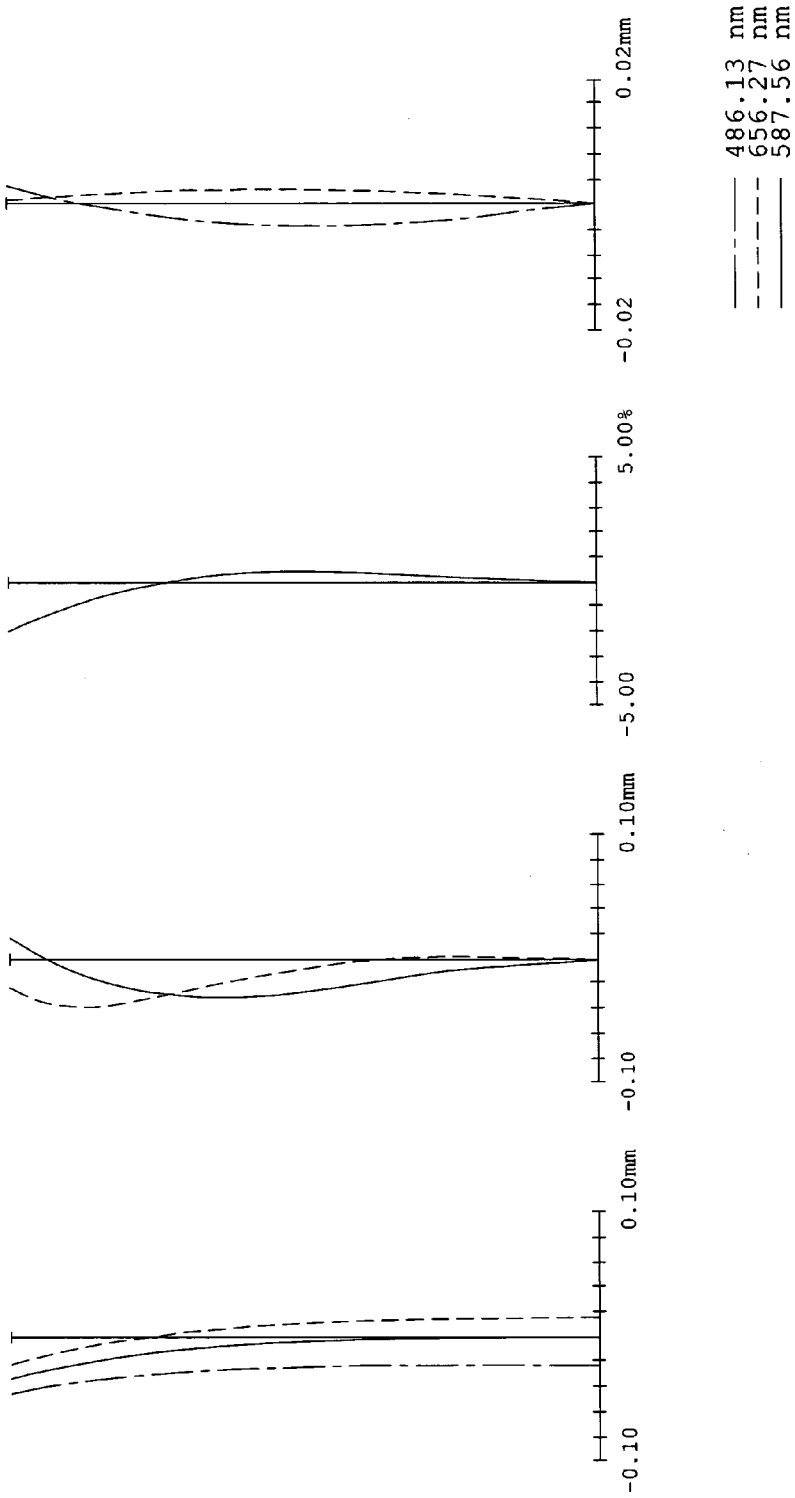
FIGS. 20A, 20B, 20C, and 20D are diagrams showing spherical aberration, astigmatism, distortion, and chromatic aberration of magnification, respectively, in infinite focusing of the imaging apparatus in the tenth embodiment.

FIG. 19 shows the optical arrangement of the tenth embodiment of the imaging apparatus according to the present invention. FIGS. 20A-20D diagrammatically show spherical aberration, astigmatism, distortion, and chromatic aberration of magnification, respectively, in infinite object point focusing of the imaging apparatus of the tenth embodiment.

The imaging apparatus of the tenth embodiment, as shown in FIG. 19, comprises, in order from the object side toward the image side, the photographing optical system and the CCD that is the electronic image sensor. In FIG. 19, again, reference symbol I denotes the imaging surface of the CCD. The plane-parallel optical low-pass filter LF and the CCD cover glass CG are interposed between the photographing optical system and the imaging surface 1.

The photographing optical system includes, in order from the object side toward the imaging surface I, the first lens unit G1, the aperture stop S, the second lens unit G2, and the third lens unit G3.

The first lens unit G1 is constructed with a cemented lens component in which the negative meniscus lens element L11 with a concave surface facing the object side and the positive meniscus lens element L12 with a concave surface facing the object side are cemented in this order from the object side, and has positive refracting power as a whole.

The second lens unit G2 is constructed with a cemented lens component in which the biconvex positive lens element L21 and the biconcave negative lens element L22 are cemented in this order from the object side, and has positive refracting power as a whole.

The third lens unit G3 is constructed with the positive meniscus lens component L31 with a concave surface facing the object side in the proximity of the optical axis (at the lens center), and has positive refracting power as a whole. Also, the object-side surface of the positive meniscus lens component L31 is configured so that negative refracting power weakens progressively in going from the lens center to the periphery. The image-side surface of the positive meniscus lens component L31 is configured so that positive refracting power weakens progressively in going from the lens center to the periphery.

Aspherical surfaces are used for both surfaces of the positive meniscus lens component L31 with a concave surface facing the object side in the proximity of the optical axis (at the lens center) of the third lens unit G3.

Subsequently, numerical data of optical members constituting the imaging apparatus of the tenth embodiment in the present invention are shown below.

Numerical Data 10

Focal length f: 6.45 mm, Fno: 2.85, Image height: 3.60 mm,
Half angle of view (ω): 29.44°

$r_1 = -3.981$    $d_1 = 0.700$    $n_{d1} = 1.71300$    $v_{d1} = 53.87$
$r_2 = -6.568$    $d_2 = 1.097$    $n_{d2} = 1.88300$    $v_{d2} = 40.76$
$r_3 = -4.714$    $d_3 = 0.600$
$r_4 = \infty$ (stop)    $d_4 = 0.500$
$r_5 = 5.987$    $d_5 = 3.127$    $n_{d5} = 1.83481$    $v_{d5} = 42.71$
$r_6 = -3.183$    $d_6 = 0.200$    $n_{d6} = 1.84666$    $v_{d6} = 23.78$
$r_7 = 63.032$    $d_7 = 1.050$
$r_8 = -2.628$    $d_8 = 2.000$    $n_{d8} = 1.80610$    $v_{d8} = 40.73$
(aspherical surface)
$r_9 = -2.960$    $d_9 = 2.657$
(aspherical surface)
$r_{10} = \infty$    $d_{10} = 0.760$    $n_{d10} = 1.54771$    $v_{d10} = 62.84$
$r_{11} = \infty$    $d_{11} = 0.600$
$r_{12} = \infty$    $d_{12} = 0.500$    $n_{d12} = 1.51633$    $v_{d12} = 64.14$
$r_{13} = \infty$    $d_{13} = 0.560$
$r_{14} = \infty$ (imaging surface)

Aspherical Coefficients

| Face No. | k | $A_4$ | $A_6$ | $A_8$ | $A_{10}$ |
|---|---|---|---|---|---|
| 8 | −1.0152 | −2.7000 × 10⁻³ | 1.1412 × 10⁻³ | 2.2729 × 10⁻⁶ | 1.2910 × 10⁻⁹ |
| 9 | −0.9135 | 5.0276 × 10⁻⁴ | 1.5139 × 10⁻⁴ | 2.8159 × 10⁻⁵ | −2.0422 × 10⁻⁷ |

Eleventh Embodiment

Figure 21:
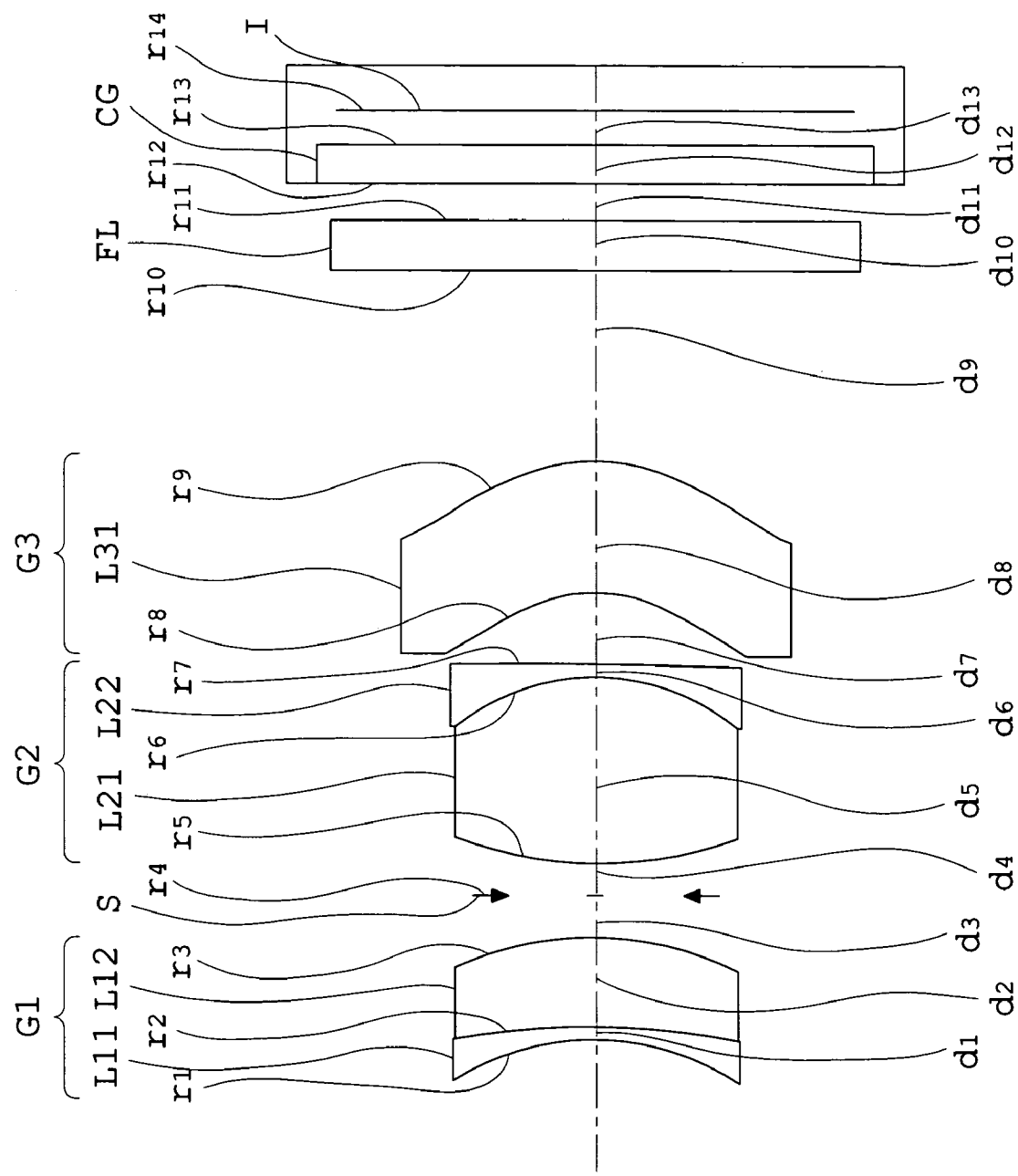
FIG. 21 is a sectional view showing an optical arrangement, developed along the optical axis, of an eleventh embodiment of the imaging apparatus according to the present invention.
Figure 22:
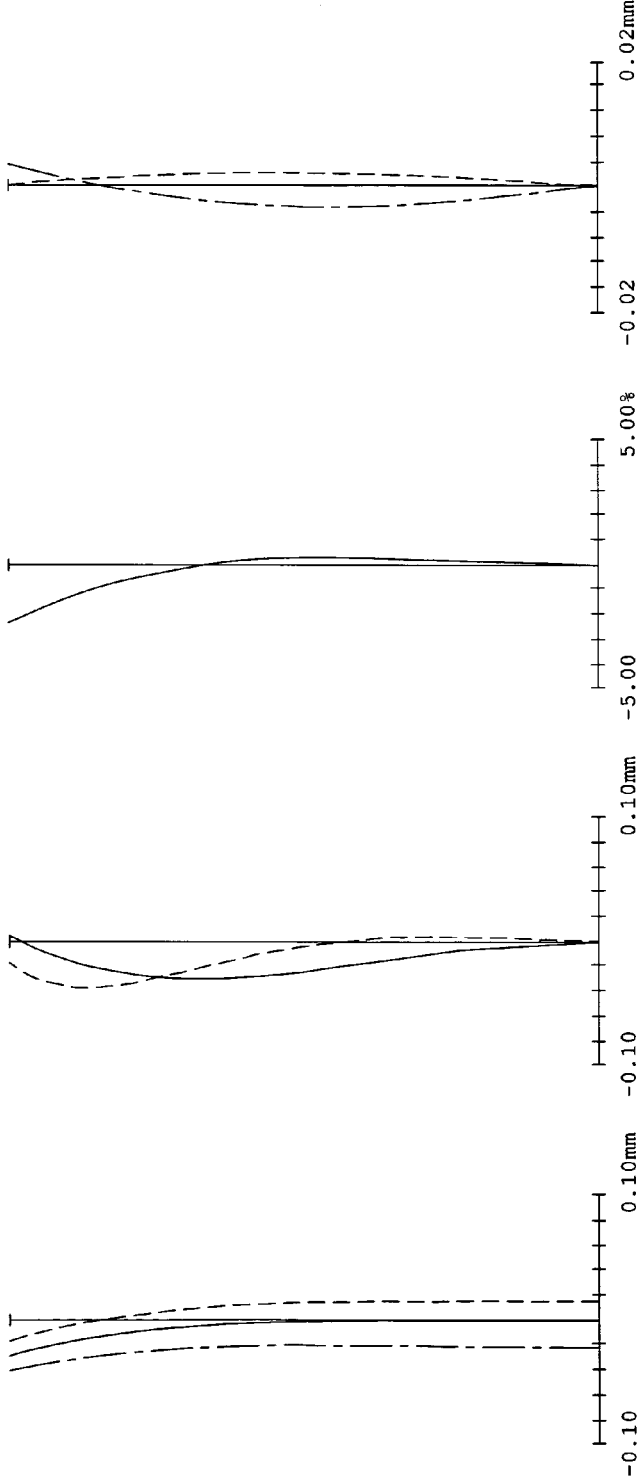
FIGS. 22A, 22B, 22C, and 22D are diagrams showing spherical aberration, astigmatism, distortion, and chromatic aberration of magnification, respectively, in infinite focusing of the imaging apparatus in the eleventh embodiment.

FIG. 21 shows the optical arrangement of the eleventh embodiment of the imaging apparatus according to the present invention. FIGS. 22A-22D diagrammatically show spherical aberration, astigmatism, distortion, and chromatic aberration of magnification, respectively, in infinite object point focusing of the imaging apparatus of the eleventh embodiment.

The imaging apparatus of the eleventh embodiment, as shown in FIG. 21, comprises, in order from the object side, the photographing optical system and the CCD that is the electronic image sensor. In FIG. 21, again, reference symbol I denotes the imaging surface of the CCD. The plane-parallel optical low-pass filter LF and the CCD cover glass CG are interposed between the photographing optical system and the imaging surface I.

The photographing optical system includes, in order from the object side toward the imaging surface I, the first lens unit G1, the aperture stop S, the second lens unit G2, and the third lens unit G3.

The first lens unit G1 is constructed with a cemented lens component in which the negative meniscus lens element L11 with a concave surface facing the object side and the positive meniscus lens element L12 with a concave surface facing the object side are cemented in this order from the object side toward the image side, and has positive refracting power as a whole.

The second lens unit G2 is constructed with a cemented lens component in which the biconvex positive lens element L21 and the negative meniscus lens element L22' with a concave surface facing the object side are cemented in this order from the object side, and has positive refracting power as a whole.

The third lens unit G3 is constructed with the positive meniscus lens component L31 with a concave surface facing the object side in the proximity of the optical axis (at the lens center), and has positive refracting power as a whole. Also, the object-side surface of the positive meniscus lens component L31 is configured so that negative refracting power weakens progressively in going from the lens center to the periphery. The image-side surface of the positive meniscus lens component L31 is configured so that positive refracting power weakens progressively in going from the lens center to the periphery.

Aspherical surfaces are used for both surfaces of the positive meniscus lens component L31 with a concave surface facing the object side in the proximity of the optical axis (at the lens center) of the third lens unit G3.

Subsequently, numerical data of optical members constituting the imaging apparatus of the eleventh embodiment in the present invention are shown below.

Numerical Data 11

Focal length f: 6.45 mm, Fno: 2.86, Image height: 3.60 mm,
Half angle of view (ω): 29.54°

| | | | |
|---|---|---|---|
| $r_1 = -3.959$ | $d_1 = 0.200$ | $n_{d1} = 1.72916$ | $v_{d1} = 54.68$ |
| $r_2 = -11.703$ | $d_2 = 1.376$ | $n_{d2} = 1.88300$ | $v_{d2} = 40.76$ |
| $r_3 = -4.772$ | $d_3 = 0.600$ | | |
| $r_4 = \infty$ (stop) | $d_4 = 0.500$ | | |
| $r_5 = 6.342$ | $d_5 = 2.822$ | $n_{d5} = 1.81600$ | $v_{d5} = 46.62$ |

-continued

Focal length f: 6.45 mm, Fno: 2.86, Image height: 3.60 mm,
Half angle of view (ω): 29.54°

| | | | |
|---|---|---|---|
| $r_6 = -3.474$ | $d_6 = 0.200$ | $n_{d6} = 1.80810$ | $v_{d6} = 22.76$ |
| $r_7 = -103.635$ | $d_7 = 1.072$ | | |
| $r_8 = -2.530$ (aspherical surface) | $d_8 = 2.000$ | $n_{d8} = 1.88300$ | $v_{d8} = 40.76$ |
| $r_9 = -3.026$ (aspherical surface) | $d_9 = 2.863$ | | |
| $r_{10} = \infty$ | $d_{10} = 0.760$ | $n_{d10} = 1.54771$ | $v_{d10} = 62.84$ |
| $r_{11} = \infty$ | $d_{11} = 0.600$ | | |
| $r_{12} = \infty$ | $d_{12} = 0.500$ | $n_{d12} = 1.51633$ | $v_{d12} = 64.14$ |
| $r_{13} = \infty$ | $d_{13} = 0.560$ | | |
| $r_{14} = \infty$ (imaging surface) | | | |

Aspherical Coefficients

| Face No. | k | $A_4$ | $A_6$ | $A_8$ | $A_{10}$ |
|---|---|---|---|---|---|
| 8 | −1.0178 | $-2.7460 \times 10^{-3}$ | $1.2872 \times 10^{-3}$ | $-3.7565 \times 10^{-6}$ | $-1.0251 \times 10^{-8}$ |
| 9 | −0.9585 | $9.1035 \times 10^{-5}$ | $1.6053 \times 10^{-4}$ | $2.3418 \times 10^{-5}$ | $3.8847 \times 10^{-8}$ |

Twelfth Embodiment

Figure 23:
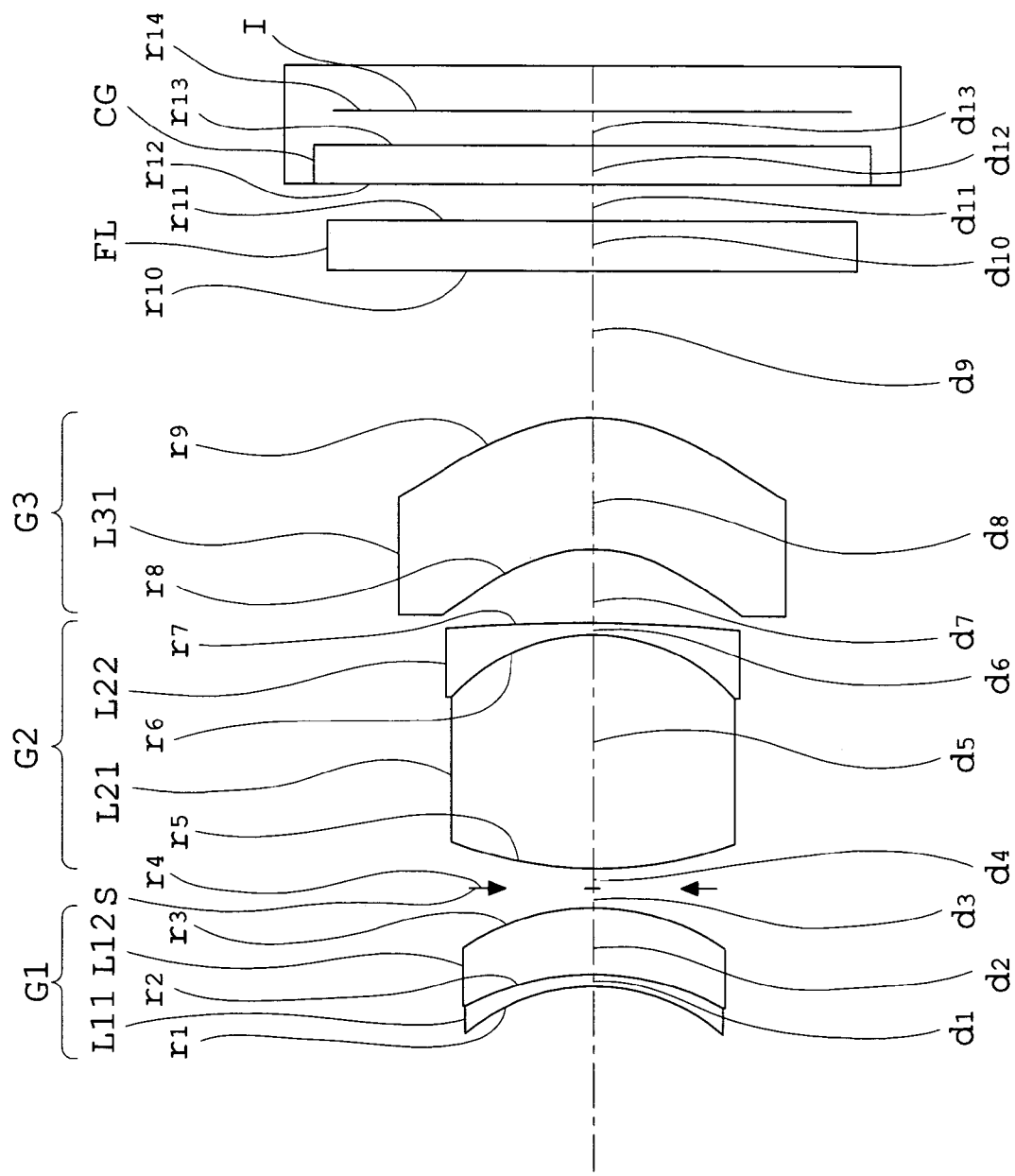
FIG. 23 is a sectional view showing an optical arrangement, developed along the optical axis, of a twelfth embodiment of the imaging apparatus according to the present invention.
Figure 24:
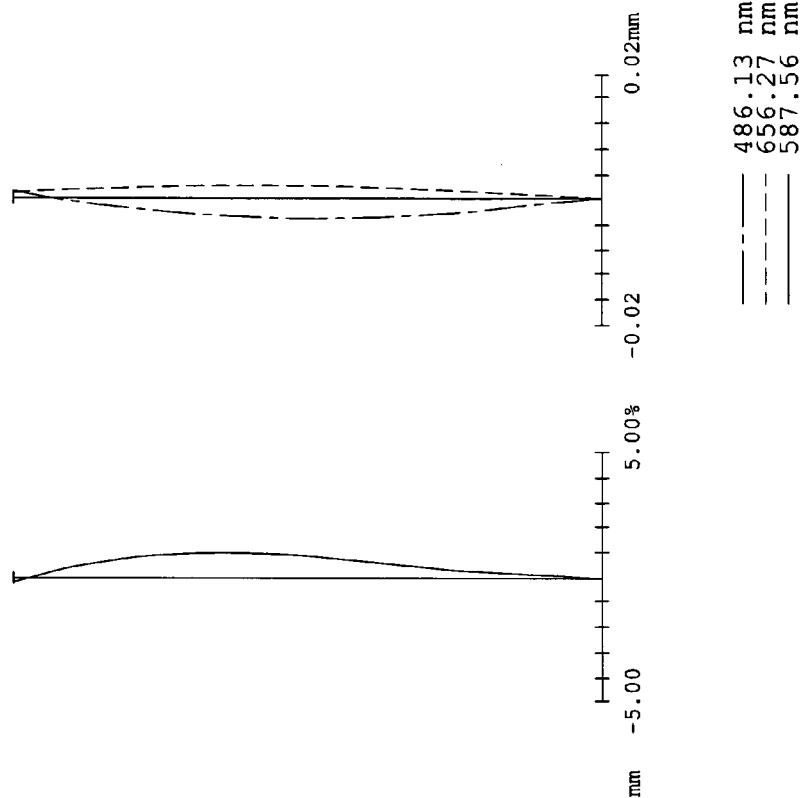
FIGS. 24A, 24B, 24C, and 24D are diagrams showing spherical aberration, astigmatism, distortion, and chromatic aberration of magnification, respectively, in infinite focusing of the imaging apparatus in the twelfth embodiment.

FIG. 23 shows the optical arrangement of the twelfth embodiment of the imaging apparatus according to the present invention. FIGS. 24A-24D diagrammatically show spherical aberration, astigmatism, distortion, and chromatic aberration of magnification, respectively, in infinite object point focusing of the imaging apparatus of the twelfth embodiment.

The imaging apparatus of the twelfth embodiment, as shown in FIG. 23, comprises, in order from the object side toward the image side, the photographing optical system and the CCD that is the electronic image sensor. In FIG. 23, again, reference symbol I denotes the imaging surface of the CCD. The plane-parallel optical low-pass filter LF and the CCD cover glass CG are interposed between the photographing optical system and the imaging surface I.

The photographing optical system includes, in order from the object side toward the imaging surface I, the first lens unit G1, the aperture stop S, the second lens unit G2, and the third lens unit G3.

The first lens unit G1 is constructed with a cemented lens component in which the negative meniscus lens element L11 with a concave surface facing the object side and the positive meniscus lens element L12 with a concave surface facing the object side are cemented in this order from the object side, and has positive refracting power as a whole.

The second lens unit G2 is constructed with a cemented lens component in which the biconvex positive lens element L21 and the negative meniscus lens element L22' with a concave surface facing the object side are cemented in this order from the object side, and has positive refracting power as a whole.

The third lens unit G3 is constructed with the positive meniscus lens component L31 with a concave surface facing the object side in the proximity of the optical axis (at the lens center), and has positive refracting power as a whole. Also, the object-side surface of the positive meniscus lens component L31 is configured so that negative refracting power weakens progressively in going from the lens center to the periphery. The image-side surface of the positive meniscus lens component L31 is configured so that positive refracting power weakens progressively in going from the lens center to the periphery.

Aspherical surfaces are used for both surfaces of the positive meniscus lens component L31 with a concave surface facing the object side in the proximity of the optical axis (at the lens center) of the third lens unit G3.

Subsequently, numerical data of optical members constituting the imaging apparatus of the twelfth embodiment in the present invention are shown below.

Numerical Data 12

Focal length f: 6.45 mm, Fno: 2.85, Image height: 3.60 mm,
Half angle of view ($\omega$): 29.58°

$r_1 = -3.040$   $d_1 = 0.200$   $n_{d1} = 1.72916$   $v_{d1} = 54.68$
$r_2 = -3.991$   $d_2 = 1.000$   $n_{d2} = 1.81600$   $v_{d2} = 46.62$
$r_3 = -3.546$   $d_3 = 0.300$
$r_4 = \infty$ (stop)   $d_4 = 0.300$
$r_5 = 5.934$   $d_5 = 3.554$   $n_{d5} = 1.81600$   $v_{d5} = 46.62$
$r_6 = -2.929$   $d_6 = 0.200$   $n_{d6} = 1.84666$   $v_{d6} = 23.78$
$r_7 = -22.274$   $d_7 = 1.094$
$r_8 = -2.362$ (aspherical surface)   $d_8 = 2.000$   $n_{d8} = 1.88300$   $v_{d8} = 40.76$
$r_9 = -2.981$ (aspherical surface)   $d_9 = 2.237$
$r_{10} = \infty$   $d_{10} = 0.760$   $n_{d10} = 1.54771$   $v_{d10} = 62.84$
$r_{11} = \infty$   $d_{11} = 0.600$
$r_{12} = \infty$   $d_{12} = 0.500$   $n_{d12} = 1.51633$   $v_{d12} = 64.14$
$r_{13} = \infty$   $d_{13} = 0.560$
$r_{14} = \infty$ (imaging surface)

Aspherical Coefficients

| Face No. | k | $A_4$ | $A_6$ | $A_8$ | $A_{10}$ |
|---|---|---|---|---|---|
| 8 | −1.0080 | −1.9452 × 10$^{-3}$ | 1.0616 × 10$^{-3}$ | −1.4687 × 10$^{-6}$ | −2.5137 × 10$^{-8}$ |
| 9 | −1.9622 | −4.0818 × 10$^{-3}$ | 4.1040 × 10$^{-4}$ | 2.9955 × 10$^{-6}$ | 2.1571 × 10$^{-7}$ |

Subsequently, values corresponding to the conditions in the seventh to twelfth embodiments are listed in Table 2.

TABLE 2

|  | Seventh embodiment | Eighth embodiment | Ninth embodiment | Tenth embodiment | Eleventh embodiment | Twelfth embodiment |
|---|---|---|---|---|---|---|
| T1/IH | 0.576 | 0.601 | 0.444 | 0.499 | 0.438 | 0.333 |
| R2/R3 | 1.000 | 1.000 | 1.000 | 1.000 | 1.000 | 1.000 |
| D23/D14 | 0.000 | 0.000 | 0.000 | 0.000 | 0.000 | 0.000 |
| DC (mm) | —/— | —/— | 0.2/— | —/0.2 | 0.2/0.2 | 0.2/0.2 |
| Ndc | —/— | —/— | 1.72916/— | —/1.84666 | 1.72916/1.80810 | 1.72916/1.84666 |
| vdm − vdc | —/— | —/— | −13.92/— | —/18.93 | −13.92/23.86 | −8.06/22.84 |
| \|r 2R\|/IH | 7.962 | 6.391 |  | 17.509 |  |  |
| f g2/f all | 1.343 | 1.438 | 1.209 | 1.225 | 1.135 | 0.987 |
| r 2R/r 3F | −8.860 | −6.896 |  | −23.990 |  |  |
| \|r 3F\|/IH | 0.899 | 0.927 | 0.683 | 0.730 | 0.703 | 0.656 |
| \|r 1F\|/IH | 1.048 | 1.056 | 1.133 | 1.106 | 1.100 | 0.844 |
| IH/EP | 0.240 | 0.239 | 0.240 | 0.240 | 0.239 | 0.239 |
| TL/IH | 4.045 | 4.043 | 3.912 | 3.986 | 3.904 | 3.696 |
| TS/TL | 0.147 | 0.135 | 0.146 | 0.150 | 0.155 | 0.127 |

The electronic imaging apparatus using the photographing optical system of the present invention mentioned above can be constructed as in the photographing apparatus in which the image of the object is formed by the imaging optical system, such as the photographing optical system, and is received by the solid-state image sensor, such as a CCD or CMOS, to photograph, notably as a digital camera or a video camera; a personal computer or a telephone which is an example of an information processing apparatus, especially a mobile phone that is handy to carry. The embodiments of such apparatuses are shown below.

Figure 25:
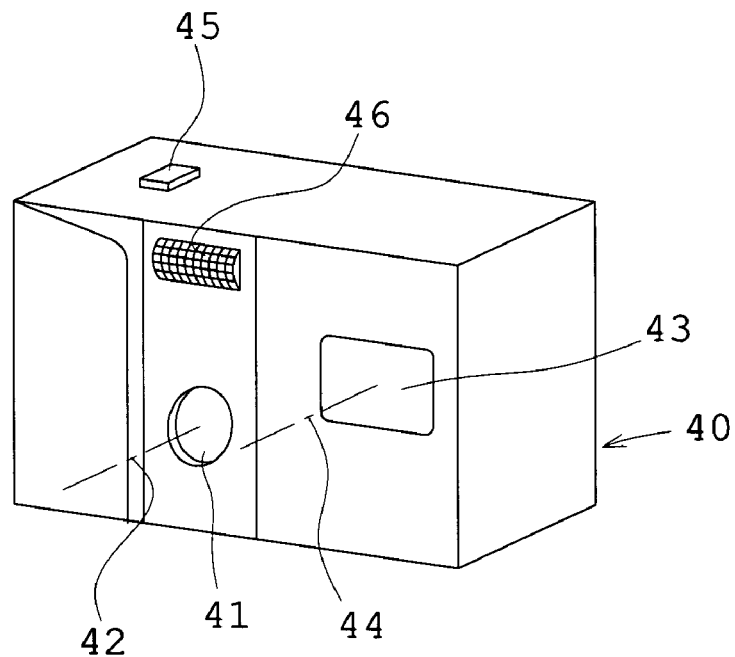
FIG. 25 is a front perspective view showing the appearance of an electronic camera provided with the imaging apparatus according to the present invention.
Figure 26:
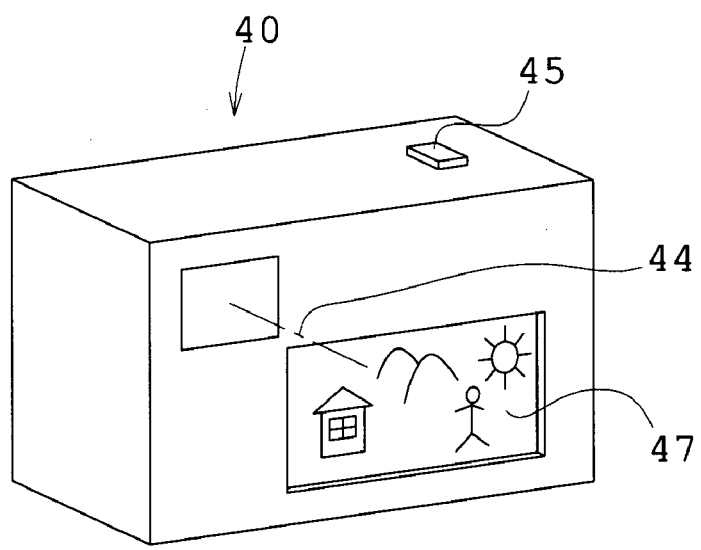
FIG. 26 is a rear perspective view showing the digital camera of FIG. 25.
Figure 27:
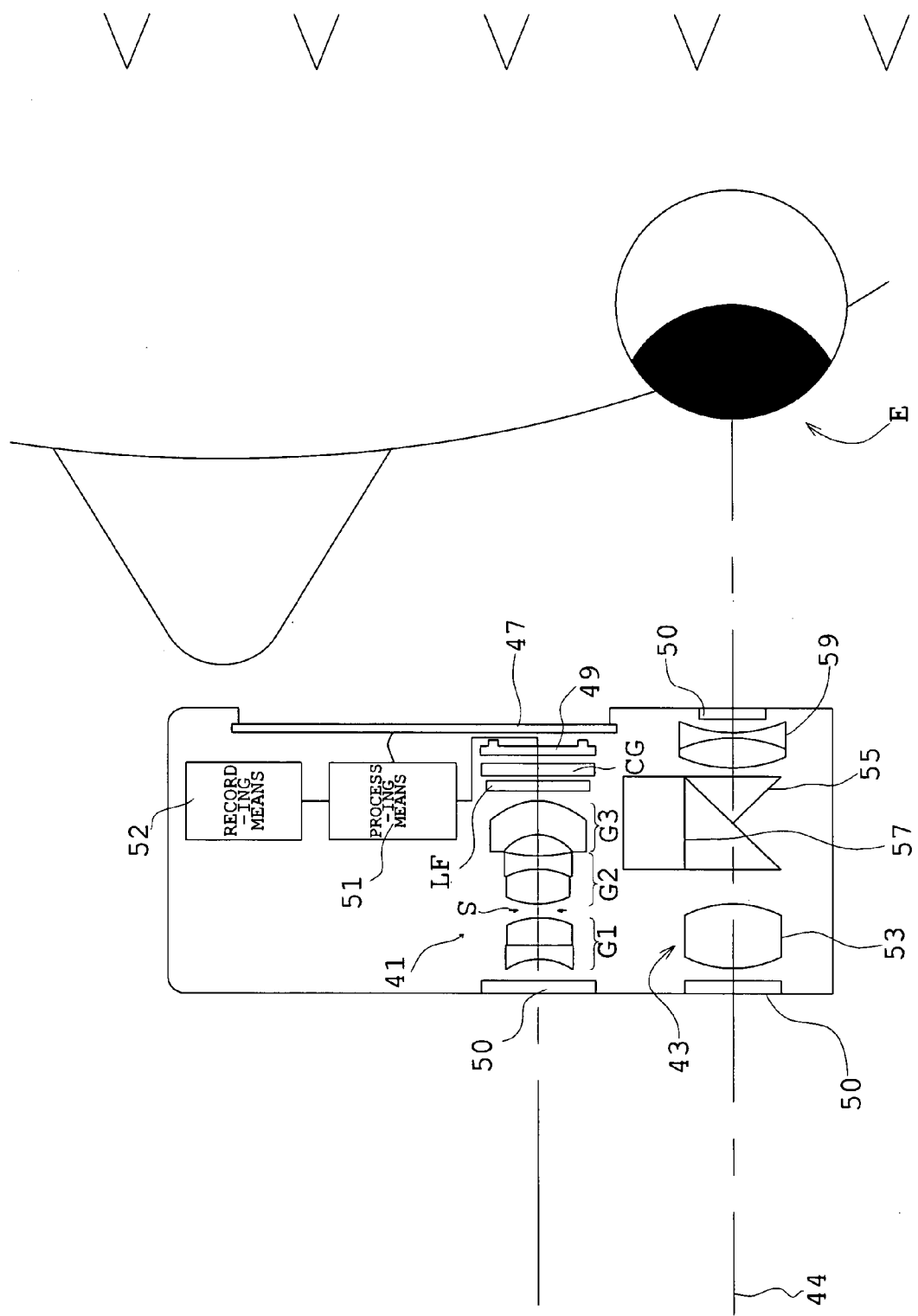
FIG. 27 is a sectional view showing the structure of the digital camera of FIG. 25.

FIGS. 25-27 show the imaging apparatus according to the present invention incorporating a photographing optical system 41, as the digital camera. FIGS. 25 and 26 show the appearance of a digital camera 40. FIG. 27 shows the structure of the digital camera 40.

The digital camera 40, in this example, includes the photographing optical system 41 having a photographing optical path 42, a finder optical system 43 having a finder optical path 44, a shutter button 45, a flash lamp 46, and a liquid crystal display monitor 47. When the shutter button 45 provided on the upper face of the camera 40 is pushed, photographing is performed, in association with this shutter operation, through the photographing optical system 41, for example, the imaging apparatus of the first embodiment.

An object image formed by the photographing optical system 41 is brought onto the imaging surface of a CCD 49 through a near-infrared cutoff filter or a near-infrared cutoff coat applied to the CCD cover glass or any other lens.

The object image received by the CCD 49 is converted into the electric signal and is displayed as an electronic image on the liquid crystal display monitor 47 provided on the back face of the camera, through a processing means 51. A recording means 52 is connected to this processing means 51 so that a photographed electronic image can also be recorded.

Also, the recording means 52 may be provided to be independent of the processing means 51, or may be constructed so that the image is electronically recorded and written by a flexible disk, memory card, or MO.

The imaging apparatus may be constructed as the digital camera provided with a CMOS instead of the CCD 49.

A finder objective optical system 53 is located on the finder optical path 44. The object image produced by the finder objective optical system 53 is formed on a field frame 57 of a Porro prism 55 that is an image erecting member. Behind the Porro prism 55 is located an eyepiece optical system 59 which introduces an erect image into an observer's eye E.

Also, a cover member 50 is provided on each of the entrance side of the photographing optical system 41, the entrance side of the finder objective optical system 53, and the exit side of the eyepiece optical system 59.

The digital camera 40 constructed as mentioned above is the imaging apparatus in which the photographing optical system 41 is a single focus lens that is reduced in overall length and has high performance while ensuring a moderate photographing angle of view, specifically is easy to obtain a half angle of view of 25 degrees or more, and in which good imaging performance is easily obtained in the use of the CCD with the number of pixels of 3M or more, a reduction in overall lens length can be realized, the lens diameter can be reduced, and stability to lens decentration can be ensured. Thus, high performance and low cost can be attained.

Figure 28:
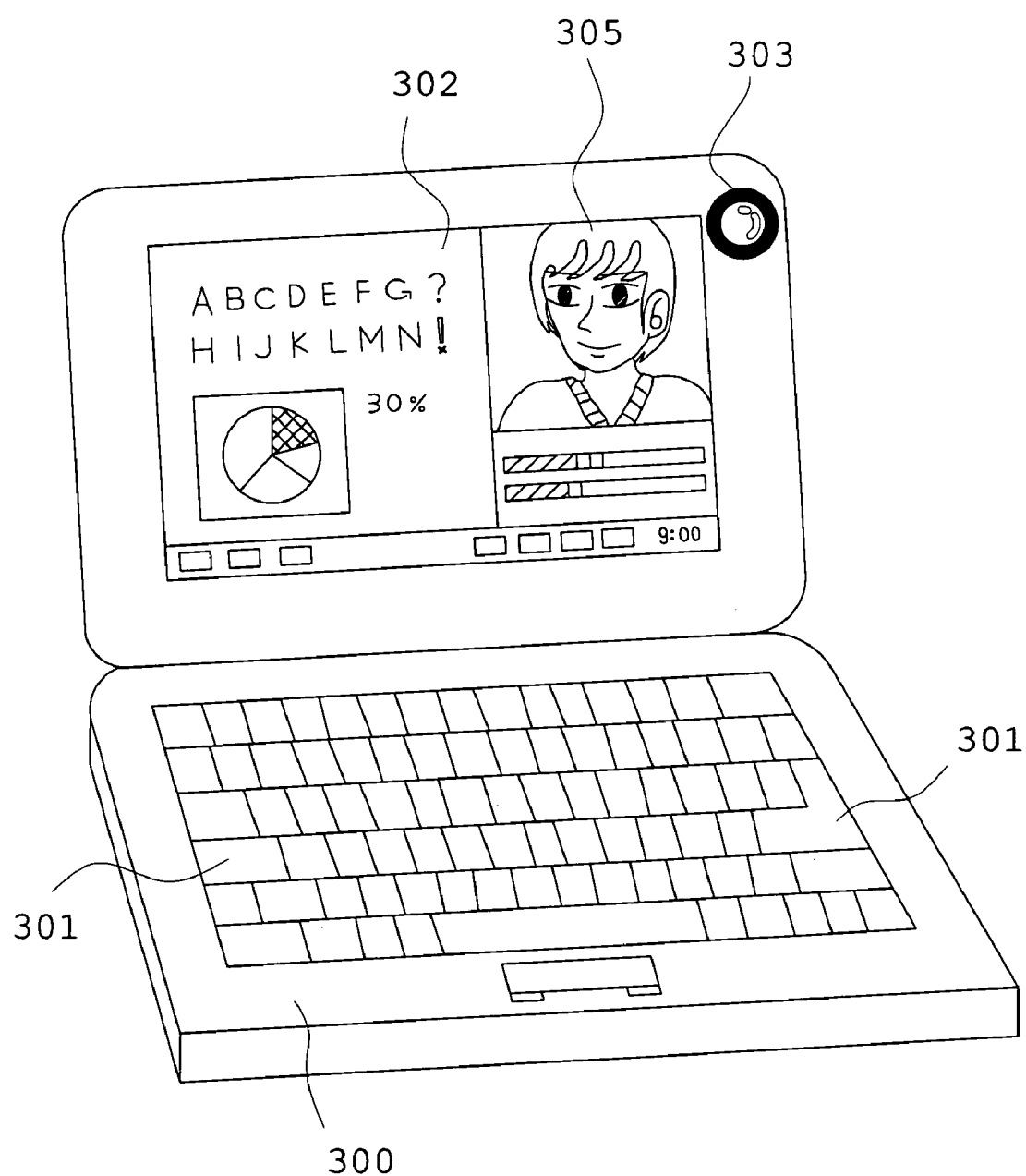
FIG. 28 is a front perspective view showing a personal computer in which a cover is opened, provided with the imaging apparatus of the present invention.
Figure 29:
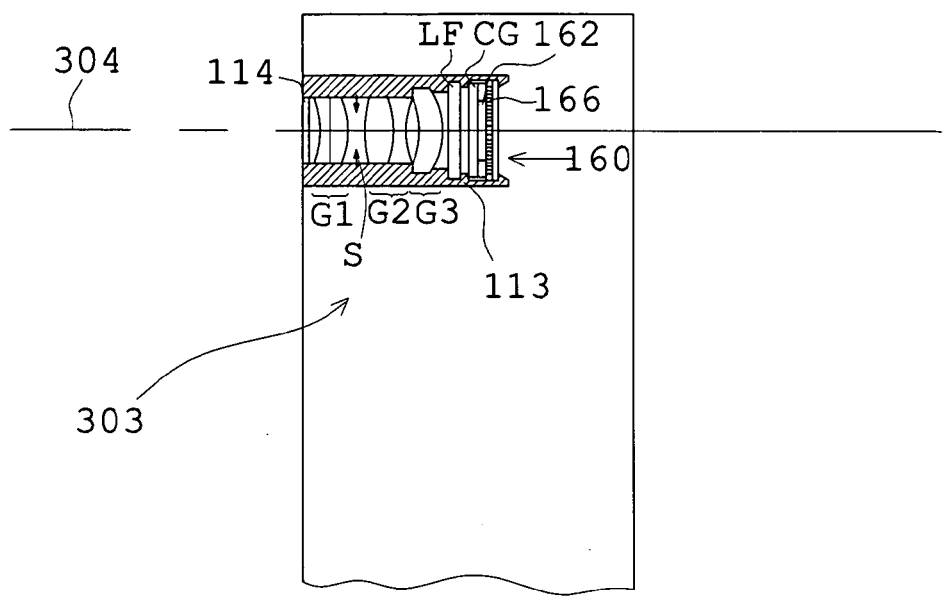
FIG. 29 is a sectional view showing the personal computer of FIG. 28.
Figure 30:
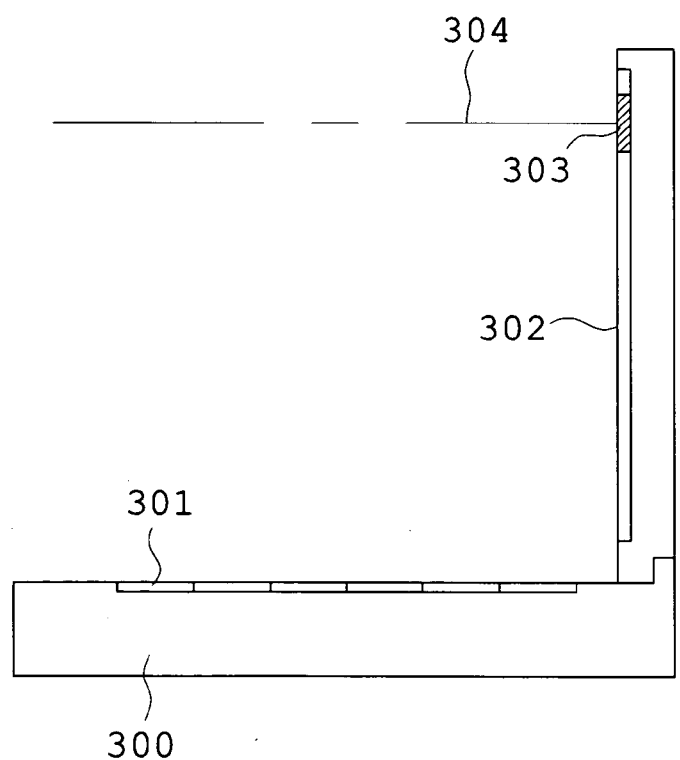
FIG. 30 is a side view showing the personal computer of FIG. 28.

Subsequently, the imaging apparatus of the present invention constructed as a personal computer of an example of an information processing apparatus is illustrated in FIGS. 28-30. FIGS. 28 and 30 show a state where the cover of a personal computer 300 is opened, and FIG. 29 shows a photographing optical system 303 of the personal computer 300.

The personal computer 300, as shown in FIGS. 28-30, has a keyboard 301 provided for the purpose that an operator inputs information from the exterior; an information processing means or a recording means, not shown; a monitor 302 displaying information for the operator; and the photographing optical system 303 for photographing the operator himself or surrounding images.

Here, the monitor 302 may be a transmission-type liquid crystal display element illuminated with backlight, not shown, from the back face; a reflection-type liquid crystal display element reflecting light from the front for display; or a CRT display. In FIG. 28, the photographing optical system 303 is housed in the monitor 302 upper-right, but it is not limited to this place and may be located at any place, such as the periphery of the monitor 302 or of the keyboard 301.

The photographing optical system 303 uses, for example, the photographing optical system described in the imaging apparatus of the first embodiment according to the present invention and includes an imaging element chip 162 receiving an image on the image side of the photographing optical system 303, on a photographing optical path 304. These are housed in the personal computer 300 that is the imaging apparatus.

Here, the cover glass CG is additionally cemented to the imaging element chip 162 and they are integrally constructed as an imaging unit 160. Since the imaging unit 160 is fitted into the rear end of a lens frame 113 of the photographing optical system 303 and can be mounted in a single operation, the alignment of the photographing optical system 303 and the chip 162 and the adjustment of face-to-face spacing are not required and assembly is simplified. At the top of the lens frame 113, a cover glass 114 for protecting the photographing optical system 303 is placed.

An object image received by the imaging element chip 162 is input into the processing means of the personal computer 300 through a terminal 166 and is displayed as an electronic image on the monitor 302. In FIG. 28, a photographed image 305 of the operator is shown as an example. It is also possible to display the image 305 on the personal computer of a communication mate lying at a remote place through the processing means and the internet or the telephone.

Figure 31:
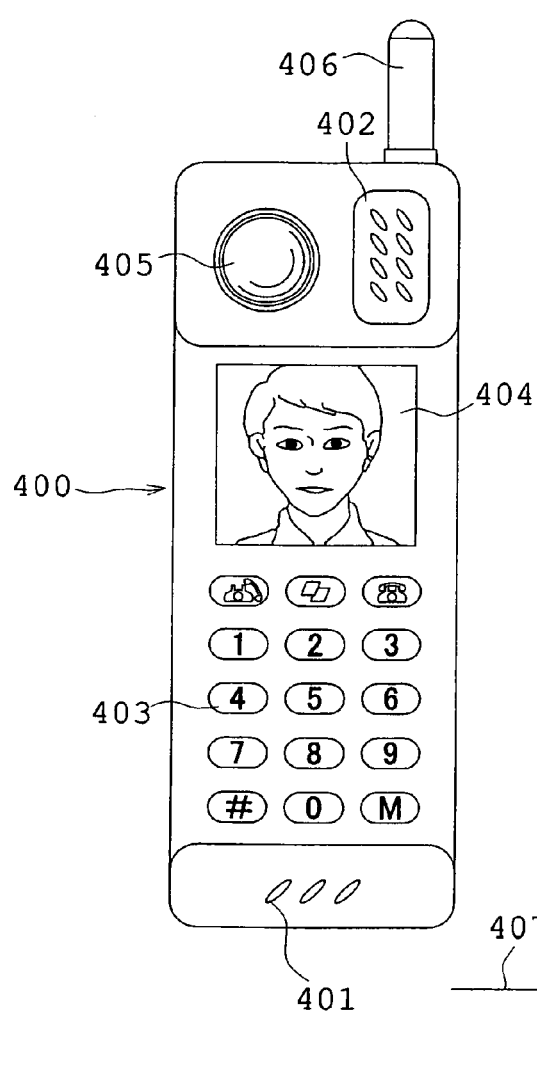
FIG. 31 is a front view showing a mobile phone provided with the imaging apparatus of the present invention.
Figure 32:
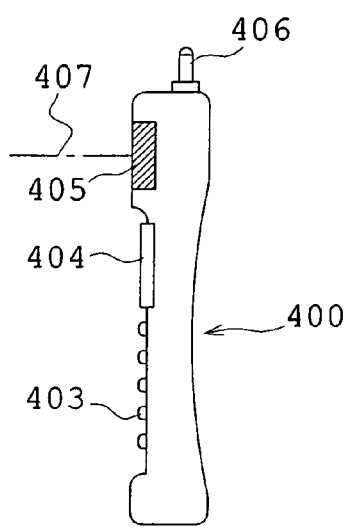
FIG. 32 is a side view showing the mobile phone of FIG. 31.
Figure 33:
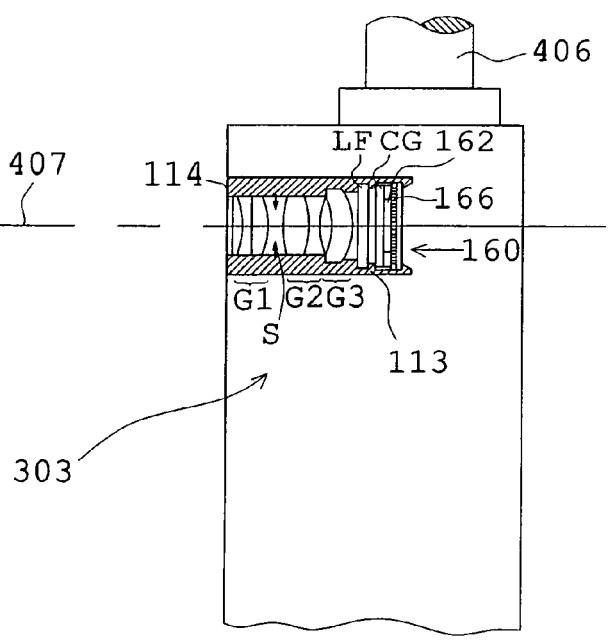
FIG. 33 is a sectional view showing the mobile phone of FIG. 31.

FIGS. 31 and 32 show a telephone that is another example of the information processing apparatus housing the photographing optical system as the imaging apparatus of the present invention, notably a mobile phone that is handy to carry. FIG. 33 shows a photographing optical system 405 housed in a mobile phone 400.

The mobile phone 400, as shown in FIGS. 31-33, includes a microphone section 401 inputting an operator's voice as information; a speaker section 402 outputting the voice of a communication mate; input dials 403 that an operator inputs information; a monitor 404 displaying information, such as the photographed image of the operator himself or the communication mate and telephone numbers; the photographing optical system 405; an antenna 406 transmitting and receiving communication waves; and a processing means (not shown) processing image information, communication information, and input signals.

Here, the monitor 404 is a liquid crystal display element. Also, in the figures, the positions of individual components are not limited to those shown.

The photographing optical system 405 uses, for example, the photographing optical system described in the imaging apparatus of the first embodiment according to the present invention and includes the imaging element chip 162 receiving an image on the image side of the photographing optical system 405, on a photographing optical path 407. These are housed in the mobile phone 400 that is the imaging apparatus.

Here, the cover glass CG is additionally cemented to the imaging element chip 162 and they are integrally constructed as the imaging unit 160. Since the imaging unit 160 is fitted into the rear end of the lens frame 113 of the photographing optical system 405 and can be mounted in a single operation, the alignment of the photographing optical system 405 and the chip 162 and the adjustment of face-to-face spacing are not required and assembly is simplified. At the top of the lens frame 113, the cover glass 114 for protecting the photographing optical system 405 is placed.

An object image received by the imaging element chip 162 is input into the processing means, not shown, through the terminal 166 and is displayed as an electronic image on either the monitor 404 or the monitor of the communication mate, or both.

Also, the processing means includes a signal processing function that when the image is transmitted to the communication mate, the information of the object image received by the chip 162 is converted into a transmittable signal.

According to the imaging apparatus of the present invention, even in the wide-angle lens such as that with a half angle of view in excess of 25 degrees, each of the first and second lens units is constructed with no more than two lens elements and favorable peripheral lens performance can be obtained. Even when the CCD with the number of pixels of 3M or more is used, favorable imaging performance can be secured. Moreover, the optical system that is capable of ensuring stability to lens decentration can be realized.

Since each of the first and second lens units has the positive power, a reduction in overall length of the optical system can be attained. The entrance surface of the first lens unit is configured to be concave, and thus the outer diameter of the lens element located on the entrance side can be downsized.

The first lens unit is constructed so that its entrance surface is concave and its exit surface is convex, and the second lens unit is such that the entrance surface is convex and the exit surface is concave. Whereby, the production of aberration in each lens unit can be minimized with a small number of lens elements, and the degradation of performance due to decentration between the lens units is easily suppressed.

Since the third lens unit is constructed with the lens component of positive power, the exit pupil of the optical system can be spaced away from the electronic image sensor in the camera using the imaging apparatus of the present invention, the influence of shading produced on the periphery can be lessened, and the amount of marginal light is easily ensured.

Furthermore, it is possible to realize the optical system that affords the reduction of the overall length of the optical system and downsizing of the outer diameter, maintains good performance while ensuring a moderate position of the exit pupil, and causes less degradation of performance due to variation in manufacture.

According to the present invention, it is possible to provide the electronic imaging apparatus designed to be also applicable to a small-sized electronic imaging system and provided with the photographing optical system that is capable of ensuring a moderate angle of view, is small in thickness in a depth direction, and has high optical performance. It is further possible to provide the optical system that is capable of ensuring the compact design of the optical system unit and stability to lens decentration.

What is claimed is:

1. An imaging apparatus comprising:
    a photographing optical system; and
    an image sensor converting an optical image formed on an imaging surface by the photographing optical system into an electric signal,
    wherein the photographing optical system consists of, in order from an object side toward an image side, a first lens unit with positive power in which a most object-side lens surface is concave and a most image-side lens surface is convex, an aperture stop, a second lens unit with positive power in which a most object-side lens surface is convex and a most image-side lens surface is concave, and a third lens unit with positive power,
    wherein air spacing between the second lens unit and the third lens unit assumes a shape of a biconvex air lens, and
    wherein the photographing optical system satisfies the following condition:

$$1.4 \leq |r\,2R/IH| \leq 15.0$$

where IH is a maximum photographic image height, which is a half of a diagonal length, in an effective imaging area, of the image sensor, and r 2R is a paraxial radius of curvature of the most image-side lens surface of the second lens unit.

2. An imaging apparatus comprising:
    a photographing optical system; and
    an image sensor converting an optical image formed on an imaging surface by the photographing optical system into an electric signal,
    wherein the photographing optical system consists of, in order from an object side toward an image side, a first lens unit with positive power in which a most object-side lens surface is concave and a most image-side lens surface is convex, an aperture stop, a second lens unit with positive power in which a most object-side lens surface is convex and a most image-side lens surface is concave, and a third lens unit with positive power, and
    wherein the photographing optical system satisfies the following condition:

$$0.8 \leq f\,g2/f\,all \leq 5.5$$

where f g2 is a focal length of the second lens unit and f all is a focal length of a whole of the photographing optical system.

3. An imaging apparatus according to claim 1 or 2, wherein air spacing between the second lens unit and the third lens unit assumes a shape of a biconvex air lens to satisfy the following condition:

$$r\,2R/r\,3F \leq -1$$

where r 2R is a paraxial radius of curvature of a most image-side lens surface of the second lens unit and r 3F is a paraxial radius of curvature of a most object-side lens surface of the third lens unit.

4. An imaging apparatus according to claim 1 or 2, wherein a most object-side lens surface of the third lens unit is concave and a most image-side lens surface of the third lens unit is convex.

5. An imaging apparatus according to claim 4, satisfying the following condition:

$$0.3 \leq |r\,3F|/IH \leq 2.5$$

where r 3F is a paraxial radius of curvature of a most object-side lens surface of the third lens unit and IH is a maximum photographic image height, which is a half of a diagonal length, in an effective imaging area, of the image sensor.

6. An imaging apparatus according to claim 5, wherein the third lens unit consists of a single positive meniscus lens element whose object-side lens surface is concave, having an aspherical surface configured so that positive power moderates progressively in going from a lens center to a periphery.

7. An imaging apparatus according to claim 1 or 2, further satisfying the following condition:

$$0.6 \leq |r1F/IH| \leq 4.0$$

where r1F is a paraxial radius of curvature of the most object-side lens surface of the first lens unit and IH is a maximum photographic image height, which is a half of a diagonal length, in an effective imaging area, of the image sensor.

8. An imaging apparatus according to claim 1 or 2, wherein the first lens unit consists of a meniscus lens component that there is no air spacing between an entrance surface and an exit surface of the first lens unit.

9. An imaging apparatus according to claim 1 or 2, wherein the first lens unit consists of a first lens element with negative power and a second lens element with positive power, arranged in this order from the object side toward the image side.

10. An imaging apparatus according to claim 9, wherein an entrance surface of the second lens element satisfies the following condition:

$$3.0 \leq |r1L12|/IH$$

where r1L12 is a paraxial radius of curvature of the entrance surface of the second lens element and IH is a maximum photographic image height, which is a half of a diagonal length, in an effective imaging area, of the image sensor.

11. An imaging apparatus according to claim 9, wherein the first lens unit consists of a cemented lens component, the cemented lens component consisting of the first lens element with negative power and the second lens element with positive power.

12. An imaging apparatus according to claim 1 or 2, wherein the second lens unit consists of, in order from the object side, a first lens element with positive power and a second lens element with negative power.

13. An imaging apparatus according to claim 12, wherein the second lens unit consists of a cemented lens component, the cemented lens component consisting of the first lens element with positive power and the second lens element with negative power.

14. An imaging apparatus according to claim 1 or 2, wherein the first lens unit consists of a cemented lens component, the cemented lens component consisting of, in order from the object side, a first lens element with negative power and a second lens element with positive power; the second lens unit consists of a cemented lens component, the cemented lens component consisting of a first lens element with positive power and a second lens element with negative power, arranged in this order from the object side; and the third lens unit consists of a single meniscus lens element with positive power.

15. An imaging apparatus according to claim 1, further satisfying the following condition:

$$0.8 \leq fg2/fall \leq 5.5$$

where fg2 is a focal length of the second lens unit and fall is a focal length of a whole of the photographing optical system.

16. An imaging apparatus according to claim 1 or 2, further satisfying the following condition:

$$-0.455 \leq IH/EP \leq 0.455$$

where EP is a distance from an exit pupil of the photographing optical system to the imaging surface of the image sensor and IH is a maximum photographic image height, which is a half of a diagonal length, in an effective imaging area, of the image sensor.

17. An imaging apparatus according to claim 1 or 2, wherein each of the first lens unit, the second lens unit, and the third lens unit consists of two or less lens element.

18. An imaging apparatus according to claim 1 or 2, further satisfying the following condition:

$$2.5 < TL/IH < 4.1$$

where TL is a distance from an entrance surface of the first lens unit of the photographing optical system to the imaging surface of the image sensor and IH is a maximum photographic image height, which is a half of a diagonal length, in an effective imaging area, of the image sensor.

19. An imaging apparatus comprising:
a photographing optical system; and
an image sensor converting an optical image formed on an imaging surface by the photographing optical system into an electric signal,
wherein the photographing optical system consists of, in order from an object side toward an image side, a first lens unit with positive power in which a most object-side lens surface is concave and a most image-side lens surface is convex, an aperture stop, a second lens unit with positive power in which a most object-side lens surface is convex and a most image-side lens surface is concave, and a third lens unit with positive power, and
wherein the imaging apparatus satisfies the following condition:

$$2.5 < TL/IH < 4.1$$

where TL is a distance from an entrance surface of the first lens unit of the photographing optical system to the imaging surface of the image sensor and IH is a maximum photographic image height, which is a half of a diagonal length, in an effective imaging area, of the image sensor.

20. An imaging apparatus according to claim 1, 2, or 19, further satisfying the following condition:

$$0.03 < TS/TL < 0.4$$

where TS is a sum of lengths of air spacings, measured along an optical axis, from an entrance surface of the first lens unit to an exit surface of the third lens unit and TL is a distance from the entrance surface of the first lens unit of the photographing optical system to the imaging surface of the image sensor.

21. An imaging surface comprising:
a photographing optical system; and
an image sensor converting an optical image formed on an imaging surface by the photographing optical system into an electric signal,
wherein the photographing optical system consists of, in order from an object side toward an image side, a first lens unit with positive power, an aperture stop, a second lens unit with positive power, and a third lens unit with positive power,
wherein each of an exit surface of the first lens unit and an entrance surface of the second lens unit is a convex surface facing an aperture stop side, and the first lens unit is constructed with a plurality of lens elements so that any of lens surfaces of the plurality of lens elements is convex toward the aperture stop side on the optical axis, and
wherein the imaging apparatus satisfies the following condition:

$$0.15 \leq T1/IH \leq 0.90$$

where T1 is a distance, measured along an optical axis, from an entrance surface of the first lens unit of the photographing optical system to an image-side surface of the first lens unit and IH is a maximum photographic image height, which is a half of a diagonal length, in an effective imaging area, of the image sensor.

22. An imaging apparatus according to claim 21, wherein any lens element with power in the first lens unit, the second lens unit, and the third lens unit is constructed of lens material with a refractive index of 1.7 or more.

23. An imaging apparatus according to claim 21, wherein the first lens unit consists of, in order from the object side, a negative meniscus lens element and a positive meniscus lens element, and wherein an image-side surface of the negative meniscus lens element and an object-side surface of the positive meniscus lens element satisfy the following conditions:

$$0.5 < R2/R3 < 1.2$$

$$0 \leq D23/D14 < 0.2$$

where R2 is a paraxial radius of curvature of the image-side surface of the negative meniscus lens element of the first lens unit, R3 is a paraxial radius of curvature of the object-side surface of the positive meniscus lens element of the first lens unit, D23 is air spacing, measured along an optical axis, from the image-side surface of the negative meniscus lens element to the object-side surface of the positive meniscus lens element in the first lens unit, and D14 is a length, measured along the optical axis, from the object-side surface of the negative meniscus lens element to the image-side surface of the positive meniscus lens element.

24. An imaging apparatus according to claim 21, wherein the first lens unit consists of a cemented lens component.

25. An imaging apparatus according to claim 21, wherein the first lens unit consists of, in order from the object side toward the image side, a negative meniscus lens element with a concave surface facing the object side and a positive meniscus lens element with a concave surface facing the object side; the second lens unit consists of, in order from the object side toward the image side, a positive lens element with a convex surface facing the object side and a negative lens element; and the third lens unit consists of a positive meniscus lens component with a concave surface facing the object side, and wherein an object-side surface of the positive meniscus lens component of the third lens unit is an aspherical surface configured so that negative power weakens progressively in going from the optical axis to a periphery and an image-side surface of the positive meniscus lens component of the third lens unit is an aspherical surface configured so that positive power weakens progressively in going from the lens center to the periphery.

26. An optical system comprising a cemented lens component, the cemented lens component comprising:
    a glass lens element; and
    an auxiliary lens element assembled in the glass lens element,
    the cemented lens component satisfying the following conditions:

$$0.05 \leq DC \leq 0.3 \text{ (mm)}$$

$$Ndc \geq 1.65$$

$$|vdm - vdc| > 6$$

where DC is a thickness, measured along the optical axis, of a single body of the auxiliary lens element assembled in the glass lens element; Ndc is a refractive index, regarding the d line (587.56 nm), of the auxiliary lens element assembled in the glass lens element; vdm is an Abbe's number of the glass lens element; and vdc is an Abbe's number of the auxiliary lens element assembled in the glass lens element.

27. An optical system according to claim 26, wherein signs of powers of the glass lens element and the single body of the auxiliary lens element assembled in the glass lens element are reversed.

28. An optical system according to claim 26, wherein both the glass lens element and the auxiliary lens element assembled in the glass lens element are configured into meniscus shapes.

29. An imaging apparatus according to claim 21, wherein one of the first lens unit, the second lens unit, and the third lens unit comprises a cemented lens component having a glass lens element and an auxiliary lens element assembled in the glass lens element, and the cemented lens component satisfies the following conditions:

$$0.05 \leq DC \leq 0.3 \text{ (mm)}$$

$$Ndc \geq 1.65$$

$$|vdm - vdc| > 6$$

where DC is a thickness, measured along the optical axis, of a single body of the auxiliary lens element assembled in the glass lens element; Ndc is a refractive index, regarding the d line (587.56 nm), of the auxiliary lens element assembled in the glass lens element; vdm is an Abbe's number of the glass lens element; and vdc is an Abbe's number of the auxiliary lens element assembled in the glass lens element.

30. An imaging apparatus according to claim 29, wherein the first lens unit consists of the cemented lens component, and wherein signs of powers of the glass lens element and a single body of the auxiliary lens element assembled in the glass lens element are reversed; the glass lens element and the auxiliary lens element assembled in the glass lens element have different Abbe's numbers; and both the glass lens element and the auxiliary lens element assembled in the glass lens element are configured into meniscus shapes.

31. An imaging apparatus according to claim 21, wherein a most image-side lens surface of the second lens unit is concave toward the image side and air spacing between the second lens unit and the third lens unit assumes a shape of a biconvex air lens, and wherein the photographing optical system satisfies the following condition:

$$1.4 \leq |r\ 2R|/IH \leq 18.0$$

where r 2R is a paraxial radius of curvature of the most image-side lens surface of the second lens unit.

32. An imaging apparatus according to claim 21, further satisfying the following condition:

$$0.8 \leq fg2/f\ all \leq 5.5$$

where f g2 is a focal length of the second lens unit and f all is a focal length of a whole of the photographing optical system.

33. An imaging apparatus according to claim 21, wherein air spacing between the second lens unit and the third lens unit assumes a shape of a biconvex air lens to satisfy the following condition:

$$r\ 2R/r\ 3F \leq -1$$

where r 2R is a paraxial radius of curvature of a most image-side lens surface of the second lens unit and r 3F is a paraxial radius of curvature of a most object-side lens surface of the third lens unit.

34. An imaging apparatus according to claim 21, wherein a most image-side lens surface of the second lens unit, and a most object-side lens surface of the third lens unit is concave and a most image-side lens surface of the third lens unit is convex.

35. An imaging apparatus according to claim 34, satisfying the following condition:

$$0.3 \leq r3F/IH \leq 2.5$$

where r 3F is a paraxial radius of curvature of a most object-side lens surface of the third lens unit.

36. An imaging apparatus according to claim 21, wherein the third lens unit consists of a single positive meniscus lens element whose object-side lens surface is concave, having an aspherical surface configured so that positive power moderates progressively in going from a lens center to a periphery.

37. An imaging apparatus according to claim 21, further satisfying the following condition:

$$0.6 \leq |r1F|/IH \leq 4.0$$

where r 1F is a paraxial radius of curvature of a most object-side lens surface of the first lens unit.

38. An imaging apparatus according to claim 21, wherein the second lens unit consists of, in order from the object side, a first lens element with positive power and a second lens element with negative power, having a concave surface facing the image side.

39. An imaging apparatus according to claim 38, wherein the second lens unit consists of a cemented lens component, the cemented lens component consisting of the first lens element with positive power and the second lens element with negative power.

40. An imaging apparatus according to claim 21, further satisfying the following condition:

$$-0.455 \leq IH/EP \leq 0.455$$

where EP is a distance from an exit pupil of the photographing optical system to the imaging surface of the image sensor.

41. An imaging apparatus according to claim 21, wherein each of the first lens unit, the second lens unit, and the third lens unit consists of two or less lens element.

42. An imaging apparatus according to claim 21, further satisfying the following condition:

$$2.5 < TL/IH < 4.1$$

where TL is a distance from an entrance surface of the first lens unit of the photographing optical system to the imaging surface of the image sensor.

43. An imaging apparatus according to claim 21, further satisfying the following condition:

$$0.03 < TS/TL < 0.4$$

where TL is a distance from an entrance surface of the first lens unit of the photographing optical system to the imaging surface of the image sensor and TS is a sum of lengths of air spacings, measured along an optical axis, from an entrance surface of the first lens unit to an exit surface of the third lens unit.

* * * * *

UNITED STATES PATENT AND TRADEMARK OFFICE
CERTIFICATE OF CORRECTION

PATENT NO. : 7,418,199 B2  Page 1 of 1
APPLICATION NO. : 11/177277
DATED : August 26, 2008
INVENTOR(S) : Kawamura et al.

It is certified that error appears in the above-identified patent and that said Letters Patent is hereby corrected as shown below:

Column 40, line 19 claim 1, change "$1.4 \leq | r2R / IH \leq 15.0$" to
-- $1.4 \leq | r2R | / IH \leq 15.0$ --;

Column 41, line 6 claim 7, change "$0.6 \leq | r1F / IH \leq 4.0$" to
-- $0.6 \leq | r1F | / IH \leq 4.0$ --; and Column 45, line 6 claim 35, change "$0.3 \leq r3F | / IH \leq 2.5$" to
-- $0.3 \leq | r3F | / IH \leq 2.5$ --.

Signed and Sealed this

Seventeenth Day of March, 2009

JOHN DOLL
*Acting Director of the United States Patent and Trademark Office*